(12) United States Patent
Levy

(10) Patent No.: US 12,175,410 B2
(45) Date of Patent: Dec. 24, 2024

(54) AUTOMATED STORAGE AREA

(71) Applicant: Luxer Corporation, McClellan, CA (US)

(72) Inventor: Arik Seth Levy, Loomis, CA (US)

(73) Assignee: Luxer Corporation, McClellan, CA (US)

( * ) Notice: Subject to any disclaimer, the term of this patent is extended or adjusted under 35 U.S.C. 154(b) by 1169 days.

(21) Appl. No.: 16/885,178

(22) Filed: May 27, 2020

(65) Prior Publication Data

US 2020/0286036 A1    Sep. 10, 2020

Related U.S. Application Data

(63) Continuation-in-part of application No. 16/447,445, filed on Jun. 20, 2019, now Pat. No. 11,763,615, and a continuation-in-part of application No. 15/222,917, filed on Jul. 28, 2016, now Pat. No. 11,625,675, which is a continuation-in-part of application No. 14/668,883, filed on Mar. 25, 2015, now Pat. No. 10,445,687, and a continuation-in-part of application No. 14/505,457, filed on Oct. 2, 2014, now Pat. No. 10,810,537, application No. 16/885,178 is a continuation-in-part of application No. 14/505,457,
(Continued)

(51) Int. Cl.
| | |
|---|---|
| *G06Q 10/0833* | (2023.01) |
| *G06F 3/0482* | (2013.01) |
| *G06K 7/10* | (2006.01) |
| *G06K 7/14* | (2006.01) |
| *G06Q 10/0837* | (2023.01) |
| *G06Q 10/087* | (2023.01) |
| *G07C 9/00* | (2020.01) |

(52) U.S. Cl.
CPC ....... *G06Q 10/0833* (2013.01); *G06F 3/0482* (2013.01); *G06K 7/10722* (2013.01); *G06K 7/1413* (2013.01); *G06Q 10/0837* (2013.01); *G06Q 10/087* (2013.01); *G07C 9/00571* (2013.01); *G07C 9/0069* (2013.01)

(58) Field of Classification Search
CPC .............. G06F 3/0482; G06K 7/10722; G06K 7/1413; G07C 9/00571; G07C 9/0069
See application file for complete search history.

(56) References Cited

U.S. PATENT DOCUMENTS

| | | | |
|---|---|---|---|
| 4,348,967 | A | 9/1982 | Schattner et al. |
| 4,971,244 | A | 11/1990 | Friedman |

(Continued)

FOREIGN PATENT DOCUMENTS

| | | |
|---|---|---|
| CN | 105006048 A | 10/2015 |
| JP | 2005002581 A | 1/2005 |

OTHER PUBLICATIONS

Unix and Linux Stack Exchange, https://web.archive.org/web/20130326044544/https://unix.stackexchange.com/questions/28526/add-a-user-to-the-system-only-if-it-doesnt-exist (Year: 2013).*

*Primary Examiner* — Rupangini Singh
(74) *Attorney, Agent, or Firm* — Wolf, Greenfield & Sacks, P.C.

(57) ABSTRACT

A system and a method for controlling a plurality of electronic locks are provided. In an embodiment, a request for opening a door is received and verified. If the request is approved, signals are sent to open the electronic lock that locks the door. If the request is rejected, a message is sent to notify the user of the invalid request.

11 Claims, 34 Drawing Sheets

Related U.S. Application Data filed on Oct. 2, 2014, now Pat. No. 10,810,537, said application No. 14/668,883 is a continuation-in-part of application No. 14/505,457, filed on Oct. 2, 2014, now Pat. No. 10,810,537.

(56) References Cited

U.S. PATENT DOCUMENTS

| | | | |
|---|---|---|---|
| 5,329,659 | A | 7/1994 | Reinert, Sr. |
| 5,339,353 | A | 8/1994 | Asahara et al. |
| 5,666,493 | A | 9/1997 | Wojcik et al. |
| 5,696,906 | A | 12/1997 | Peters et al. |
| 5,875,430 | A | 2/1999 | Koether |
| 5,959,275 | A | 9/1999 | Hughes et al. |
| 5,962,834 | A | 10/1999 | Markman |
| 6,010,239 | A | 1/2000 | Hardgrave et al. |
| 6,085,168 | A | 7/2000 | Mori et al. |
| 6,199,755 | B1 | 3/2001 | Matsumoto et al. |
| 6,236,332 | B1 | 5/2001 | Conkright et al. |
| 6,285,986 | B1 | 9/2001 | Andrews |
| 6,321,202 | B1 | 11/2001 | Raveis, Jr. |
| 6,377,296 | B1 | 4/2002 | Zlatsin et al. |
| 6,428,382 | B1 | 8/2002 | Randolph |
| 6,470,303 | B2 | 10/2002 | Kidd et al. |
| 6,611,598 | B1 | 8/2003 | Hayosh |
| 6,662,078 | B1 | 12/2003 | Hardgrave et al. |
| 6,690,997 | B2 | 2/2004 | Rivalto |
| 6,775,774 | B1 | 8/2004 | Harper |
| 6,859,722 | B2 | 2/2005 | Jones |
| 6,866,195 | B2 | 3/2005 | Knowles et al. |
| 6,882,269 | B2 | 4/2005 | Moreno |
| 6,961,711 | B1 | 11/2005 | Chee |
| 6,974,077 | B1 | 12/2005 | Beyder et al. |
| 6,985,871 | B2 | 1/2006 | Simon et al. |
| 6,999,825 | B2 | 2/2006 | Inomata |
| 7,013,289 | B2 | 3/2006 | Horn et al. |
| 7,055,741 | B2 | 6/2006 | Bong et al. |
| 7,107,457 | B2 | 9/2006 | Harper |
| 7,233,907 | B2 | 6/2007 | Young |
| 7,252,227 | B2 | 8/2007 | Chase |
| 7,313,530 | B2 | 12/2007 | Smith et al. |
| 7,315,616 | B2 | 1/2008 | Annadata et al. |
| 7,364,069 | B2 | 4/2008 | Chase |
| 7,366,586 | B2 | 4/2008 | Kaplan et al. |
| 7,636,671 | B2 | 12/2009 | Caveny et al. |
| 7,664,567 | B2 | 2/2010 | Ishida |
| 7,720,712 | B1 | 5/2010 | Allocca et al. |
| 7,765,131 | B2 | 7/2010 | Klingenberg et al. |
| 7,844,507 | B2 | 11/2010 | Levy |
| 7,860,738 | B2 | 12/2010 | Simon et al. |
| 7,886,971 | B2 | 2/2011 | Cassady et al. |
| 8,108,259 | B2 | 1/2012 | Klingenberg et al. |
| 8,290,878 | B2 | 10/2012 | Taylor |
| 8,401,932 | B2 | 3/2013 | Levy |
| 11,488,774 | B2 | 11/2022 | Lyman |
| 2002/0046133 | A1 | 4/2002 | Sheth |
| 2002/0118095 | A1 | 8/2002 | Estes |
| 2002/0177922 | A1 | 11/2002 | Bloom |
| 2002/0184114 | A1 | 12/2002 | Jorgensen |
| 2003/0035520 | A1 | 2/2003 | Cannon et al. |
| 2004/0164655 | A1 | 8/2004 | Wood et al. |
| 2004/0174392 | A1 | 9/2004 | Bjoernsen et al. |
| 2004/0243426 | A1 | 12/2004 | Hashimoto |
| 2004/0254802 | A1 | 12/2004 | Miller et al. |
| 2005/0190037 | A1 | 9/2005 | Shitan et al. |
| 2006/0069601 | A1 | 3/2006 | Simon et al. |
| 2006/0271437 | A1 | 11/2006 | Maggio |
| 2007/0008663 | A1 | 1/2007 | Nakashima et al. |
| 2007/0035763 | A1 | 2/2007 | Bard et al. |
| 2007/0251990 | A1 | 11/2007 | LeNorman |
| 2007/0252000 | A1 | 11/2007 | LeNorman |
| 2007/0283986 | A1 | 12/2007 | Baum |
| 2008/0106368 | A1 | 5/2008 | Vitier |
| 2008/0247629 | A1 | 10/2008 | Gilder et al. |
| 2009/0271207 | A1 | 10/2009 | Lanigan et al. |
| 2012/0062362 | A1* | 3/2012 | Rudduck ............... G07F 17/13 340/5.64 |
| 2012/0067943 | A1* | 3/2012 | Saunders ............. G06K 7/1434 235/462.11 |
| 2012/0235786 | A1 | 9/2012 | Rudduck et al. |
| 2012/0326456 | A1 | 12/2012 | Picard et al. |
| 2013/0144428 | A1* | 6/2013 | Irwin ..................... G07F 17/10 700/218 |
| 2013/0166067 | A1 | 6/2013 | Irwin et al. |
| 2014/0297487 | A1 | 10/2014 | Bashkin |
| 2015/0107316 | A1 | 4/2015 | Kirkjan |
| 2015/0193733 | A1* | 7/2015 | Bouzit-Benbernou ................... G07F 17/13 705/332 |
| 2015/0199857 | A1 | 7/2015 | Mackin et al. |
| 2015/0221160 | A1 | 8/2015 | Graef et al. |
| 2015/0339862 | A1 | 11/2015 | Skaaksrud |
| 2016/0027261 | A1* | 1/2016 | Motoyama ............ G06Q 10/04 340/313 |
| 2016/0098678 | A1 | 4/2016 | Levy |
| 2016/0335595 | A1 | 11/2016 | Levy et al. |
| 2019/0088054 | A1 | 3/2019 | Wulf |

\* cited by examiner

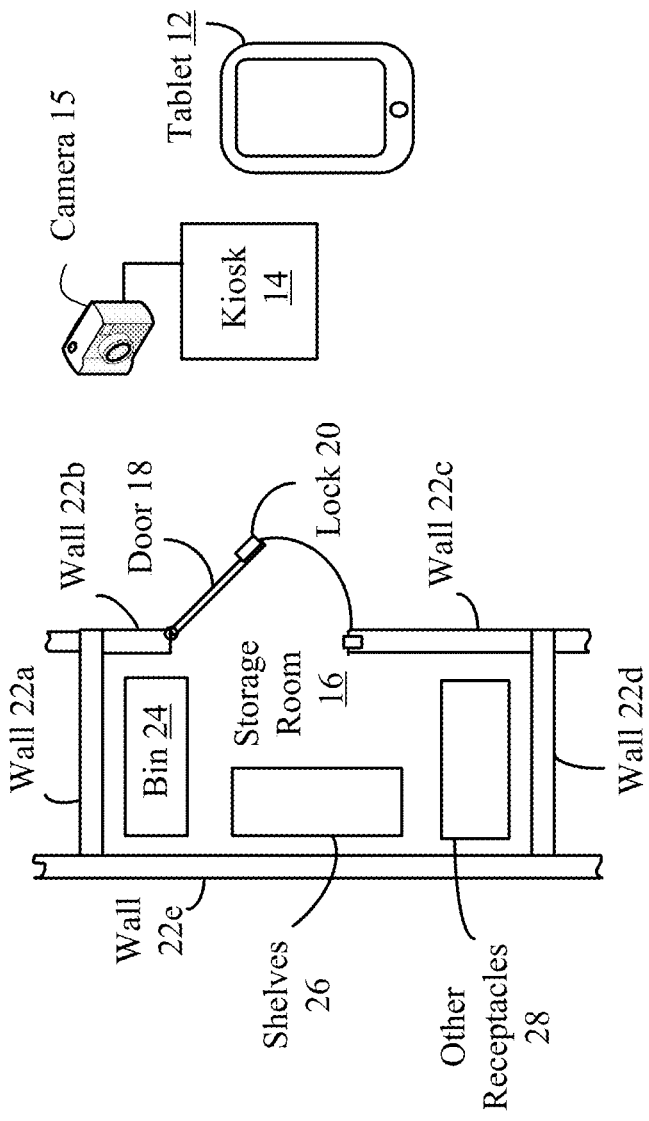
FIG. 1A(1)

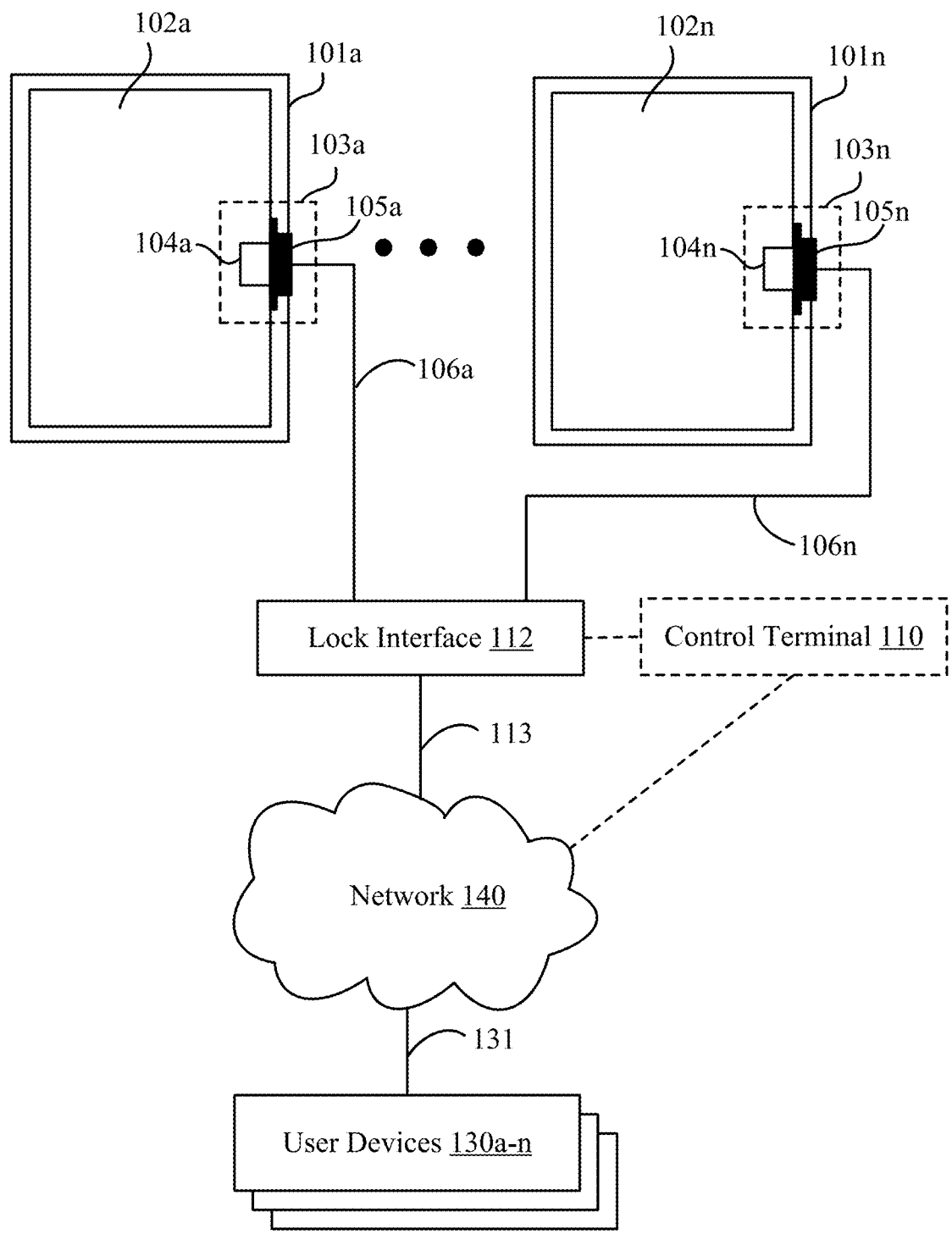
FIG. 1A(2)

AUTOMATED STORAGE AREA

CROSS-REFERENCE TO RELATED APPLICATIONS

This application is a Continuation-in-Part of U.S. Non-Provisional patent application Ser. No. 15/222,917, entitled "METHOD AND SYSTEM FOR CONTROLLING A STORAGE ROOM," filed Jul. 28, 2016, by Arik Seth Levy, which is also a Continuation-in-Part of U.S. Non-Provisional patent application Ser. No. 14/668,883, entitled "METHOD AND SYSTEM FOR IMPLEMENTING ELECTRONIC STORAGE AREAS," filed on Mar. 25, 2015, by Arik Seth Levy, which is Continuation-in-Part of U.S. Non-Provisional patent application Ser. No. 14/505,457, entitled "METHOD AND SYSTEM FOR IMPLEMENTING ELECTRONIC STORAGE AREAS," filed on Oct. 2, 2014, by Arik Seth Levy;

Ser. No. 15/222,917, entitled "METHOD AND SYSTEM FOR CONTROLLING A STORAGE ROOM," filed Jul. 28, 2016, which is also a Continuation-in-Part of U.S. Non-Provisional patent application Ser. No. 14/505,457, entitled "METHOD AND SYSTEM FOR IMPLEMENTING ELECTRONIC STORAGE AREAS," filed on Oct. 2, 2014, by Arik Seth Levy, which is incorporated herein by reference;

this application is also a continuation-in-part of U.S. Non-Provisional patent application Ser. No. 14/505,457, entitled "METHOD AND SYSTEM FOR IMPLEMENTING ELECTRONIC STORAGE AREAS," filed on Oct. 2, 2014, by Arik Seth Levy; and this application is also a continuation-in-part of U.S. Non-Provisional patent application Ser. No. 16/447,445, entitled "METHOD FOR CONTROLLING PACKAGE DELIVERY," filed on Jun. 20, 2019, by Arik Seth Levy, et al.

All of the above Applications are incorporated herein by reference.

The following commonly owned United States patents, including the present application, are related to each other. Each of the other patents are incorporated by reference herein in its entirety:

U.S. Pat. No. 7,844,507, entitled "HANDLING HOUSEHOLD TASKS," by Arik Seth Levy, filed Mar. 22, 2006;

U.S. Pat. No. 8,401,932, entitled "HANDLING HOUSEHOLD TASKS," by Arik Seth Levy, filed Oct. 18, 2010;

U.S. Pat. No. 8,359,249, entitled "STORAGE LOCKER," by Arik Seth Levy, filed Aug. 28, 2011; and U.S. Pat. No. 8,725,600, entitled "STORAGE LOCKER," by Arik Seth Levy, filed Dec. 20, 2012.

FIELD

The current specification relates to a storage room with an electronic lock(s).

BACKGROUND

The subject matter discussed in the background section should not be assumed to be prior art merely as a result of its mention in the background section. Similarly, a problem mentioned in the background section should not be assumed to have been previously recognized in the prior art. The subject matter in the background section merely represents different approaches to accomplishing various tasks.

Typically, use of a lock provides security and privacy to a storage room(s) or a storage area(s). This specification recognizes issues in controlling electronic locks.

BRIEF DESCRIPTION OF THE FIGURES

In the following drawings like reference numbers and labels are used to refer to the same elements. Although the following figures depict various examples of inventions associated with this specification, the inventions associated with this specification are not limited to the examples depicted in the figures.

FIG. 1A(1) shows a representation of delivery system in which items are delivered to a storage room;

FIG. 1A(2) shows a block diagram of an embodiment of a lock system used for controlling electronic locks, which is an embodiment of the system of FIG. 1A(1);

DETAILED DESCRIPTION

Figure 1B:
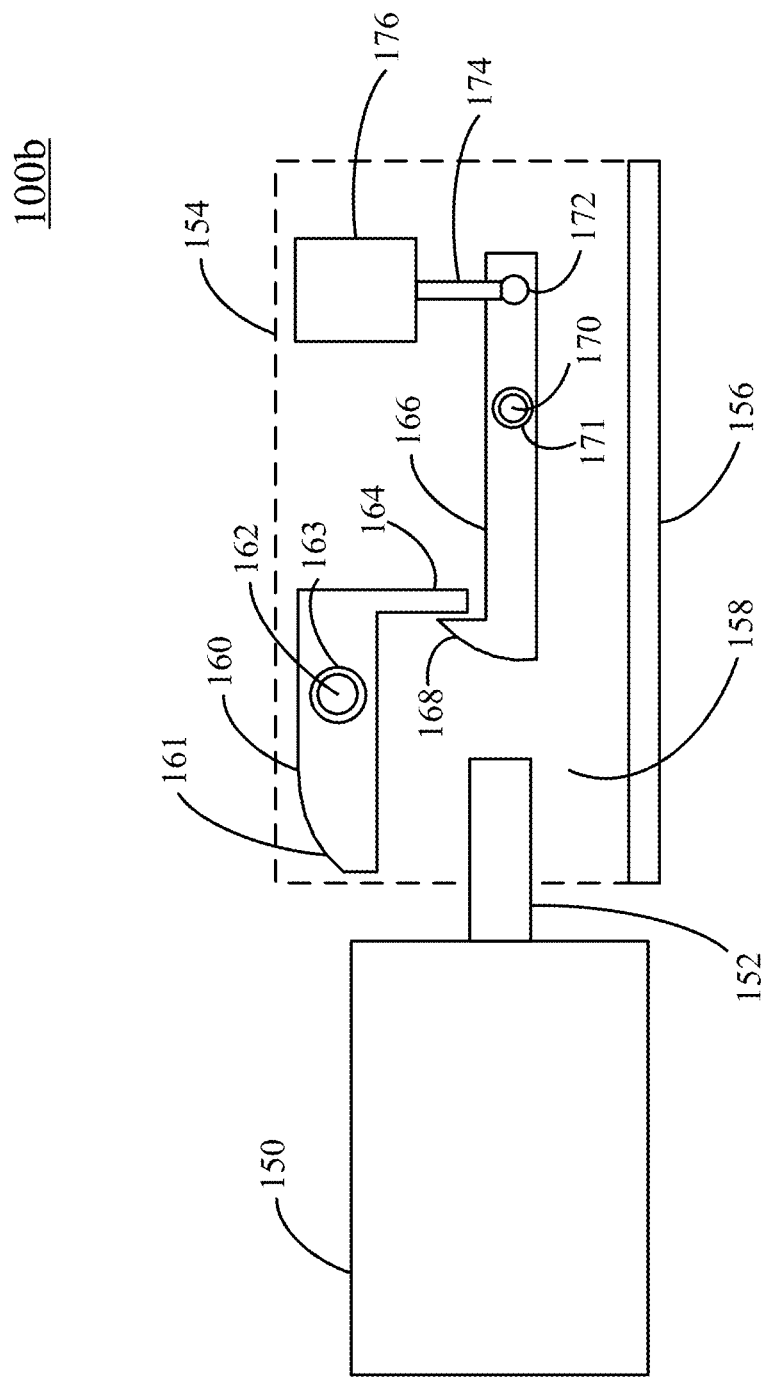
FIG. 1B shows a cross-sectional top view of an embodiment of an electronic lock in a locking position.

Although the issues discussed in the background or elsewhere may have motivated some of the subject matter disclosed below, nonetheless, the embodiments disclosed below do not necessarily solve all of the problems associated with the subject matter discussed in the background or elsewhere. Some embodiments only address one of the problems, and some embodiments do not solve any of the problems associated with the subject matter discussed in the background or elsewhere.

In general, at the beginning of the discussion of each of FIGS. 1-4 and 6-7 is a brief description of each element. After the brief description of each element, each element is further discussed, usually in numerical order, but there is no one location where all of the information of any element of FIGS. 1-10 is necessarily located. Unique information about any particular element or any other aspect of any of FIGS. 1-10 may be found in, or implied by, any part of the specification.

FIG. 1A(1) shows a representation of delivery system 10 in which items are delivered to a storage room. Delivery system 10 may include a tablet 12, a kiosk 14, a camera 15, a storage room 16, a door 18, a lock 20, walls 22a-e, bins 24, shelves 26, and other receptacles 28. In other embodiments, the delivery system 10 may not include all of the components listed and/or may include other components in addition to or instead of those listed above.

Delivery system 10 is a system in which packages are delivered and retrieved from a storage room. The delivery person or other user may interact directly with a kiosk (e.g., via a touchpad) to gain access into the storage room. Optionally, tablet 12 may be used by a delivery person (or other user) for interacting with the kiosk to gain entry into the storage room. Kiosk 14 may be on a control terminal, having a user interface (which may include a touchpad) for the delivery person and other users to access the storage system. Alternatively or additionally, the kiosk 14 may include (or may be) a control terminal, and kiosk 14 may interact with the tablet 12 to unlock a lock on a door of the storage room. In this specification, the terms "kiosk," "terminal," and "control terminal" are used interchangeably, and may be substituted one for the other to obtain different embodiments where ever either term occurs. Kiosk 14 may include a display screen and/or input device, such as a keyboard so that users (e.g., the recipients or the delivery person) may interact with the kiosk without the tablet. The delivery person may, for example via tablet 12, interact with kiosk 14 to search for the intended recipient to ensure that the items is being delivered to the correct storage room and/or to determine whether to leave the item in the storage room or in another storage location.

Camera 15 photographs the item. The photo of the item may be used instead of a barcode to track the delivery of the item. Optionally, the photo of the item may be sent to and/or stored in a location where the sender can view the photo as part of a confirmation that the items was delivered. Optionally, if the recipient was not found in the search for the recipient performed, via kiosk 14, the photo may be sent to a house account or another location, where someone can view the photo and match the photo with the recipient. Although camera 15 is shown as a standalone component of system 10, camera 15 may be controlled by and/or incorporated into kiosk 14. Optionally, camera 15 may be part of tablet 12 and controlled by the delivery person directly.

Storage room 16 is the storage room in which the items delivered by the delivery persona are placed. Storage room 16 may store the package delivered until the recipient comes to pick up the package. Storage room 16 may be an empty room or may have various storage devices into which packages are placed. Storage room 16 may hold packages for multiple unrelated users. Storage room 16 may be the location to which packages for people living in, renting, and/or using a building are delivered. Storage room 16 and/or kiosk 14 may be located inside the building or in a different building (such as a building maintained by the delivery service for users to pick up their packages from). Although in the embodiment of FIG. 1A(1) there is only one storage room, in other embodiments there may be multiple storage rooms and/or other storage areas in addition to the storage room 16.

Door 18 may be the door to the storage room 16. Lock 20 may be an electronic lock that is controlled by kiosk 14. The delivery person interacts, e.g., via a touchpad, with the kiosk 14 (or optionally via tablet 12) to unlock lock 20, allowing the delivery person to place the package in storage room 16. Although in FIG. 1A(1), storage room 16 has rectangular shape, storage room 16 may have any shape.

Walls 22*a-e* are the walls of the storage room 16. Storage room 16 may also include a floor and a ceiling. Although there are five walls illustrated in FIG. 1A(1), in other embodiments, there may be any number of walls.

Bins 24 are optional and are just one example of storage receptacles that may be included in storage room 16. Shelves 26 are optional and are just one example of storage areas that may be included in storage room 16. Other storage receptacles 28 are optional and may include other types of storage receptacles that may be included in storage room 16.

After the delivery person places an item in storage room 16, optionally, a message may be sent to the recipient that an item has been delivered to the recipient in the storage room 16 and instructions to pick up the item from the storage room 16. Alternatively, the recipient may periodically check storage room 16 to determine whether any packages were delivered for the recipient. Upon notification or periodically, without notification, the recipient may interact directly, e.g., via a touchpad, with kiosk 14 (or optionally using a tablet 12 or cell phone) to cause lock 20 to unlock and allow the recipient to retrieve the item delivered.

The remainder of this specification discusses different embodiments and details of system 10.

FIG. 1A(2) shows a block diagram of an embodiment of a lock system 100*a* used for controlling electronic locks. In at least one embodiment, the lock system 100*a* includes at least door frames 101*a-n*, doors 102*a-n*, electronic locks 103 *a-n* that include body portions 104*a-n* and strike portions 105*a-n*, lines 106*a-n*, a control terminal 110, a lock interface 112, a line 113, user devices 130*a-n*, a line 131, and a network 140. In other embodiments, the lock system 100*a* may not include all of the components listed and/or may include other components in addition to or instead of those listed above.

FIG. 1A(2) illustrates an embodiment of a lock system 100*a* that controls opening and locking of a plurality of electronic locks. The lock system 100*a* receives a request from kiosk 14, from another terminal, or from a user device and in response opens electronic locks.

In at least one embodiment, at least one electronic lock locks at least one door to a storage room. The electronic lock(s) controls access to the storage room, and can be opened by electronic signals. In an embodiment, a delivery person may use a portable electronic device (e.g., IPAD, tablet, mobile device) to send a request to open the electronic lock, so as to delivery an item(s) in the storage room. An intended recipient of the item may also use an electronic device to send a request to open the electronic lock so as to pick up the item. In another embodiment, more than one storage room may be used and locked by more than one electronic lock. Throughout this specification, the terms "storage area," "room," and "storage room" may be substituted one for another to obtain different embodiments.

Door frames 101*a-n* are structures that surround doors, into which the doors are fitted. In an embodiment, the door frames 101*a-n* may be the portion of the wall that are adjacent to the doors and may be an integral part of the wall. In an embodiment, each of door frames 101*a-n* includes a portion to which hinges of a door are attached and thus the door can be locked shut. Each of the door frames 101*a-n* may also include one portion of a lock mechanism, which securely fastens the door closed. In at least one embodiment, door frames 101*a-n* enclose entrances into a storage room(s) that optionally includes storage area(s). In an embodiment, the door frame encloses two sides and one end of the door. For example, the door frame may have two upright members (e.g., door jambs, which may also be referred to as door posts) to which the door is secured, and an upper traverse member (e.g., a head or lintel) over the top of the door. In another embodiment, the door frame include structures that surround all edges of the door that fits into the door frame (e.g., as shown in FIG. 1A(2)). The two upright members and the upper traverse member are optional. In an embodiment, the door frames 101*a-n* are rectangular shaped. In other embodiments, the door frames 101*a-n* may have other structures and/or shapes.

Doors 102*a-n* are structures that serve to block off and prevent access, and allow access to, an entrance to a space (e.g., a room, a storage area, a receptacle, a locker, etc.). In at least one embodiment, the doors 102*a-n* includes at least a panel that swings on hinges or that slides or spins inside of the space. In at least one embodiment, each of the doors 102*a-n* connects to each of the door frames 101*a-n* on one side, respectively, while the opposite or other side of each door includes, or is connected to, a lock mechanism for securely fastening each of the doors 102*a-n* closed. In at least one embodiment, doors 102*a-n* include springs or other mechanical structures that mechanically bias the doors 102*a-n* to tend to stay in a closed position, so that doors 102*a-n* may close by themselves, if a user forgets to close one of doors 102*a-n*. In other embodiments, doors 102*a-n* may include door handles or other structures.

In an embodiment, one or more electronic locks are installed on one or more doors for controlling access to at least one storage room (or a space or location). In an embodiment, a door opened by a delivery person does not have to be the door opened by a recipient who picks up the delivered item, but instead there may be one door for the delivery person and a different door for the users.

Electronic locks 103*a-n* are electronic fastening devices for locking the doors 102*a-n*, respectively. In at least one embodiment, the electronic locks 103*a-n* use magnets, solenoids, and/or motors to actuate the electronic lock mechanism by either supplying or removing power. The electronic locks 103*a-n* may be any sort of locks including, but not limited to, one of, or any combination of, electronic locks that require a password or code to be opened, electronic locks having a scanner that require a particular barcode, pattern, and/or fingerprint to be scanned to open, electronic locks that receive instructions via wireless signals (e.g., radio signals, audio signals, etc.). In at least one embodiment, the electronic locks 103*a-n* lock the doors 102*a-n*, respectively, when the room(s) is not in use. In another embodiment, the electronic locks 103*a-n* are left open when the room is not in use. In at least one embodiment, each of the electronic locks 103*a-n* may include two portions, one portion is mounted to the door and the other portion is mounted to the door frame or receptacle wall. The two portions of the electronic lock may engage with or be released from the other portion so as to block and allow access to the entrance. In at least one embodiment, the electronic locks 103*a-n* include keypads and/or screens that allow a user to enter a password or key code, and/or to access the lock system 100*a*. In at least one embodiment, when the password or key code entered by the user matches the predetermined key code or password, the electronic locks 103*a-n* are unlocked and the doors 102*a-n* may be opened. In at least one embodiment, the electronic locks 103*a-n* may be automatically locked when the doors 102*a-n* are closed, or may include a button or mechanism to lock electronic locks 103*a-n*, respectively. In an embodiment, the electronic locks 103*a-n* may indicate that the electronic locks 103*a-n* are locked, by whether or not a light signal is on (or by the color of the light), for example. Alternatively, or additionally, a sound may be emitted, such as a buzz when the lock is locked or unlocked. In an embodiment, the electronic locks 103a-n are electronically controlled by a lock interface 112 or a control terminal, which may communicate with each of the electronic locks 103a-n for controlling locking or unlocking of the electronic locks 103a-n. In an embodiment, the electronic locks 103a-n are equipped with buzzers that produces buzzing noise when the electronic locks 103a-n are unlocked. Optionally, in addition to the electronic control mechanism, the electronic locks 103a-n may include structures that allow the electronic locks 103a-n to be opened using physical objects such as keys, cards, and/or tokens, for example. In other embodiments, the electronic locks 103a-n may include other structures.

In an embodiment, each of the electronic locks 103a-n include one portion installed in the doors 102a-n and another portion in the door frames 101a-n, which together, when electronic locks 103a-n are locked, hold the doors 102a-n locked in the door frames 101a-n, respectively. In an embodiment, the electronic locks 103a-n may include body portions installed in the doors 102a-n that may physically engage the strike portions installed in the frames 101a-n, respectively.

Body portions 104a-n are portions of the electronic locks 103a-n that are installed in the doors 102a-n, respectively. In at least one embodiment, the body portions 104a-n include protruding portions (e.g., bolts, latches, etc.) that extend beyond the side of the doors 102a-n into the strike portions in the frames 101a-n, respectively. In at least one embodiment, the protruding portions, when engage the strike portions in the frames 102a-n, securely holds the door 101a-n closed and locked. In an embodiment, retracting the protruding portions of the body portions 104a-n unlocks the electronic locks 103a-n. In another embodiment, moving a part of the strike portion that blocks the protruding portion of the electronic lock also unlocks the door. In an embodiment, knobs and/or other structures are connected to the body portions 104a-n.

In at least one embodiment, the body portions 104a-n are electronically controlled by the lock interface of the lock system 100a to lock and unlock the doors 102a-n, respectively. In at least one embodiment, the body portions 104a-n include magnets, solenoids, and/or small motors and actuators to hold the electronic locks 103a-n closed and to retract the protruding portions of the body portions 104a-n when receiving instruction signals from the lock interface, a keypad, a key card, or other remote-control devices. In an embodiment, the protruding portion is spring-loaded, and the spring can be compressed to push the protruding portion into the unlocked position so that the door can be closed when the electronic lock is locked. When the spring is released, the protruding portion snaps into the locked position to hold the door locked. In another embodiment, the protruding portion is not spring loaded (e.g., a dead bolt), and the door can be opened and closed only by retracting and extending the protruding portion.

Strike portions 105a-n are portions of the electronic locks 103a-n that are affixed to one side of the door frames 101a-n, respectively. In at least one embodiment, the strike portions 105a-n are lined up with the body portions 104a-n when the doors 102a-n are closed, respectively. In at least one embodiment, the strike portions 105a-n include receiving portions (e.g., holes, cavities, grooves, etc.) for receiving and holding the protruding portions of the body portions 104a-n securely in the frames 101a-n, respectively, so as to hold the doors 102a-n closed and locked. In an embodiment, the strike portions 105a-n protect the door frames 101a-n against friction from the protruding portions of the body portions 104a-n, respectively, and protect the part of door frames 104a-n that is covered by strike portions 105a-n.

In at least one embodiment, the strike portions 105a-n are electronically controlled by the lock interface of the lock system 100a to lock and unlock the doors 102a-n, respectively. In an embodiment, the strike portions 105a-n are electric strikes. For example, the strike portion may include a bar that presents a ramped surface to the latch or bolt of the body portion of the electronic lock, allowing the door to close and latch. The ramped surface of the strike portion can, upon command from the lock interface, pivot out of the way when the body portion on the door is in the locked position (without retraction of the latch or bolt) and the door is opened, allowing a user to open the door without operating a mechanical lock or using a mechanical key. In an embodiment, after the door is opened past the bar of the strike portion, the bar returns to the locked position (without pivoting out) and re-locks when power is removed or applied, depending upon the strike's configuration.

In at least one embodiment, the electric locks 103a-n may have various configurations such as, but not limited to, a fail-secure (or non-fail-safe) configuration (e.g., unlocking the door when the electric lock is energized) and a fail-safe (or fail-open) configuration (e.g., locking the door when the electric lock is energized). In a fail-secure (or non-fail-safe) configuration, applying electric current to the strike portion will cause the strike to unlock, and the strike would remain locked when power is removed (e.g., in a disconnection of power or a power failure). In an embodiment, the mechanical lock can still be used to open the door from the inside for egress from the secure side. The fail-secure configuration of the strike portion can be powered by alternating current or direct current. In a fail-safe (or fail-open) configuration, applying electric current to the strike portion will cause the strike to lock. In case of a power failure, the strike is unlocked and the door can be opened merely by being pushed or pulled. In an embodiment, the fail-safe configuration of the strike portion is operated with direct current. In an embodiment, the configurations of the strike portion of the electronic lock can be changed from secure-safe to fail-safe, and/or from fail-safe to secure-safe. In an embodiment, for the electronic lock with the spring-loaded protruding portion, the electric strike may be configured to become locked after the door is opened past the strike portion. When the door is closed, the spring of the protruding portion can be compressed and then released to extend the protruding portion in the receiving portion of the strike. In another embodiment, for the electronic lock with the dead-bolt, the electric strike may be configured to become locked after the door is closed and the protruding portion is inside the receiving portion of the strike.

Lines 106a-n communicatively link the electronic locks 103a-n to a lock interface for controlling the electronic locks 103a-n. In at least one embodiment, the lines 106a-n include physical cable or wires, or wireless connections.

Control terminal 110 is a terminal that connects to the lock interface for managing and/or controlling the opening and locking of the electronic locks 103a-n and thus controlling the access through the doors 102a-n. In at least one embodiment, the control terminal 110 is adapted to directly receive user input and/or receive signals, which may include requests, from a variety of devices, verify the requests and/or user authentication, and/or accordingly open one or more of the electronic locks 103a-n. In an embodiment, the control terminal 110 is communicatively connected to the lock interface via wired or wireless connections. The control terminal 110 may be optional.

In at least one embodiment, the control terminal 110 receives and verifies the requests to open one or more of the electronic locks 103a-n. In an embodiment, the control terminal 110 may verify the authentication of user (e.g., compare the entered user information with stored user data, compare password received at the kiosk 14—or optionally from the user device—with a predetermined stored password). If the request is determined to be valid, the control terminal 110 sends signals through the lock interface to the corresponding electronic locks to open the locks. If the request is determined to be invalid, the control terminal 110 may send a message to the kiosk or optionally to a user device to notify the user that the user information or the password is invalid. In an embodiment, the control terminal 110 may be a standalone device (e.g., a kiosk), a device mounted to a structure, or a device being a portion of, or connected to, another device or system (e.g., a storage system, an access system of a building). In at least one embodiment, the control terminal 110 may include, or be connected to, a server for recording and managing user data and/or user accounts, verification of user authentication, managing and/or updating passwords, managing the usage of the spaces locked by the electronic locks 103a-n, for example.

Lock interface 112 is a device and/or a system that is communicatively connected to each of the electronic locks 103a-n. In at least one embodiment, the lock interface 112 receives and/or transmits wireless signals (e.g., WI-FI signals, near field communication signals, Bluetooth signals, facsimile, audio signals, radio signals, infrared communication signals, etc.). In another embodiment, the lock interface 112 may also include input devices for directly receiving user input. In an embodiment, the lock interface 112 directly receives requests from user devices. In another embodiment, the lock interface 112 receives instructions from the control terminal 110. In at least one embodiment, the lock interface 112 includes a controller with circuits for directing and controlling signals received from the control terminal 110 and controls each of the electronic locks 103a-n. In at least one embodiment, the lock interface 112 is connected to each of the electronic locks 103a-n by cables or wires, or via wireless connections. Signals sent from the lock interface 112 to the electronic locks 103a-n may lock and unlock the electronic locks 103a-n, based on the entry of user information and/or a password. Throughout this specification, the terms "password," "pass code," "key code," "access code," and "entry code" are used interchangeably, and may be substituted one for another to obtain different embodiments. Throughout this specification, the terms "user," "customer," "recipient," and "intended recipient" are used interchangeably and may be substituted one for the other in this specification to obtain different embodiments.

Line 113 communicatively links the lock interface 112 to the network for transmitting signals between the lock interface 112 and the user devices.

User devices 130a-n may include various electronic devices that are used by the users to communicate with the lock system 100a. The user devices 130a-n are optional and the user (e.g., delivery person, intended recipient) may directly interact with a kiosk or a terminal. In at least one embodiment, the user devices may include, but are not limited to, smart phones, PDA (Personal Digital Assistant), tablets, laptops, remote controllers, and personal computers. In at least one embodiment, the optional user devices 130a-n include at least signal transmitters and/or receivers for sending and/or receiving signals. In an embodiment, the optional user devices 130a-n communicate with the lock system 100a, via wireless signals. For example, the user may use a tablet (e.g., an IPad) to communicate with the lock system 100a. In an embodiment, the optional user devices 130a-n communicate with the lock interface 112 or control terminal 110, via the Internet, mobile network, and/or other networks. In at least one embodiment, a user device may send, via the network, to the lock interface 112 or control terminal 110, signals that include a request to open at least one of the electronic locks 103a-n. The user device may also send user authentication information and/or a password to the lock interface 112 or control terminal 110.

Line 131 communicatively links the optional user devices 130a-n to the network for transmitting signals between the optional user devices 130a-n and the lock interface 112 or control terminal 110.

Network 140 may be any one or any combination of one or more Local Area Networks (LANs), Wide Area Networks (WANs), wireless networks, telephone networks, and/or other networks. In at least one embodiment, the network 140 may be used by the optional user devices 130a-n, lock interface 112, the control terminal 110, and/or other devices to communicate with one another regarding opening and/or locking of electronic locks 103a-n and authorizing access to the room(s), which optionally includes storage area(s) behind doors 102a-n.

FIG. 1B shows a cross-sectional top view of an embodiment of an electronic lock 100b in a locking position. Electronic lock 100b includes at least a body portion 150 that includes a latch 152, and a strike portion 154, which includes at least a stop plate 156, a strike cavity 158, a keeper 160, a ramped surface 161, a pivot 162, a spring 163, an arm 164, a bar 166, a catch 168, a pivot 170, a pivot pin 172, a shaft 174, and a solenoid 176. In other embodiments, the electronic lock 100b may not include all of the components listed and/or may include other components in addition to or instead of those listed above.

FIG. 1B shows a cross sectional view of an electronic lock that can be used as the electronic lock 103a-n of FIG. 1A(2). In at least one embodiment, the electronic lock 100b may be normally in locked position or normally in the unlocked position, depending on the configuration.

Body portion 150 may be an embodiment of the body portions 104a-n, which were discussed in conjunction with FIG. 1A(2). In at least one embodiment, the body portion 150 is installed on one side of a door and may engage with a strike portion on the door frame to lock the door.

Latch 152 is a latch that protrudes from the body portion 150 and extends beyond the side of the door to engage with the strike portion. In at least one embodiment, the latch 152 may be retracted by rotating/moving knobs and/or other structures that are connected to the body portion 150. In an embodiment, the latch 152 may be replaced by other protruding structures such as a bolt. In an embodiment, the latch 152 is spring loaded such that the latch 152 can be compressed into an unlocked position. In another embodiment, the latch 152 is not spring loaded (e.g., a dead bolt). In an embodiment, the latch 152 may include both a spring loaded portion and a dead bolt.

Strike portion 154 may be an embodiment of the strike portions 105a-n, which were discussed in conjunction with FIG. 1A(2). In at least one embodiment, the strike portion 154 includes a housing that is attached to the door frame.

Stop plate 156 is a plate on one side of the strike portion 154 to prevent the latch 152 of the body portion 150 from moving past the stop plate 156. In an embodiment, the stop plate 156 blocks one side of a strike cavity so that access to the strike cavity is from the other side.

Strike cavity 158 is a space in the strike portion 154 that receives and holds the latch 152 when the door is closed. In an embodiment, the strike cavity 158 is between the stop plated 156 and a keeper that securely holds the latch 152 inside the strike cavity 158 when the electronic lock 100b is locked.

Keeper 160 is a bar that blocks the latch 152 from moving out of the strike cavity 158 when the keeper is in a locking position. In an embodiment, the keeper 160 is pivotally connected to the housing of the strike portion 154 and may pivot out of the way upon command, allowing the latch 152 ((without retraction of the latch 152) to move out of the strike cavity 158 and the door is opened. In an embodiment, after the door is opened past the keeper 160, the keeper 160 returns to the locked position (without pivoting out) and re-locks when power is removed or applied, depending upon the strike's configuration.

Ramped surface 161 is a ramped surface on one end of the keeper 160, facing away from the strike cavity 158. In an embodiment, the ramped surface 161 is presented to the latch 152 such that the latch 152 (e.g., a spring loaded latch) is forced to be retracted, allowing the door to close and latch. When the latch 152 is past the keeper 160, the spring loaded latch is released and snaps into the strike cavity 158.

Pivot 162 is a pivot that is fastened to the housing of the strike portion 154, on which the keeper 160 is mounted and may rotate about the pivot 162.

Spring 163 is a spring mounted on the pivot 162, biasing the keeper 160 to stay parallel to the stop plate 156 in a locked position.

Arm 164 is a structure that extends from the other end of the keeper 160, opposite to the ramped surface 161. In an embodiment, the arm 164 is perpendicular to the keeper 160, facing the strike cavity 158. In an embodiment, the arm 164 may engage with a catch structure that prevents the arm 164 and keeper 162 from rotating clockwise (as shown in FIG. 1B).

Bar 166 is a bar or plate that is pivotally connected to the housing of the strike portion 154. Catch 168 is a wedge or a hook attached on one end of the bar 166 facing the arm 164. In an embodiment, when the electric lock 100b is in a locking position, the catch 168 blocks the arm 164 from rotating clockwise, thus holding the keeper in a locked position. When in an unlocking position, the bar 166 and catch 168 pivots away from the arm 164, allowing the arm to rotate clockwise and the keeper 160 to pivot out of the way when the latch 152 moves out of the strike cavity 158.

Pivot 170 is a pivot that is fastened to the housing of the strike portion 154. The bar 166 is mounted on the pivot 170 and rotates about the pivot 170.

Spring 171 is a spring mounted on the pivot 170, biasing the bar 166 to stay in a locking position where the catch 168 blocks the arm 164.

Pivot pin 172 is a pivot pin that is inserted through a hole at the other end of the bar 166, away from the catch 168. The pivot pin 172 is connected to one end of a shaft that is controlled by a solenoid.

Shaft 174 is a shaft connected to the solenoid 176 that, when actuated by electrical current, causes the shaft 174 to move toward the solenoid 176. In an embodiment, the solenoid 176 includes coils that form an electromagnet that convert electric energy to the motion of the shaft 174. In an embodiment, the solenoid 176, when actuated by electrical current, retracts the shaft 174 and thus causes the bar 166 to rotate counter-clockwise, and thereby moving the catch 168 away from the arm 164, allowing the arm 164 and keeper 160 to pivot out of the way when the latch 152 is unlocked (without retracting the latch 152) from the strike cavity 158. When the electrical current to the solenoid 176 is turned off, the spring 171 causes the bar 166 (and shaft 174) to return to the original locked position such that the catch 168 blocks the arm 164 from rotating clockwise, and thereby the keeper 160 remains in the locking position and securely holds the latch 152 in the strike cavity 158.

Figure 1C:
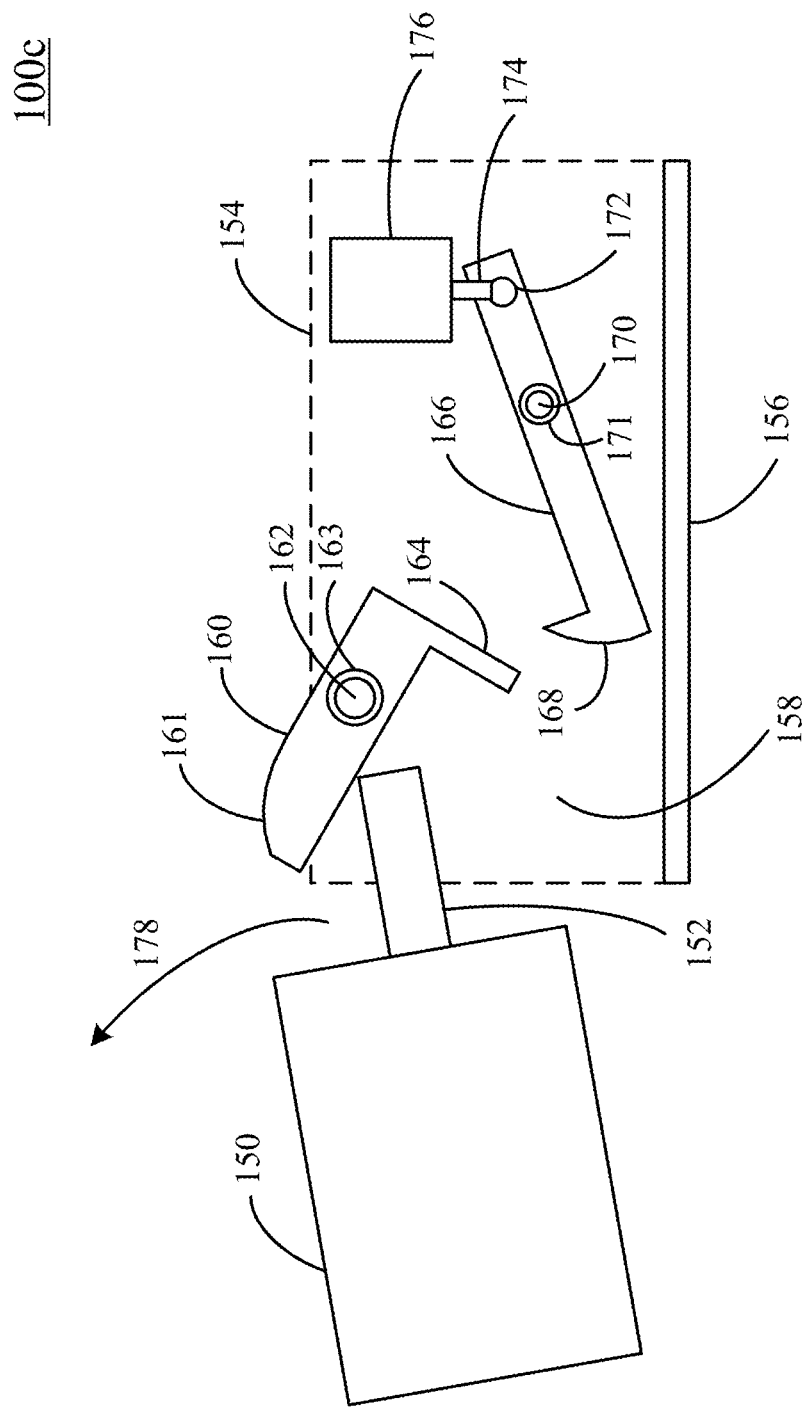
FIG. 1C shows a cross-sectional top view of an embodiment of the electronic lock of FIG. 1B in an unlocking position.

FIG. 1C shows a cross-sectional top view 100c of an embodiment of the electronic lock 100b of FIG. 1B in an unlocked position. FIG. 1C shows at least the body portion 150, latch 152, strike portion 154, stop plate 156, strike cavity 158, keeper 160, ramped surface 161, pivot 162, spring 163, arm 164, bar 166, catch 168, pivot 170, pivot pin 172, shaft 174, and solenoid 176. FIG. 1C also shows an arrow 178. In other embodiments, the assembly in diagram 100c may not include all of the components listed and/or may include other components in addition to or instead of those listed above.

FIG. 1C shows a view of a transitional state that occurs when releasing the latch 152, which thereby unlocks the door, using the electric lock 100b, which is controlled to stay in the unlocked position.

Arrow 178 shows the direction in which the body portion 150 moves so as to open the door. In an embodiment, the solenoid 176 is actuated by electrical current, causing the shaft 174 to be retracted toward the solenoid 176, and therefore the bar 166 pivots to keep the catch 168 away from the arm 164 (and thus no longer blocks the arm from rotating clockwise). When the door is opened, the latch 152, without being retracted, pushes against the keeper 160, causing the keeper 160 to rotate about the pivot 162 and pivot out of the way, allowing the latch 152 to move away from the strike cavity 158. When the latch 152 is past the keeper 160, the spring 163 causes the keeper 160 to return to the original position.

Figure 2:
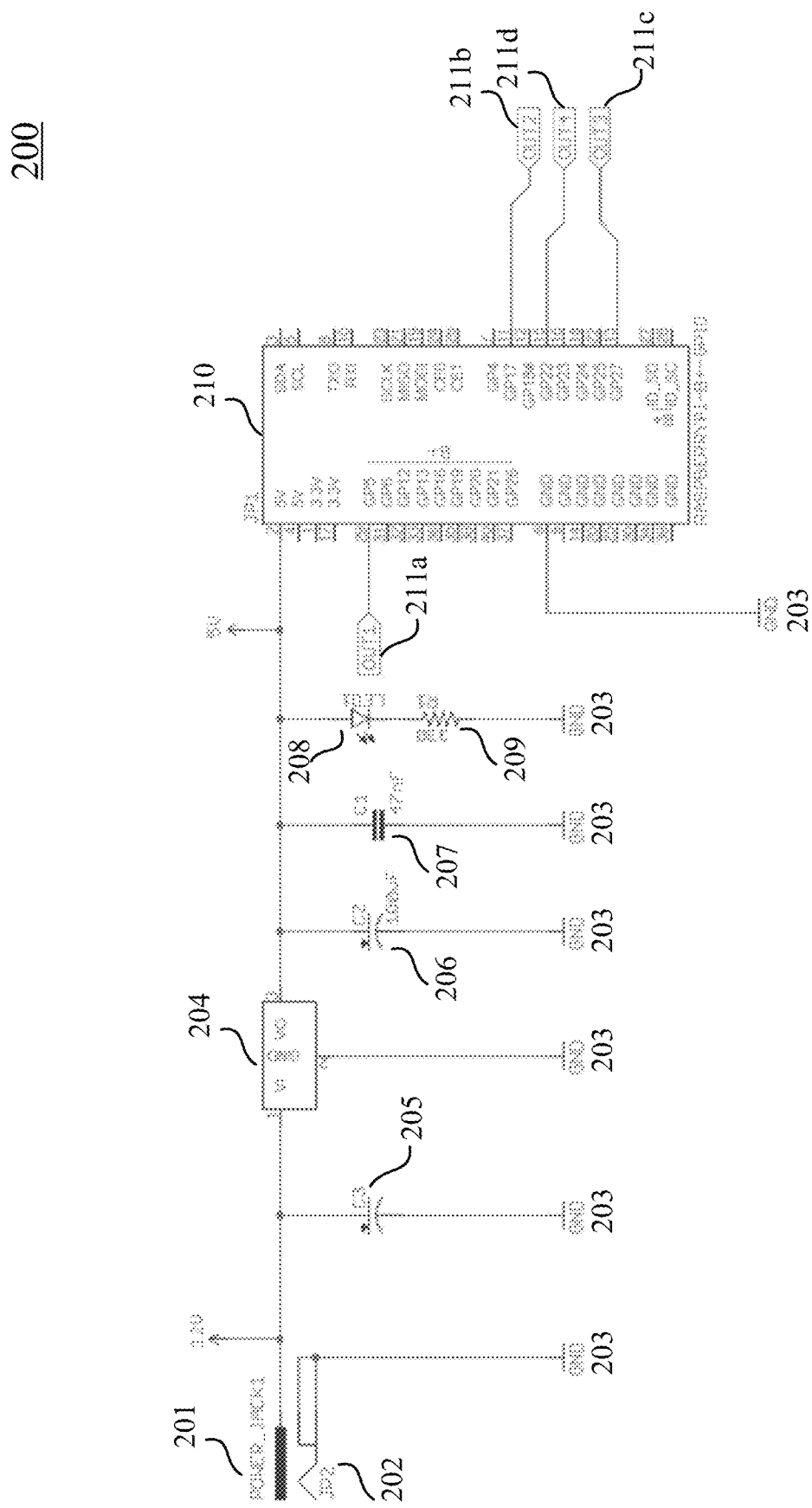
FIG. 2 shows a block diagram of an embodiment of a lock interface.

FIG. 2 shows a block diagram of an embodiment of a lock interface 200. Lock interface 200 includes at least a power source 201, a receiver 202, ground 203, a voltage converter 204, capacitors 205, 206, and 207, a light 208, a resistor 209, a processor 210, and output signals 211a-d. In other embodiments, the lock interface 200 may not include all of the components listed and/or may include other components in addition to or instead of those listed above.

Lock interface 200 may be used as the lock interface 112 of FIG. 1A(2). Lock interface 200 provides an interface for the kiosk 14 or optionally a user device to interact with the locks 103a-n.

Power source 201 provides electric power as an input into a processor of the lock interface 200. In another embodiment, the power source 201 provides direct current (DC). In an embodiment, the power source 201 provides a voltage of 12 volts (V) to the lock interface 200.

Receiver 202 is a signal receiver that is used to pick up signals that may be transmitted from the kiosk 14 or optional user devices 130a-n. In an embodiment, the receiver 202 is an antenna. In an embodiment, receiver 202 recognizes Wi-Fi signals sent by the kiosk 14 or optional user devices 130a-n and transmit to the processor.

Ground 203 is a common return path for electric current, serving as constant potential reference point from which voltages are measured.

Voltage converter 204 may be an electrical transformer, a linear regulator, a switched mode DC-to-DC converter, or other voltage converter that changes the voltage of the signal. In an embodiment, the voltage converter 204 converts a 12V signal to 5V signal. In one embodiment, the voltage converter 204 may be a transformer.

Capacitors 205 and 206 are passive two-terminal electrical components. In an embodiment, the capacitors 205 and 206 filter and smoothen the signal coming into the processor. Capacitor 205 filters the signal received (removing at least some of the noise introduced while sending, transmitting and receiving the signal) prior to changing the voltage, so that the signal to noise ratio of the signal coming from the voltage converter 204 is lower than the signal to noise ratio would be had the signal not been filtered. Capacitor 206 filters the signal coming from the voltage converter 204, removing noise introduced by the voltage converter 204. In an embodiment, the capacitors 205 and 206 are electrolytic capacitors that are polarized due to the asymmetrical construction. In an embodiment, the anode electrode (+) of the capacitors 205 and 206 are made of a special metal on which an insulating oxide layer originates by anodization (forming), which acts as the dielectric of the electrolytic capacitor. Due to the asymmetrical construction, the capacitors 205 and 206 may only be operated with a higher voltage on the anode than on the cathode at all times (e.g., as shown in FIG. 2, the voltage on the anode of capacitor 205 is 12V (5V on the anode of capacitor 206) while the cathode is connected to ground 203,). In at least one embodiment, the capacitors 205 and 206 have higher capacitance compared to regular symmetrical capacitors of the same size, and thus are particularly suitable for passing or bypassing a large range of frequencies, from low-frequency signals up to some mega-hertz and storing large amounts of energy.

Capacitor 207 is a capacitor that does not have a polarity and thus can be mounted either way. In an embodiment, the capacitor 207 has smaller capacitance than the polarized capacitors 205 and 206. In an embodiment, the capacitor 207 serves to further filter and smoothens the signal coming into the processor. Optionally, capacitors 206 and 207 could be replaced with a single capacitor having a capacitance that is the sum of the values of the capacitances of capacitors 206 and 207.

Light 208 serves as an indicator indicating the working status of the lock interface 200. In an embodiment, on and off of the light 208 may indicate the signal on and off. In an embodiment, the light 208 is a light-emitting diode (LED).

Resistor 209 is a passive two-terminal electrical component that implements electrical resistance as a circuit element. In an embodiment, the resistor 209 is connected in series to limit the current flow through the light 208 so as to protect the light 208 from receiving too much current and damaging the light 208.

Processor 210 is a processor that controls the electronic locks 103a-n. Optionally, processor 210 verifies requests to unlock locks. In an embodiment, the processor 210 includes and/or is connected to at least a memory system. In an embodiment, the processor 210 is a microcontroller that includes at least a microprocessor that is connected to a memory system. In at least one embodiment, the processor 210 receives signals that are picked up by the signal receiver 202 and analyzes the information carried by the signals to determine which lock(s) to lock or unlock. For example, each lock may be assigned an identifier, and processor 210 may be configured to recognize two commands—one for locking a door and one for unlocking a door. Processor 210 may analyze an incoming signal to determine, which part of the signal represents the identifier and which part represents the command. The processor 210 may analyze the identifier to determine which lock was identified and analyzed the command to determine which command was received. Optionally, processor 210 may also check security codes, such as passwords, and user identification to determine whether the user sending the command is authorized to access the lock identified. For example, a request may include user authentication information, password, identifier(s) of electronic lock(s), etc. The processor 210 may be configured to verify the request by authenticating user information and/or determining whether the password carried by the signal matches the predetermined password. If the request is verified, the processor 210 is configured to output a signal, via one of the output ports to one of the electronic locks 103a-n that the request intends to open. In an embodiment, if a request is determined to be invalid, the processor 210 may output a signal to a transmitter circuit to send a message back to the kiosk 14 or optionally the user device to notify the user that the authentication information or the password is invalid. Alternatively or additionally, the authentication of the user may be performed elsewhere, such as by the control terminal 110, a server that is communicatively connected to the lock interface 200, kiosk 14, or control terminal 110, or the user device sending the signal.

Output signals 211a-d are sent by the processor 210 to open corresponding electronic locks. In an embodiment, the output signals 211a-d may be sent at the same time to open the corresponding electronic locks simultaneously. In another embodiment, one or some of the output signals 211a-d may be sent out in response to the request. In yet another embodiment, none of the output signals 211a-d are sent if the request is determined to be invalid. Although four output signals are illustrated in FIG. 2, it should be understand that the processor 210 may transmit another number of output signals to control another number of electronic locks.

Figure 3:
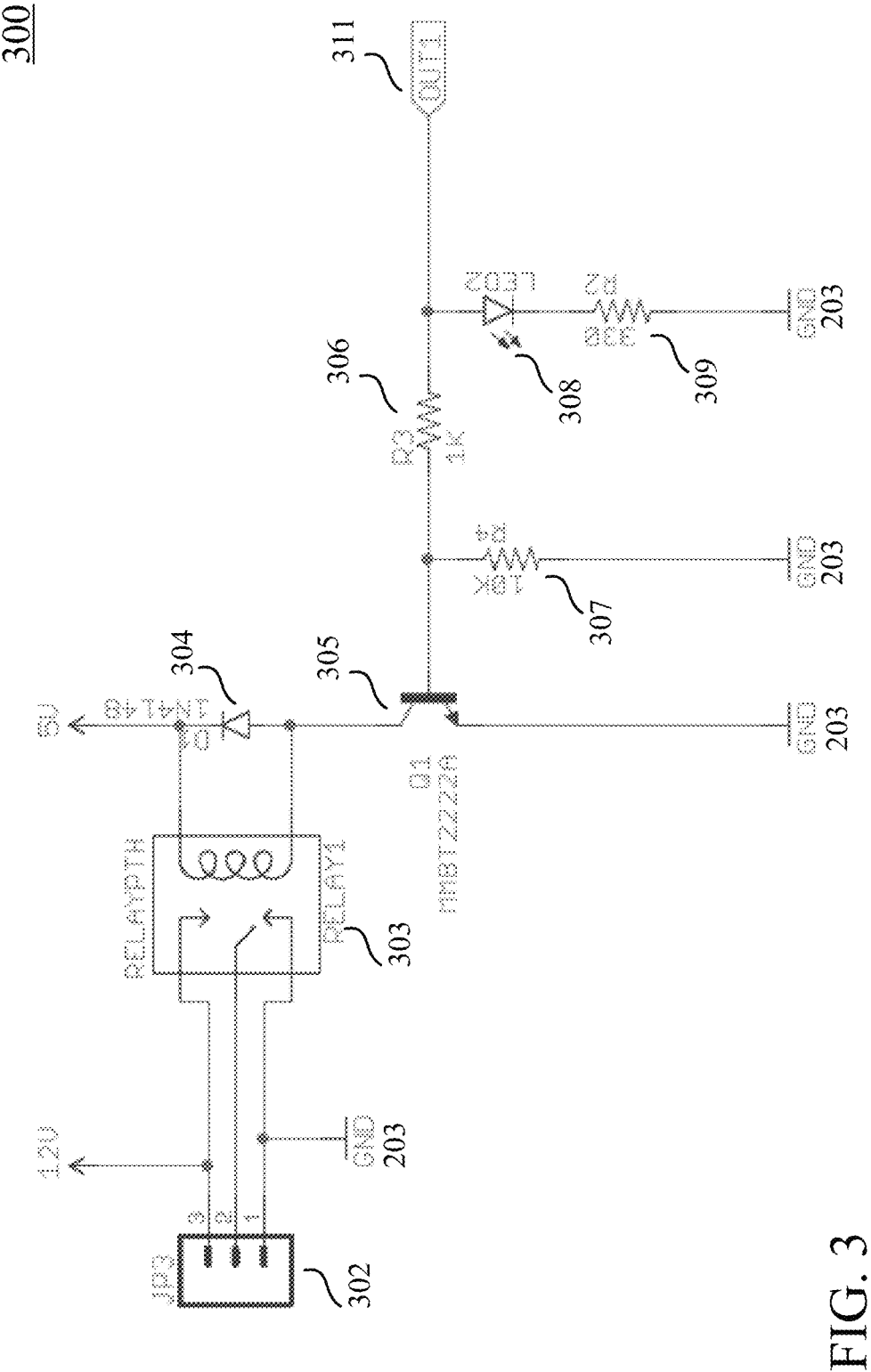
FIG. 3 shows a block diagram of an embodiment of a circuit that may be included in the electronic lock of FIG. 1A(2)

FIG. 3 shows a block diagram of an embodiment of a circuit 300 that may be included in the electronic locks 103a-n of FIG. 1A(2). The circuit 300 includes at least ground 203, a connector 302, an electrical switch 303, a light 304, a transistor 305, resistors 306, 307, and 309, a light 308, and an output signal 311. In other embodiments, the circuit 300 may not include all of the components listed and/or may include other components in addition to or instead of those listed above.

Connector 302 is a connector that connects to the electronic lock mechanism to control the locking and opening of the electronic lock. In an embodiment, the connector 302 is connected to the solenoid 176 of the strike portion 154 of the electronic lock 100b to control the electric strike. In another embodiment, the connector 302 is connected to the body portion of the electronic lock to control the bolt or latch of the electronic lock. In an embodiment, the connector 302 includes three pins, one of which is connected to ground 203.

Electrical switch 303 is an electrical switch that controls the connection and disconnection of the electric lines to the connector 302. In an embodiment, the electrical switch 303 includes a relay (as shown in FIG. 3) that may be controlled by the current flow through the coil of the relay to change the position/state of the relay. In an embodiment, connecting the relay to the upper terminal and thus to the 12V power source as shown in FIG. 3 causes a current to flow into the connector 302. Connecting the relay to the lower terminal and thus to ground as shown in FIG. 3 disconnects the current from the connector 302. In this specification, the terms "switch," "electrical switch," and "relay" are used interchangeably, and may be substituted one for another to obtain different embodiments. In at least one embodiment, the switches in this specification may include, but are not limited to, electronic relays, transistors (and/or other semiconductor switches or threshold devices), electromagnetic switches, current switches, and/or voltage switches.

Diode 304 is a two-terminal electronic component that conducts electricity primarily in one direction. In an embodiment, diode 304 protects the rest of the circuit from voltage spikes that may be caused by electrical switch 303. When the circuit is closed, the current from the voltage source is prevented from bypassing electrical switch 303 by diode 304, thereby forcing the current through electrical switch 303, activating electrical switch 303. If electrical switch 303 is a relay having a coil that generates a magnetic field to change the state of the relay, when the circuit is opened, the coils in electrical switch 303, the inductance of the coils of electrical switch 303 prevents a sudden change in the current, and (were diode 304 not present) would cause a large voltage build up, which could burn out other components in the circuit. With diode 304 present, when the circuit is broken, the current that flows through the coils of electrical switch 303 current may then flow through diode 304, in the reverse direction, returning to the end of electrical switch 303 that is connected to the 5V power source, and again flow through the coils of electrical switch 303. Since the current exiting electrical switch 303 has some place to flow (which is through diode 304), the voltage does not continue to build up, thereby protecting the rest of the circuit from the voltage build up.

Transistor 305 a semiconductor device used to switch and/or amplify the voltage. In an embodiment, the transistor 305 controls electric current flow through the coil of the electrical switch 303. In at least one embodiment, the transistor 305 includes semiconductor material with at least three terminals for connection to an external circuit. In an embodiment, as the base voltage of the transistor 305 rises (e.g., in response to the signal received from the processor 210), the emitter and collector currents rise exponentially, allowing electric current to flow from the supply voltage to the electrical switch 303, through the transistor 305 and to ground 203. Transistor 305 acts as an electronic switch that either connects or disconnects electronic switch 303 to ground. When transistor 305 is turned on (as a result of the bias current being above a particular threshold), electronic switch 303 is connected to ground, so that current flows from the 5V power source through electronic switch 303 to ground, activating electronic switch 303. When transistor 305 is turned off (as a result of the bias current being below the threshold), since electronic switch 303 is disconnected from ground, no current flows through electronic switch 303, and electronic switch 303 is not activated. As a result of using transistor 305, a current from the processor may be used to produce the bias current that opens and closes the transistor 305, which may be of a significantly lower voltage than the voltage needed to activate the electronic switch 303. Transistor 305 is protected, by the presence of diode 304, from voltage buildups that may otherwise occur when the current path from the 5V power source to ground is broken, because diode 304 provides a place where current exiting electrical switch 303 can flow.

Resistor 306 acts to reduce current flow to the base of the transistor 305 and, at the same time, acts to lower the voltage added to the base of the transistor 305. Resistor 307 fixes the bias voltage to be the same as the voltage across resistor 307, so that the current flowing from the collector to the emitter changes linearly with changes in the current from base to emitter. Resistor 307 and resistor 306 act as a voltage divider, which sets the operating voltage at which the transistor 305 operates. Resistors 306 and 307 may be chosen so that the operating point of transistor 305 is in the saturation region or in the cutoff region, so that transistor 305 operates as a switch in which a small change in the bias current creates a relatively large change in the collector to emitter current. In the embodiment of FIG. 3, resistors 306 and 307 are chosen so that transistor 305 is in the cutoff region.

Light 308 is similar to the light 208, which was discussed in conjunction with FIG. 2. In an embodiment, the light 308 is an LED that shows the working status of the electronic lock. In an embodiment, when signal is received at the electronic lock from the processor 210, the light 308 lights up as current flows through the light 308.

Resistor 309 is similar to the resistor 209, which was discussed in conjunction with FIG. 2. In an embodiment, the resistor 209 is connected in series to limit the current flow through the light 308, protecting light 308.

Output signal 311 is a signal that is received by the circuit 300 from the processor 210 (FIG. 2) for opening a corresponding electronic lock, which may be in response to the signal received at receiver 202. In at least one embodiment, when the output signal 311 sent by the processor 210 reaches the circuit 300, the light 308 lights up and a current flows to the base of the transistor 305, which allows a current to flow between ground 203 and the high voltage source and therefore through the coils of the electrical switch 303. As a result, the state/position of the electrical switch 305 is changed and the corresponding electronic lock that is connected to the connector 302 is opened.

Figure 4A:
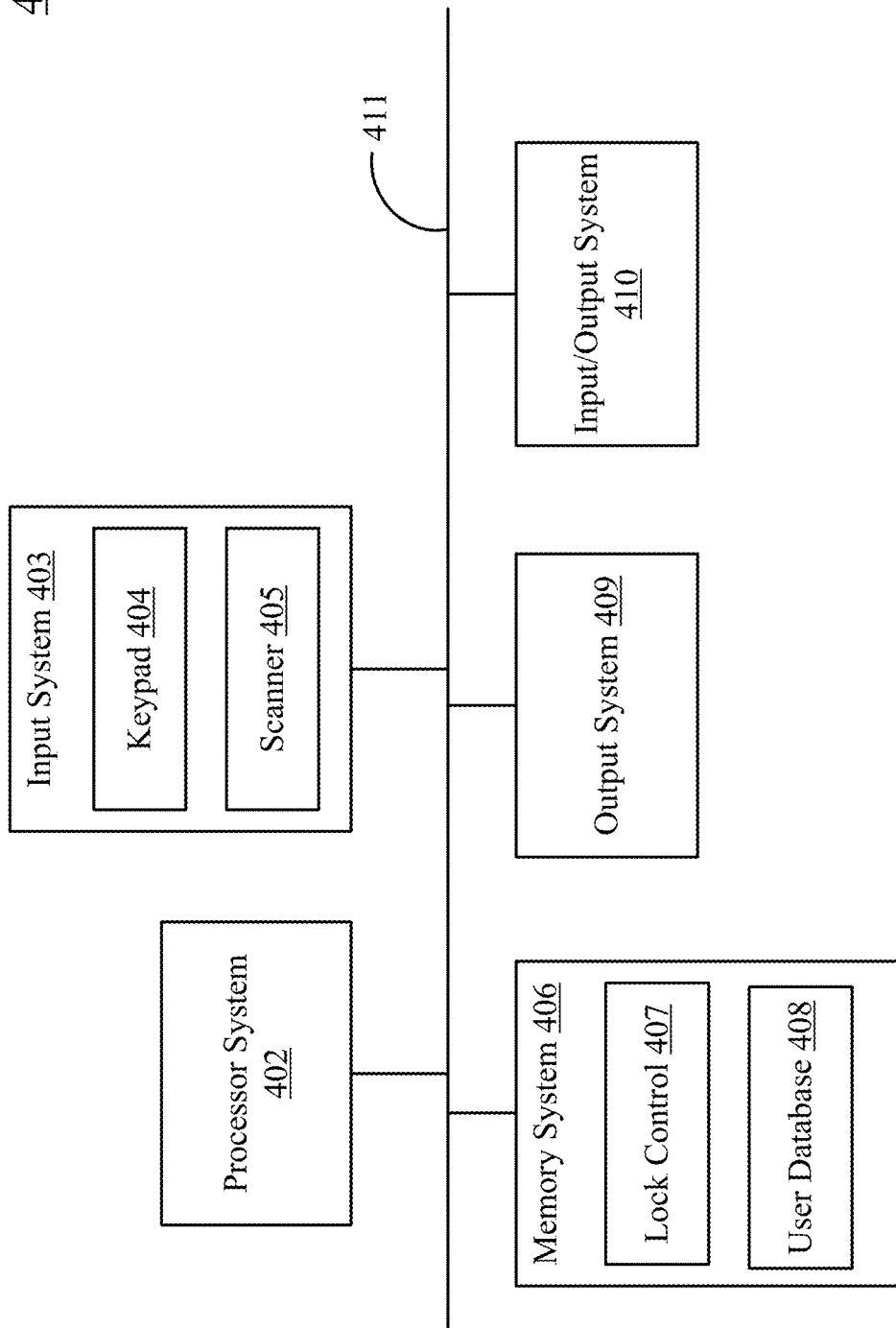
FIG. 4A shows a block diagram of an embodiment of a computer system that may be used as the kiosk, lock interface, or control terminal of FIGS. 1A(1) and/or 1A(2)

FIG. 4A shows a block diagram of an embodiment of a computer system 400 that may be used as the lock interface 112 or the control terminal 110 of FIG. 1A(2). The computer system 400 may include a processor system 402, an input system 403 that includes at least a keypad 404 and a scanner 405, a memory system 406 that includes at least a lock control 407 and user database 408, an output system 409, a communications system 411, and an input/output system 410. In other embodiments, computer 400 may not include all of the components listed and/or may include other components in addition to or instead of those listed above.

Processor system 402 may include any one of, some of, any combination of, or all of multiple parallel processors, a single processor, a system of processors having one or more central processors and/or one or more specialized processors dedicated to specific tasks. In an embodiment of computer system 400 that is used as the lock interface 112, processor system 402 may implement machine instructions stored in the memory system of the lock interface, such as software for communicating with the optional user devices 130a-n and/or electronic locks 103a-n, software for authenticating user information and/or password, managing and controlling the electronic locks 103a-n, etc. In an embodiment of computer system 400 that is used as the control terminal 110, the processor system 402 may implement machine instructions stored in the memory system of the control terminal, such as software for receiving input from the user, authenticating user information and/or password, sending instructions to the lock interface 112, and managing information about users and/or electric locks 103a-n.

Input system 403 may include any one of, some of, any combination of, or all of a keyboard system, a mouse system, a track ball system, a track pad system, buttons on a handheld system, a scanner system, a microphone system, a connection and/or interface to a sound system, and/or a connection and/or interface to a computer system, a connection and/or interface to an intranet, and/or a connection and/or interface to an internet (e.g., IrDA, USB), for example. In an embodiment of computer system 400 that is used as the control terminal 110, the input system 403 may further include a keypad 404 and/or a scanner 405. In an embodiment of computer system 400 that is used as the lock interface 112, the input system 403 may include receivers for receiving wireless signals from the kiosk 14 or optional user devices 130a-n. The keypad 404 and/or scanner 405 may be optional for the lock interface 112.

Keypad 404 is a keypad that facilitates entering a password or pass code for unlocking at least one of the electronic locks 103a-n. Keypad 404 may include a touchpad. In at least one embodiment, the keypad 404 may be part of the control terminal or lock interface or a separate keypad that is connected to the control terminal or lock interface via a cable or wire, or via wireless connection. In another embodiment, each of the doors 102a-n and/or wall of the room (or receptacles of storage areas) may include a keypad 404 mounted on the door or close to the door (e.g., on the door frame, in a room or entrance area in front of the door, or one the wall near the door), and the user may walk up to the door or other location of the key pad to key in the password or pass code. Alternatively, a user may use a touch sensitive screen to enter information into the lock system.

Scanner 405 is a scanner device that is used to scan barcodes or other patterns that are printed on a card or a label, or are shown on a screen of a mobile device. Scanner 405 is optional. In at least one embodiment, scanner 405 scans the barcodes or patterns and uploads the barcode or pattern that was scanned to the control terminal or lock interface and/or the server that the control terminal or lock interface is communicatively connected with, which recognize the barcodes or patterns and may retrieve information optionally from a database in the control terminal or lock interface, or the server. In other embodiments, scanner 405 includes other structures and/or functions.

Memory system 406 may include, for example, any one of, some of, any combination of, or all of a long term storage system, such as a hard drive; a short term storage system, such as random access memory and/or flash memory; and/or a removable storage system, such as a floppy drive or a removable drive. Memory system 406 may include one or more machine-readable mediums that may store a variety of different types of information. The term "machine-readable medium" is used to refer to any nontransitory medium capable of carrying information that is readable by a machine. One example of a machine-readable medium is a computer-readable medium. Another example of a machine-readable medium is paper having holes that are detected that trigger different mechanical, electrical, and/or logic responses.

In an embodiment of computer system 400 that is used as the lock interface 112, memory system 406 stores software for communicating with the kiosk 14, optional user devices 130a-n and/or electronic locks 103a-n. In at least one embodiment, memory system 406 stores software that may include machine instructions for authenticating user information and/or password, managing and controlling the electronic locks 103a-n, for example. In at least one embodiment, memory system 406 may further include a lock control 407 and user database 408. In an embodiment of computer system 400 that is used as the control terminal 110, memory system 406 stores software for receiving user input, authenticating user information and/or password, communicating with the lock interface, etc.

Lock control 407 includes instructions and/or algorithms for controlling and managing the locks 103a-n. In at least one embodiment, lock control 407 receives a request to open an electronic lock that locks a designated door. In an embodiment, the request is received at the kiosk 14 or optionally from the optional user devices 130a-n via wireless signals or from user input via the input system 403 or an input/output system. In at least one embodiment, lock control 407 receives a confirmation that the electronic lock is locked after the user closes the door. In at least one embodiment, the lock control 407 records the identifiers of the electronic locks 103a-n, the time of locking and unlocking of each electronic lock, the location of each of the electronic locks 103a-n, etc. In at least one embodiment, lock control 407 receives a password entered by a user and/or a request to open a designated electronic lock. In at least one embodiment, lock control 407 authenticates the user by comparing the entered password with the predetermined password. If the entered password matches the predetermined password, the lock control 407 sends a signal to the designated electronic lock to open the electronic lock. If the entered password and the predetermined password do not match, access is denied and the lock control 407 sends a message to notify the user that the password is invalid. In an embodiment, the lock control 407 may include an option to require a signature prior to opening an electronic lock and/or to require only certain people provide a signature to open the lock. If the signature is required, the lock control 407 will not open the electronic lock until the user enters a signature. In an embodiment, the lock control 407 may receive password and/or electronic signature transmitted from the kiosk 14 or optional user devices 130a-n. Optionally, each electronic lock has (or is connected to) a keypad 404 or a panel for entering passwords, and the lock control 407 assigns and/or records a password to the electronic locks 103a-n. In at least one embodiment, when the user enters a password via the keypad 404 or the panel of the electronic lock, the electronic lock sends signals to the lock interface 112 or control terminal 110 and the lock control 407 authenticates the user (e.g., by authenticating a password and/or a signature) and returns a signal to the electronic lock to open or to deny access. In an embodiment of computer system 400 that is used as the control terminal 110, the lock control 407 of the control terminal sends signals to the lock interface 112 to control the electronic locks 103a-n.

User database 408 is a database that stores information about the users, such as which room(s) a particular user is authorized to use, information that identifies the user, and/or security information, such as passwords and/or copies of signatures. User database 408 may also keep a record of when a user accessed a room and which room the user accessed.

Output system 409 may include any one of, some of, any combination of, or all of a monitor system, a handheld display system, a printer system, a speaker system, a connection and/or interface system to one or more sound systems, a connection and/or interface system to one or more peripheral devices, a connection and/or interface system to one or more computer systems, a connection and/or interface system to one or more LANs, and/or a connection and/or interface system to one or more WANs, for example.

Input/output system 410 may include devices that have a dual function as input and output devices. For example, input/output system 410 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example.

Input/output system 410 is optional, and may be used in addition to or in place of output system 409 and/or input device 403.

Communications system 411 communicatively links processor system 402, input system 403, memory system 406, output system 409, and/or input/output system 410 to each other. Communications system 411 may include any one of, some of, any combination of, or all of electrical cables, fiber optic cables, and/or means of sending signals through air or water (e.g., wireless communications), or the like. Some examples of means of sending signals through air and/or water include systems for transmitting electromagnetic waves such as infrared and/or radio waves and/or systems for sending sound waves.

Figure 4B:
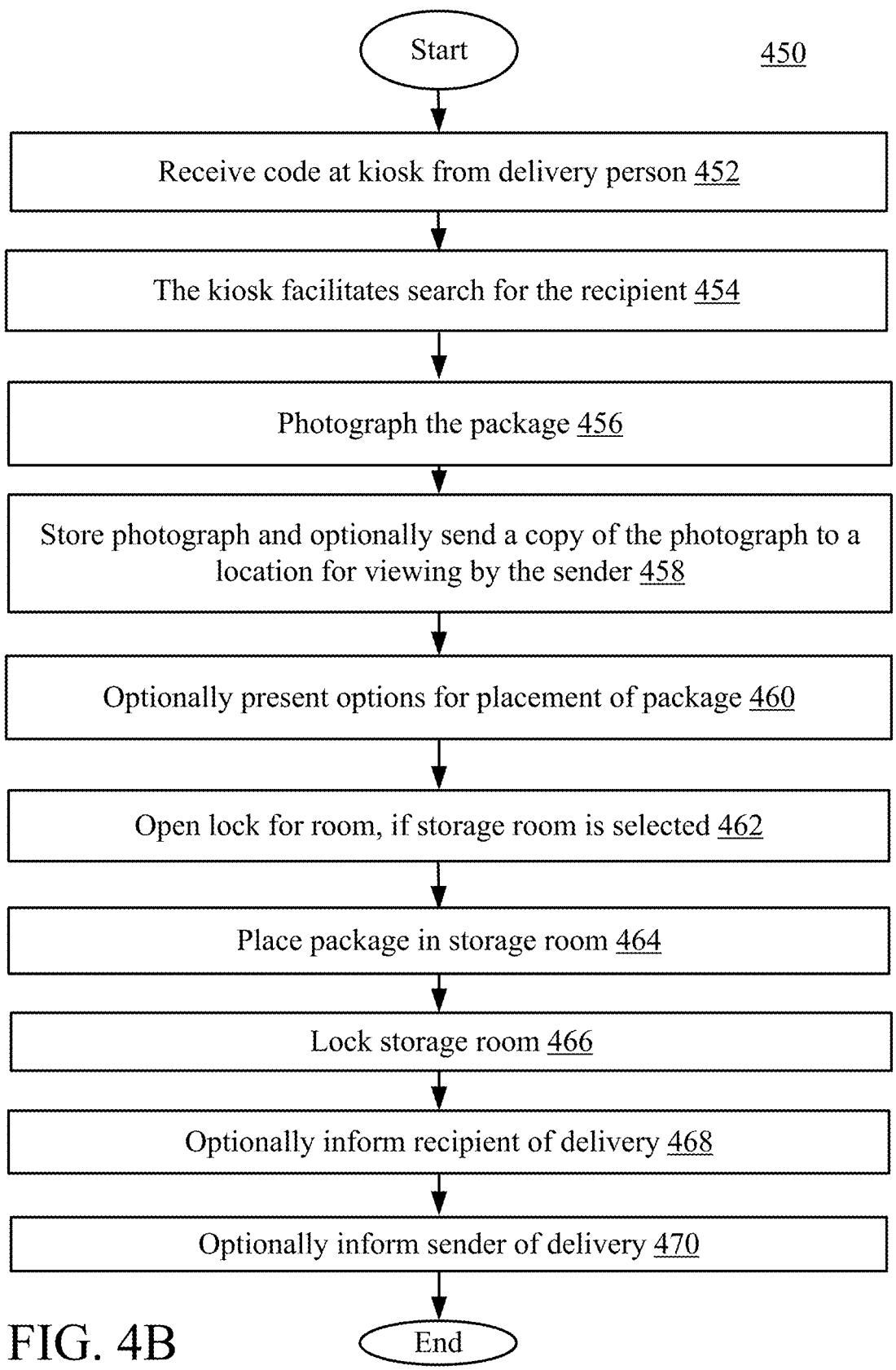
FIG. 4B shows an embodiment of a method implemented with the system of FIGS. 1A(1)-4A.

FIG. 4B shows an embodiment of a method 450 implemented with the system 10 of FIG. 1A(1).

In step 452, a code is received at kiosk 14 to grant the delivery person access to information that is available by kiosk 14. Optionally as part of step 452, the kiosk 14 receives the code and/or a request from the tablet 12 of the user.

In step 454, a search is conducted on kiosk 14 for the recipient. In an embodiment, if the recipient is not found the package is returned. In another embodiment, the recipient is informed of the delivery whether or not the recipient is found via the search, such as by forwarding the information to a house account to locate the recipient or by having the sender provide contact information for informing the recipient of the delivery.

In step 456, the camera 15 photographs the item being delivered. In an embodiment, photograph is taken regardless of whether the recipient is found, via the search so as to track the delivery of the item. The photo of the item may be used instead of a barcode to track the delivery of the item. As mentioned in conjunction with FIG. 1A(1), the photo of the item may be sent to and/or stored in a location where the sender can view the photo as part of a confirmation that the item was delivered. Optionally, if recipient was not found in the search for the recipient performed, via kiosk 14, the photo may be sent to a house account or another location, where someone can view the photo and match the photo with the recipient.

In step 460, if there is more than one storage room or if there are other storage areas in addition to the storage room 16, the delivery person is presented with options for where to place the item, which may be dependent in-part on the size of the object.

In step 462, the lock 18 is unlocked by the kiosk 14. Optionally as part of step 462, the kiosk 14 receives confirmation and/or instructions from the tablet 12 to open the lock 18.

In step 464, the item is placed in the storage room 16 (unless there are other possible storage areas and another storage area was selected).

In step 466, the storage room 16 is locked.

In optional step 468, the recipient is informed of the delivery (e.g., by an automated e-mail or an automated phone call/message), and optionally is informed of the location where the item was delivered.

In optional step 470, the sender is informed of the delivery and receives a copy of the photo of the item delivered. Optionally, as part of step 468, the recipient may also receive a copy of the photo of the item delivered.

In an embodiment, each of the steps of method 450 is a distinct step. In at least one embodiment, although depicted as distinct steps in FIG. 4B, steps 452-470 may not be distinct steps. In other embodiments, method 450 may not have all of the above steps and/or may have other steps in addition to or instead of those listed above. The steps of method 450 may be performed in another order. Subsets of the steps listed above as part of method 450 may be used to form their own method.

Figure 5:
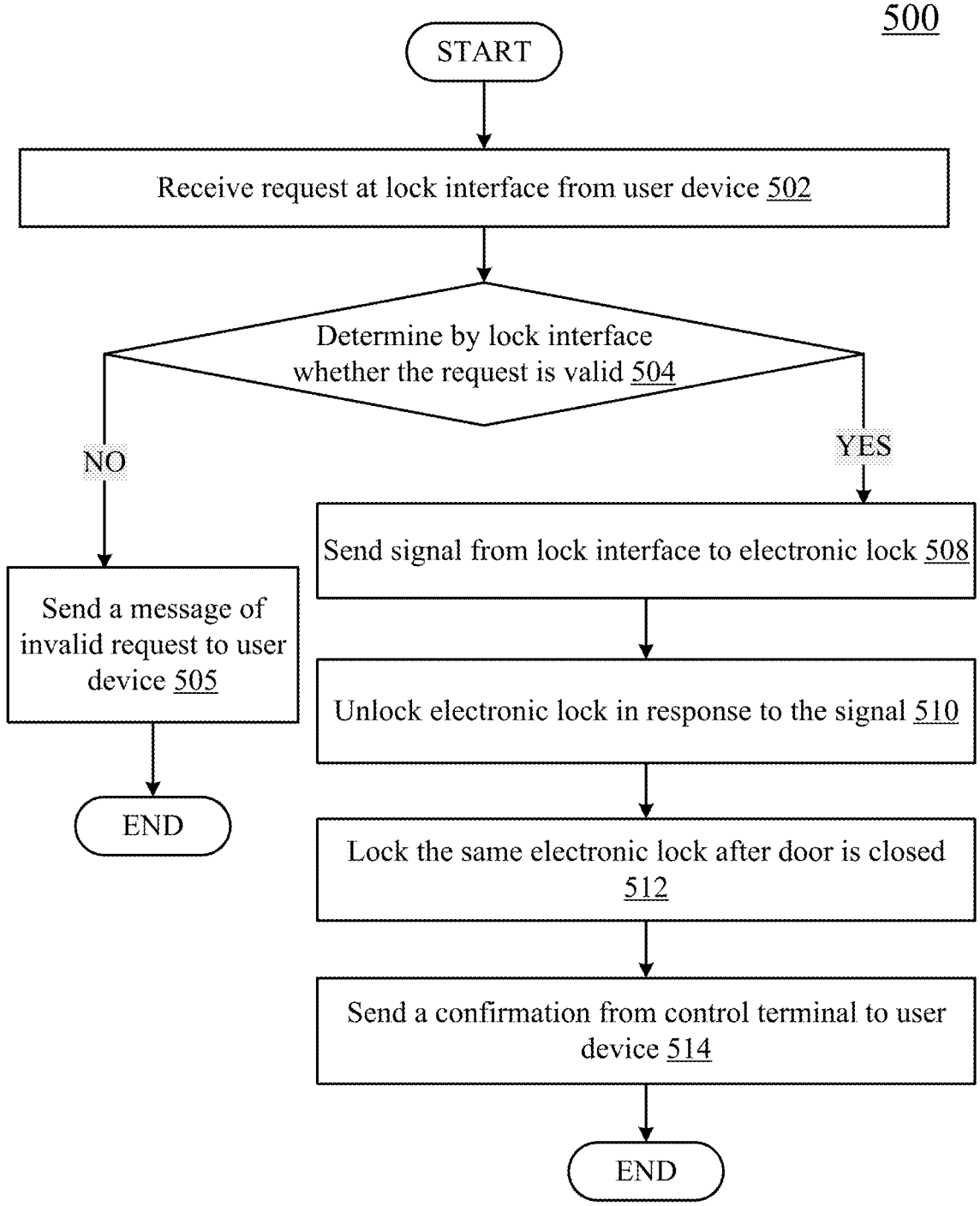
FIG. 5 shows a flowchart of an embodiment of a method for implementing the lock system of FIG. 1A(2)

FIG. 5 shows a flowchart of an embodiment of a method 500 for implementing the lock system 100a of FIG. 1A(2) of a storage room.

In step 502, the lock interface 112 or control terminal 110 receives a request from the kiosk 14 or optionally one of the optional user devices 130a-n via the network 140. In at least one embodiment, the request includes user authentication information and/or a password. In an embodiment, the request may include information about a designated door that the user intends to open. For example, the request may include and identifier of the room and/or lock that the user would like to access. Alternatively, the request may include information about a user to whom a package is being delivered, about a package that a user would like, and/or about a package being delivered, and based on the information provided the lock interface 112 or control terminal 110 determines which door to open. A given storage room may be used by only one person or shared by many people. Optionally as part of step 502, the lock interface 112 or control terminal 110 may receive a request to select and open a storage room (e.g., whether or not the storage room is currently in use).

In step 504, the lock interface 112 or control terminal 110 determines the validity of the request. As part of the step 504, the lock interface 112 or control terminal 110 may authenticate the user based on the user authentication information received at the kiosk or optionally from the user device. The user authentication may be unique to an individual user, or some cases, a given organization, such as a delivery company may use the same authentication information for all delivery persons. If the received user authentication information does not match any record in the user database 408, the request is deemed invalid and is rejected. If the received user authentication information matches a record in the user database 408, the lock interface 112 or control terminal 110 may further determine whether a designated door that the user intends to open requires a password. If a password is not required, the request is approved. If a password is required, the lock interface 112 or control terminal 100a determines whether the password received at the kiosk 14 or from the user device matches the predetermined password. If the received password matches the predetermined password, the request is approved. If the received password and the predetermined password do not match, the request is rejected.

In step 506, in response to the rejection of the request, the lock interface 112 or control terminal 110 sends a message to the kiosk 14 or user device that indicates that the request is invalid. The message of invalid request may include a message of invalid user or invalid password.

In step 508, in response to the approval of the request, the lock interface 112 or the control terminal 110 sends a signal to the designated electronic lock.

In step 510, the electronic lock is unlocked in response to the signal received from the lock interface 112, so that the user may open the door that is controlled by the electronic lock. As part of the step 510, the electric strike of the electronic lock is unlocked in an embodiment.

In optional step 512, the electronic lock is locked after the door is closed by the user.

In step 514, the lock interface 112 or control terminal 110 sends a confirmation to the kiosk 14 or user device about unlocking of the designated door. Optionally as part of the step 514, the lock interface 112 or control terminal 110 sends a message about relocking of the same door after the user closes the door.

In an embodiment, each of the steps of method 500 is a distinct step. In at least one embodiment, although depicted as distinct steps in FIG. 5, steps 502-514 may not be distinct steps. In other embodiments, method 500 may not have all of the above steps and/or may have other steps in addition to or instead of those listed above. The steps of method 500 may be performed in another order. Subsets of the steps listed above as part of method 500 may be used to form their own method.

Figure 6:
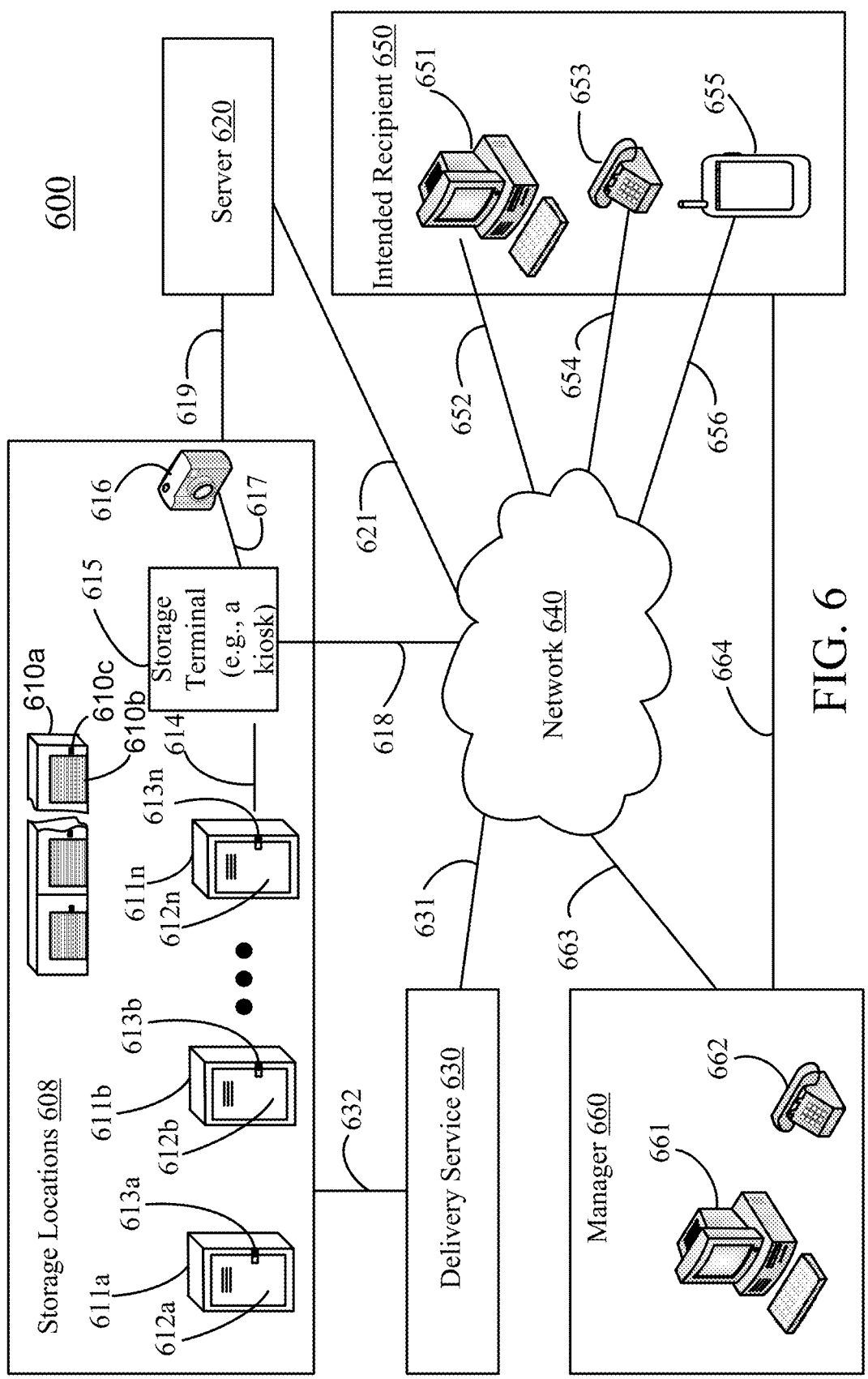
FIG. 6 shows a block diagram of an embodiment of a storage system that may use the lock system of FIG. 1A(2) to control the access to a storage room(s) for delivery services and pickups.

FIG. 6 shows a block diagram of an embodiment of a storage system 600 that may use the lock system 100a of FIG. 1A(2) to control the access to a storage room and optionally to a set of other storage areas for delivery services and pickups. In at least one embodiment, storage system 600 includes and optionally storage locations 608, which include at least one storage room 610a, at least one door 610b, and at least one lock 610c. Optionally, storage locations 608 may also include a plurality of optional storage areas 611a-n that includes at least doors 612a-n and locks 613a-n, line 614, a storage terminal 615 (e.g., a kiosk), a camera 616, and lines 617, 618 and 619. Storage system 600 also includes at least a server 620, line 621, a delivery service 630, lines 631 and 632, a network 640, intended recipient 650, an intended recipient terminal 651, line 652, a phone 653, line 654, a mobile terminal 655, line 656, a manager 660, a manager terminal 661, a phone 662, and lines 663 and 664. In other embodiments, storage system 600 may not include all of the components listed and/or may include other components in addition to or instead of those listed above.

FIG. 6 illustrates examples of a network associated with a storage system 600 in which the lock system 100a may be used to lock and unlock doors of the storage room and optionally of other storage areas. In at least one embodiment, the system 600 may be used to lock and unlock at least one door of a storage room(s). In at least one embodiment, an item(s) or package(s) may be delivered into and/or picked up from the storage room (or other storage areas). In this specification, the terms "item" and "package" are used interchangeably, and may be substituted one for another to obtain different embodiments.

In the storage system 600, delivery service may deposit an item for an intended recipient in a room that optionally includes storage areas. Optionally, storage system 600 may include other storage areas in to addition to and separate from the storage rooms. In an embodiment, the delivery service may search for information about the intended recipient via a storage terminal that is connected to a server. If the intended recipient has been registered in the storage system 600, the information about the intended recipient is found in the server and optionally the storage terminal assigns and/or opens a room (or other storage area) for the delivery service to deposit the item. Alternatively, the delivery service chooses a storage room (whether or not the storage room is in use) that is not currently in use, and the storage terminal may detect and/or information may be entered into the storage terminal informing the storage terminal which storage room (or other storage area) was chosen. In an embodiment, the storage terminal or the server may generate a password and notify the intended recipient to pick up the item from the same storage room using the password. In another embodiment, if the intended recipient is unregistered and/or cannot be found in the storage system 600 (e.g., if the intended recipient is not listed in search results returned by the server), the delivery service may photograph the mailing label and/or input the information about the intended recipient, via the storage terminal for uploading to the server, so that the server may contact a manager with a house account to obtain information about the intended recipient stored in a manger terminal, and/or subsequently register the intended recipient. Optionally, either the server or the manager may notify the intended recipient to pick up the item from the storage room (or other storage area). In an embodiment of the storage system 600, it is possible to first deposit an item in a storage room, and then later establish an account and/or inform an intended recipient that his/her item is in the storage room waiting to be picked up.

In at least one embodiment, the electronic locks 103a-n of the lock system 100a may be installed on the doors of a storage room(s). Optionally, the electronic locks 103a-n may be installed on storage rooms (and/or other receptacles of the other optional storage areas) in the storage system 600. In an embodiment, at least one electronic lock may be installed on at least one door and door frame of a storage room. In an embodiment, the lock interface 112 or control terminal 110 of the lock system 100a may be used as the storage terminal in the storage system 600 and control the electronic locks that lock and unlock the doors to the room. In another embodiment, the control terminal 110 of the lock system 100a may include both the storage terminal and the server of the storage terminal 615 and may perform functions that are performed by the storage terminal and the server of the storage terminal 615. In at least one alternative embodiment, the optional user devices 130a-n of the storage system 600 may include handheld devices used by the delivery service that send requests to open at least one of the locks so that a package(s) may be dropped off in the room(s) (or other storage areas), and/or the returned or unclaimed packages may be picked up. The optional user devices 130a-n of the storage system 600 may also include mobile devices used by customers (e.g., the intended recipients) that send requests to unlock electronic locks that control the access to the storage room(s) in which the packages for the intended recipients are stored. The optional user devices 130a-n may also include electronic devices used by the manager that manages the data about customers and/or the storage system 600.

Storage locations 608 include at least a location or facility that includes at least one storage room that optionally includes storage areas for securely storing articles that may be accessible by authorized entities or persons. In at least one embodiment, storage locations 608 may include a locker bank that includes a number of lockers, each of which has a physical lock or an electronic lock controlled by an electronic system. In an embodiment, the storage locations 608 may be replaced by a storage room 16. In an embodiment, the storage locations 608 may include one or more storage rooms and optionally may include storage areas of different shapes and/or sizes (e.g., small, medium, large, oversized) for storing items of various sizes. In another embodiment, the storage locations 608 may be part of a building having rooms as storage areas, or may itself be a building or a structure.

Optionally, the storage locations 608 may be free for the users to use, or may charge fees (e.g., a one-time fee for each use, a monthly or yearly rental fee, a membership fee, etc.). Optionally, the storage locations 608 may be associated with a company that includes customer service representatives, maintenance persons, and/or technical staff, for assisting the customers, answering questions, dealing with problems, managing the storage locations 608, and/or handling technical issues. In at least one embodiment, the storage locations 608 may be accessible by different entities. For example, a delivery person from a delivery service company may drop off an item in a room that optionally has storage areas, and later an intended recipient may pick up the item from the same storage room or other storage area. In another embodiment, the storage locations 608 are owned and/or used by the same entity or person. For example, storage locations 608 may be owned and used by a company for distributing or storing items of the employees of the company. The storage locations 608 may provide different levels and/or methods of security. For example, a user may possess a password or a key to lock and open a room in the storage locations 608. In another example, a user may use a password or code received from a server, a manager, or delivery service to open the storage room.

In at least one embodiment, storage locations 608 are partially or entirely controlled by an electronic system that includes at least a storage terminal for managing and controlling the room(s) or optional storage areas. For example, a delivery person and/or an intended recipient may use the storage terminal to access the room(s) or optional storage areas in the storage locations 608. In another embodiment, storage locations 608 may be managed or operated online, optionally via a user interface. In at least one embodiment, the storage locations 608 are communicatively connected to a network and/or a server.

In at least one embodiment, storage locations 608 are located in a public place and/or within an area (e.g., within a pickup radius) of a location associated with an intended recipient. The storage locations 608 may be located in an apartment building, an office building, a school, a campus, a facility, for example, which is in a pickup radius of a location (e.g., a business or residents) associated with the intended recipient. In at least one embodiment, storage locations 608 have their own building or shelter, or are located inside an apartment building, an office building, a school building, for example. In at least one embodiment, multiple entities or buildings may share the storage locations 608, which is located in a pickup radius of the multiple entities or buildings. In another embodiment, more than one storage locations 608 may be located in the same building, optionally for serving different entities or companies. In at least one embodiment, the storage system 600 includes multiple storage locations, and each may be located a different location, for properly serving intended recipients residing or working at different locations. In other embodiments, storage locations 608 may include other structures or devices.

Storage room 610a is an embodiment of the storage room 16 that was discussed in conjunction with FIG. 1A(1). Although the icon depicting at least one storage area 610a depict a row of more than three outdoor storage rooms connected together, the at least one storage room 610a may be indoors and there may be any number of storage rooms including just one storage room. Door 610b is an embodiment of door 18. Lock 610c is an embodiment of lock 20. Each storage room 610a has at least one door 610b and each door 610b has at least one lock 610c. Optional storage areas 611a-n are secured storage compartments or spaces in storage locations 608 for temporarily holding or storing articles or items, and may be accessible by both delivery services and intended recipients. In an embodiment, optional storage areas 611a-n may be lockers or rooms. In an embodiment, the optional storage areas 611a-n may be replaced by one or more storage rooms. In another embodiment, optional storage areas 611a-n may be any receptacle, such as bins, cages, baskets, containers, storage rooms, and/or bags (in this specification, the word receptacle is generic to a locker and any other container). In an embodiment, optional storage areas 611a-n may include receptacles with walls made from materials such as steel, wood, laminate, plastic, for example. In another embodiment, optional storage areas 611a-n may include rooms in a building or structure. In at least one embodiment, the receptacles of optional storage areas 611a-n are physically joined together side by side, optionally sharing walls with one another. In another embodiment, the optional storage areas 611a-n may be separated from one another. In at least one embodiment, the receptacles of optional storage areas 611a-n are arranged in rows and/or tiers, and may include multiple rows and/or tiers. In at least one embodiment, optional storage areas 611a-n all have the same size and/or shape. In another embodiment, optional storage areas 611a-n include different sizes and/or shapes. In at least one embodiment, each of the optional storage areas 611a-n may include a storage identifier (e.g., a storage area number) for identifying the storage area. The storage identifier may also be useful in locating and/or tracking items that being delivered or waiting to be picked up. In at least one embodiment, each of optional storage areas 611a-n may include a door with a lock mechanism for securely fastening the door. In other embodiments, optional storage areas 611a-n may be in various shapes, numbers, sizes, and/or materials.

In at least one embodiment, the storage room and the optional storage areas 611a-n are not assigned to specific intended recipients or accounts. In at least one embodiment, delivery service delivers an item(s) associated with an intended recipient or an account and leaves the item delivered in the storage room or optionally in one of the optional storage areas 611a-n, which is secured by a lock mechanism. The item remains in the storage room or in the selected one of optional storage area 611a-n, secured by the lock mechanism, until the item is later picked up by an authorized intended recipient. In at least one embodiment, after the item is picked up from one of the optional storage areas 611a-n, the same storage area is ready to be reused, and may store items for other intended recipients. By contrast, the items of multiple users may be stored in one storage room while waiting for the recipients to pick up the items. In an embodiment, items associated with one intended recipient or one account may be delivered into multiple storage rooms and/or optional storage areas 611a-n.

In an alternative embodiment, each of optional storage areas 611a-n may be assigned to an intended recipient and/or an account. In an embodiment, each of optional storage areas 611a-n is secure in the sense that only the user and the delivery service have authorized access. After one of optional storage areas 611a-n is already in use, others desiring access to the same storage area, since they are not authorized to have access, are expected to be required to defeat at least one security device, such as by breaking the storage area, picking a lock, and/or breaking a code. In an embodiment, optional storage areas 611a-n may be associated with (e.g., owned, rented, and/or managed by) a delivery company. In an alternative embodiment, one or more of optional storage areas 611a-n may be managed by another party (e.g., the manager of the apartment building or office building where the storage locations 608 is located, a laundry service, or a household services company). In an embodiment, some of the storage areas may store items owned by multiple individuals in one storage area.

Doors 612a-n are structures that serve to block off, and allow access to, an entrance to one or more storage rooms and optionally to other optional storage areas 611*a-n*. The doors 612*a-n* may be embodiments of the doors 102*a-n*, which were discussed in conjunction with FIG. 1A(2). In an embodiment, the doors 612*a-n* include ventilation structures (e.g., a series of horizontal angled slats at the top or bottom of the doors 612*a-n*) to provide for the flow of air to aid in cleanliness. In at least one embodiment, the doors 612*a-n* are biased (via springs or other mechanical structures) to closed position, so that doors 612*a-n* may close by themselves after the items are dropped off or picked up. In other embodiments, doors 612*a-n* may include door handles or other structures.

Locks 613*a-n* may include fastening devices for locking one or more storage rooms and optionally for locking optional storage areas 611*a-n*, respectively. Locks 613*a-n* may be embodiments of the electronic locks 103*a-n*, which were discussed in conjunction with FIG. 1A(2). In at least one embodiment, the locks 613*a-n* locks the storage rooms and optionally optional storage areas 611*a-n*, respectively, when the optional storage areas 611*a-n* are not in use. In another embodiment, the locks 613*a-n* are left open when the optional storage areas 611*a-n* are not in use. In at least one embodiment, the locks 613*a-n* may be mounted to the doors 612*a-n* or to the receptacle walls of the storage rooms and optionally of the optional storage areas 611*a-n*. In an embodiment, the locks 613*a-n* are electronically controlled by the storage terminal or the server, which may include a lock interface that sends signals to each of locks 613*a-n* for controlling locking or opening of locks 613*a-n*. In at least one embodiment, the user may select a storage area and enter password or key code using the storage terminal, and the storage terminal or server may compare the key code to stored key codes to determine whether the key code or password entered matches predetermined password or key code for that storage area. If matched, the storage terminal or server sends a signal to open the lock of the selected storage room and optionally the selected storage area. In at least one embodiment, the storage terminal or server receives a request to open or lock one or more of the locks 613*a-n* and sends signals to the selected locks for controlling the opening or locking the locks.

Line 614 communicatively links the locks 613*a-n* to a storage terminal for controlling the locks 613*a-n*. In at least one embodiment, line 614 includes physical cable or wires, or wireless connections. In at least one embodiment, line 614 connects each of the locks 613*a-n* to a lock interface that is controlled by the storage terminal.

Storage terminal 615 is a terminal for managing and/or controlling access to storage rooms and optionally to optional storage areas 611*a-n* of storage locations 608, and/or assisting deliveries and pickups. In at least one embodiment, storage terminal 615 may be a standalone device (e.g., a kiosk), a device mounted to a wall of a storage room of storage locations 608, or a device being a portion of, or connected to, the receptacles of storage areas 611*a-n*. In at least one embodiment, storage terminal 615 includes at least a computer system and/or a user interface for communicating with delivery service and intended recipients and handling deliveries and/or pickups. In at least one embodiment, storage terminal 615 includes multiple computer systems communicatively connected to one another, one at each row of optional storage areas 611*a-n* or at different locations for the convenience of users. In at least one embodiment, storage terminal 615 is communicatively connected to each of the locks 613*a-n* for sending signals to and/or receiving from the lock of each of the optional storage areas 611*a-n*. In at least one embodiment, storage terminal 615 sends signals to one of the locks 613*a-n* to open or lock the electronic lock, for allowing both delivery service and the intended recipient to access the same storage area in a secured way. In at least one embodiment, storage terminal 615 is communicatively connected to a network that allows the storage terminal 615 to communicate with a server, a delivery service, an intended recipient, and/or a manager. In at least one embodiment, the storage terminal 615 may function as the lock interface 112 or control terminal 110 of the lock system 100*a* to control the locks 613*a-n*.

In at least one embodiment, storage terminal 615 allows delivery service to access the storage system 600 and search for an intended recipient to deliver an item. Optionally the delivery service is registered in the storage system 600 and/or receives an access code, and may enter the access code at the storage terminal to access storage system 600. In at least one embodiment, storage terminal 615 stores machine instructions, which when activated cause the storage terminal 615 to provide a user interface that presents a page to the delivery service, via which the delivery service may enter information about an intended recipient to search for intended recipients. In at least one embodiment, storage terminal 615 shows a list of returned, unclaimed, or unretrieved items for the delivery service to collect and return to the vendors. In at least one embodiment, storage terminal 615 shows a list of one or more storage rooms and optionally of available storage areas that have different sizes, and presents fields to the delivery service for choosing a size of storage area for dropping off the item. In at least one embodiment, storage terminal 615 provides an option for the delivery service to decide whether a signature is required prior to unlocking the storage area for the intended recipient to pick up. In at least one embodiment, the storage terminal 615 assigns a storage location that is not currently in use, and/or generate a password (or key code) that may be used by the intended recipient to access the storage area. In at least one embodiment, the access code is different from the password (or key code) in that the access code is assigned to the delivery service for accessing the storage system 600 and may remain unchanged whenever the delivery service deposits various items to the optional storage areas 611*a-n*, while the password is generated once when an item is dropped off in one of the optional storage areas 611*a-n* for an intended recipient to open the lock to the one storage area and may expire thereafter. In at least one embodiment, the storage system 600 may generate different passwords for each different use of the same storage area(s) 611*a-n*. If one of optional storage areas 611*a-n* is a room or other storage area shared by many individuals, different users may have different passwords for accessing the same storage area, where the different passwords are valid at the same time. In at least one embodiment, storage terminal 615 presents a field to the intended recipient for entering the password and/or signature, and then authenticates the intended recipient prior to allowing the intended recipient to pick up the item. In at least one embodiment, storage terminal 615 includes a pad or touch screen for the intended recipient to sign. In at least one embodiment, storage terminal 615 communicates with the server to record and manage information about intended recipients, items, and/or optional storage areas 611*a-n*. In an embodiment, a photograph is taken of the package to track the package (whether or not the intended recipient is found). In another embodiment, if an intended recipient is not registered or not found in the storage system 600, storage terminal 615 allows and/or instructs the delivery service to photograph a mailing label of the item via a camera that is communicatively linked to the storage terminal 615, and then upload the photograph to the server.

Camera 616 is a camera for taking photos of mailing labels of items for tracking the package. In other embodiments, camera 616 may be used to photograph other items such as identification cards, users, barcodes, for example. In at least one embodiment, camera 616 is communicatively linked to storage terminal 615, and may be located close to or as a part of the storage terminal 615. In at least one embodiment, if an intended recipient is not found in the server (e.g., the user may be unregistered or not listed in the search results due to other reasons), the photograph of the mailing label of the item is uploaded to the server 620 for contacting a manger to obtain the contact information of the intended recipient. In at least one embodiment, besides photographing the mailing label using camera 616, the delivery service may also enter information about the intended recipient (e.g., name, address on the mailing label, phone number, etc.), or scan a bar code associated with the item for the server to retrieve information about the intended recipient from the delivery service. In at least one embodiment, the photographs of the mailing label (and/or other information about the intended recipient) is viewed by a manager and/or identified by a manager terminal, to locate the intended recipient and/or obtain information about the intended recipient. In an embodiment, the photographs of the mailing labels may be stored temporarily until the intended recipient is contacted to pick up the item, until the item is picked up, and/or the server registers the intended recipient for future services. In another embodiment, the photographs of the labels may be stored in the server or manager terminal so that when another item with the same mailing label is received, the system recognizes the mailing label and retrieves the contact information automatically. In at least one embodiment, the photographs of the mailing labels are stored in storage terminal 615, server, and/or another system capable of storing electronic images. In at least one embodiment, the photographs of the labels may be stored in a location such that the photographs of the labels may be accessed by a delivery person or other user, via a website. In this specification, the terms "photograph" and "image" may be substituted one for the other to obtain different embodiments.

Line 617 communicatively links the camera 616 to the storage terminal 615 for controlling the camera 616 and/or uploading photos or images.

Line 618 communicatively links the storage terminal 615 to the network for transmitting signals between storage terminal 615, the server, the delivery service, and/or the intended recipient.

Line 619 communicatively links the storage locations 608 to a server for managing storage system 600. Line 619 is optional. In at least one embodiment, line 619 may include electronic wires that physically connect storage locations 608 with server. In yet another embodiment, line 619 includes wireless connections between storage locations 608 and server.

Server 620 is a server that may store, manage, and/or track information about intended recipients, items, storage locations, delivery services, managers, for example. In at least one embodiment, server 620 also registers intended recipients, managers, and delivery services, manages and controls optional storage areas 611a-n and locks 613a-n, communicates with, and/or authenticates, delivery services, managers, and intended recipients. In at least one embodiment, server 620 includes a database(s) for storing intended recipient data, delivery data, manager data, storage location data, for example. In at least one embodiment, server 620 includes instructions for handling deliveries, pickups, and/or inquiries, communicating with delivery service, intended recipients, and/or managers. In at least one embodiment, server 620 communicates with a service system of the delivery service to retrieve item information, tracking information, information about the intended recipient, etc. In at least one embodiment, the server 620 may be part of the control terminal 110 of the lock system 100a, or may be communicatively connected to the lock interface 112 or control terminal 110.

In at least one embodiment, server 620 assigns an access code to the delivery service for accessing storage system 600 in order to deliver items to storage locations 608. In at least one embodiment, server 620 generates passwords for intended recipients to access one or more of the optional storage areas 611a-n. In at least one embodiment, the passwords are valid for only one use (i.e., the password expires after the intended recipient uses the password to pick up an item), or are valid for a limited time (e.g., 8 hours, two days, a week, etc.). In at least one embodiment, server 620 authenticates the validity of the passwords. In at least one embodiment, server 620 hosts a website and/or a user interface for users to register and set up an account, and logon to the website to update user information, leaving messages, tracking mailing status, and/or check items that are ready to be picked up. In other embodiments, server 620 may include other structures or devices for communicating with intended recipients, delivery service 620, and/or managers. In other embodiments, server 620 may include other structures or devices that perform other functions.

Line 621 communicatively links the server 620 to the network for transmitting signals.

Delivery service 630 delivers items for intended recipients to storage locations 608, via handheld devices used by the delivery service 630 or storage terminal 615 that allows delivery service 630 to access storage system 600 and deposit the item(s) in one or more of optional storage areas 611a-n. In this specification, the term "delivery service" is generic to an employee of a delivery service company or a delivery person, because by virtue of being employed by the delivery services company the employee may need to go to the storage location to deliver or deposit items. In at least one embodiment, the delivery service 630, upon request, picks up items from vendors, pick-up locations, or warehouses, and delivers the items to intended recipients listed on the mailing labels of the items. In at least one embodiment, delivery service 630 provides tracking information on a website associated with delivery service 630, and may store a history of the item deliveries and information about the intended recipient. In at least one embodiment, server 620 may retrieve tracking information from delivery service 630 and provide the tracking information to the intended recipients. In at least one embodiment, delivery service 630 may notify the intended recipient before and/or after the item has been delivered (e.g., via email, voice message, text message, delivery notes, etc.). In at least one embodiment, delivery service 630 sends delivery information and/or pick up instructions to the intended recipients.

In at least one embodiment, delivery service 630 may include a system of handheld devices for the delivery personnel to carry, which may include an application that interacts with storage locations 608 for accessing the storage system 600. In at least one embodiment, delivery service 630 may enter access code, search for intended recipients, take and upload photos of the mailing labels, enter tracking number, choose from available optional storage areas 611*a*-*n*, etc. Optionally, the application includes a setting for requiring a signature from the intended recipient prior to unlocking the lock. In another embodiment, delivery service 630 uses a user interface of the storage terminal 615 for accessing the storage system 600. In at least one embodiment, storage system 600 may provide a secure and convenient way for delivery service 630 to deliver items to secured storage areas for intended recipients to pick up.

In at least one embodiment, delivery service 630 uses an access code that may be assigned by server 620 to access storage system 600 or login to an account associated with the delivery service 630. In at least one embodiment, delivery service 630 may view, in the account of delivery service 630, a list of unretrieved and/or returned items, and open the storage areas to collect the returned and/or unretrieved items. The unretrieved or returned items may then be returned to the senders. In at least one embodiment, delivery service 630 may search for an intended recipient by entering the name of the intended recipient. If the intended recipient is found in the storage system 600, in an embodiment, the delivery service 630 may view the search result and select the intended recipient, and may choose an option whether a signature of the intended recipient is required prior to unlocking the lock. In at least one embodiment, the delivery service 630 may be presented an option for requiring a signature whether or not the intended recipient is found in the list of intended recipients of storage system 600. In at least one embodiment, the delivery service 630 may also choose the size of storage area (e.g., small, medium, large, oversized, etc.) based on the size of the item, and may view the number of available optional storage areas 611*a*-*n* in each size. In at least one embodiment, delivery service 630 receives a storage area number (or other identifier) of one of the optional storage areas 611*a*-*n* that is assigned and opened by storage system 600 to deposit the item. In this specification the terms "storage area number" and "storage area identifier" are used interchangeable—one may be substituted for the other to obtain different embodiments. In at least one embodiment, if the intended recipient is not found in the storage system 600, the delivery service 630 may be asked to photograph the mailing label and/or input the information about the intended recipient (e.g., the intended recipient's name) for contacting a manager. Optionally, the delivery service 630 may enter tracking number or scan tracking bar code and upload the tracking number and the bar code to the server 620. Then the delivery service 630 may deposit the item in a storage area assigned and opened by the storage terminal 615. In at least one embodiment, the delivery service 630 closes and/or locks the door of the storage area after dropping off the item. Optionally, delivery service 630 may receive a confirmation from storage system 600 that the item is ready to be picked up and/or request delivery service 630 to confirm that the item is in the storage area waiting to be picked up. Optionally, delivery service 630 may request the storage system 600 to assign another storage area if the item does not fit in the originally assigned storage area.

In at least one embodiment, delivery service 630 may receive a request from the vendor, the person that sends the item, or the intended recipient to deliver the item to a specific storage room and/or a specific storage area. In at least one embodiment, the storage terminal assigns one of the optional storage areas 611*a*-*n* that is not currently in use for the delivery service 630 to drop off the item. In at least one embodiment, if the item is not picked up by the intended recipient in a predetermined period (e.g., three weeks, one month, six months, etc.), the delivery services 630 may pick up the item from the same storage area and return the item.

Line 631 communicatively links the delivery service 630 to the network for the delivery service 631 to communicate with storage locations 608, server 620, intended recipient, etc. In at least one embodiment, the handheld devices of the delivery personnel communicate via line 631 and network 640 with storage locations 608 and server 620 to access storage system 600 for delivering items.

Line 632 communicatively links the delivery service 630 to the storage locations 608. Line 632 is optional.

Network 640 may be an embodiment of the network 140, which as discussed in conjunction with FIG. 1A(2). Network 640 may be used by storage locations 608, server 620, delivery services 630, intended recipients, and/or managers to communicate with one another regarding items being delivered to storage areas 6612*a*-*n* and/or intended recipients to be contacted for picking up the items.

Intended recipient 650 is a person or entity that receives items or other deliveries in storage locations 608. In at least one embodiment, intended recipient 650 resides or works in a building where storage locations 608 is located, or within a pickup radius. Storage system 600 may include any number of intended recipients. In at least one embodiment, intended recipient 650 is registered and/or has an established account in server 620, and information of intended recipient 650 may be stored in the memory of server 620. Intended recipient 650 may have registered with the storage system 600, via a user interface at storage terminal 615, by intended recipient terminal 651, mobile terminal 655, and/or may register by phone 653. In at least one embodiment, intended recipient 650 may select a preferred one of storage locations 608 to which items for the intended recipient 650 may be delivered. For example, perhaps a first storage location is in the apartment building where intended recipient 650 resides, and perhaps a second storage location is in the office building where the intended recipient 650 works. In this example, intended recipient 650 may select, optionally via the registered account in server 620, which storage location to delivery some or all of the items for the intended recipient 650. In at least one embodiment, information about intended recipient 650 is stored by a manager of the building in which the intended recipient 650 resides and/or works, and the manager may provide the information about intended recipient 650 if the delivery person cannot find a listing for intended recipient 650 (perhaps the delivery person has the wrong spelling of the name). Optionally, the information provided by the manager may be used to register the intended recipient 650, upon approval of the intended recipient 650. In at least one embodiment, intended recipient 650 is not registered in server 620 but may still receive an item delivered to the storage locations 608. In this embodiment, server 620 may contact the manager to obtain information about the intended recipient, and/or may automatically register the intended recipient 650 in the server 620. Alternatively, intended recipient 650 may be directly contacted by the manager to pick up items.

In at least one embodiment, intended recipient 650 may own and/or use various electronic devices including an intended recipient terminal, a phone, and/or a mobile device for communicating and receiving e-mails, instant messaging, Short Message Service (SMS) messaging, and/or other forms of text and/or voice communications. In at least one embodiment, the electronic devices used by the intended recipients may be embodiments of the user devices 130*a*-*n* of the lock system 100*a* for sending requests to open the electronic lock(s) to the storage room. In at least one embodiment, intended recipient 650 receives a notification, optionally from delivery service 630, server 620, and/or manager that an item is waiting to be picked up in one of the storage locations 608. In at least one embodiment, intended recipient 650 receives delivery information and a password from server 620 or manager for accessing the storage area to pick up the item. In at least one embodiment, intended recipient 650 enters the password and/or other information into the storage terminal 615 of storage locations 608, and confirms to pick up the item. The storage terminal 615 then opens the lock of the storage area within which the item is deposited, and the intended recipient 650 may pick up the item and close the door of the storage terminal. In at least one embodiment, the intended recipient 650 provides a signature or other identification or confirmation to the storage terminal 615 before the storage terminal unlocks the storage area. Optionally, after the intended recipient 650 enters the password, a signature is required (i.e. if the delivery service 630 chooses the option to require a signature) before the storage system 600 opens the lock of the storage area. In at least one embodiment, intended recipient 650 may use the mobile device or the storage terminal 615, which may include a pad for the intended recipient 650 to sign, to enter and upload the signature to the server 620, and then the storage system 600 opens the lock and shows the storage area number where the item is stored.

Intended recipient terminal 651 is a terminal or network appliance that may be used by intended recipient 650 to receive notifications from or to communicate with server 620, delivery service 630, or manager regarding items to be picked up. In this specification, the term "network appliance" refers to any appliance capable of communicating via a network. Intended recipient terminal 651 may also be used for other purposes such as browsing websites, computing, utilizing software, playing games, for example. For example, intended recipient terminal 651 may be a personal computer, a handheld computer, a terminal linked to a computer, or any other network appliance. In at least one embodiment, intended recipient terminal 651 is communicatively linked to network 640.

Line 652 communicatively links the intended recipient terminal 651 to the network 640 for the intended recipient terminal 651 to communicate with the storage locations 608, server 620, delivery service 630, manager, etc. In at least one embodiment, the intended recipient terminal 651 receives via line 652 notifications from server 620, storage locations 608, and/or delivery service 630 that an item(s) is waiting to be picked up.

Phone 653 is an ordinary phone that may be used by intended recipient 650 to communicate with (e.g., via phone calls, voice messages, etc.) server 620, delivery service 630, or manager regarding items or other issues. In at least one embodiment, phone 653 is communicatively connected to network 640.

Line 654 communicatively links the phone 653 to the network 640 for the phone 653 to communicate with the storage locations 608, server 620, delivery service 630, manager, etc. In at least one embodiment, phone 653 receives via line 654 from storage locations 608, server 620, delivery service 630, and/or manager notifications about items to be picked up.

Mobile terminal 655 is a mobile device used and/or owned by consumer 650 for communicating (e.g., via phone calls, voice messages, text messages, emails, etc.) with server 620, delivery service 630, or manager regarding items to be picked up or other issues. Mobile terminal 655 may store an application that was downloaded from server 620. The application may interface with server 620, and presents to the intended recipient 650 a page via which the intended recipient 650 may request to open a storage area, which may cause server 620 and/or storage terminal 615 to open a storage area so that the intended recipient 650 may retrieve an item left in the storage area for the intended recipient 650. The application may include a page via which the intended recipient 650 may enter a signature, via a touch screen or upload a stored signature, which the server 620 and/or storage terminal 615 may authenticate. Whether or not the intended recipient 650 is granted entry into the storage area containing the items left for the intended recipient 650 may depend on whether the signature was uploaded and/or whether the signature was determined to be authentic. Mobile terminal 655 may also have other uses, such as making phone calls, browsing a network, personal computing, and/or receiving messages. For example, mobile terminal 655 may include smart phones, PDA (Personal Digital Assistant), tablets, laptops, and/or other electronic mobile devices. In at least one embodiment, the intended recipient 650 may be contacted, via at least one of intended recipient terminal 651, phone 653, and mobile terminal 655. Intended recipient terminal 651, phone 653, and mobile terminal 655 are just some examples of the many different ways that storage system 600 may communicate with intended recipient 650. In at least one embodiment, mobile terminal 655 is communicatively connected to network 640.

Line 656 communicatively links the mobile terminal 655 to the network 640 for transmitting signals. In at least one embodiment, mobile terminal 655 may receive via line 656 notifications such as phone calls, voice messages, texts, and emails from storage locations 608, server 620, delivery service 630, and/or manager about items to be picked up. In another embodiment, mobile terminal 655 may access storage system 600 via line 656 to enter a password and/or upload a signature to request the storage system 600 to open the lock to the storage area that stores the item.

Manager 660 manages and oversees issues or management information related to users, residents, or entities in a building or company (e.g., an apartment building, an office building, a school, etc.). In this specification, the term "manager" is generic to an employee of the managing office, a person in charge of the house account, or an electronic managing system or administrative server, because either the employee or person may view and identify information about the intended recipient, or the managing system may automatically identify and locate the intended recipient, when the intended recipient is not registered in the storage system 600. In at least one embodiment, manager 660 communicates with users or residents in the building and stores contact information and other information of the users or residents. In at least one embodiment, manager 660 may be located in the same building as the users. In other embodiments, manager 660 may be located at other locations. In at least one embodiment, manager 660 manages users in more than one building or entities which share one storage locations 608. In another embodiment, one storage locations 608 may be shared by users in different buildings or entities that are managed by different managers.

In at least one embodiment, manager 660 is contacted by server 620 regarding intended recipients that are not registered in server 620. In at least one embodiment, manager 660 may be registered with a house account in server 620. The house account may receive photographs of mailing labels and/or information about the intended recipient 650, which are used for locating and/or identifying the intended recipients by the manager 660. In at least one embodiment, manager 660 provides information about the intended recipient 650 to server 620, or may contact the intended recipients directly. In at least one embodiment, manager 660 is in communication with storage locations 608, server 620, delivery service 630, and/or intended recipient 650.

Manager terminal 661 is a computer system used by manager 660 for controlling management of the building or entities, storing, updating, and/or managing user information, communicating with server 620 and/or intended recipient 650 regarding delivery information, user identification, etc. For example, manager terminal 661 may include one or more web servers and/or one or more administrative servers. Users may log on to a website of the manager terminal 661, update user information, leaving messages, check items that are ready to be picked up, set up an account, and/or make payments. Alternatively, manager terminal 661 may communicate with users via e-mail, instant messaging, Short Message Service (SMS) messaging, and/or other forms of text and/or voice communications. In at least one embodiment, manager terminal 661 is communicatively connected to network 640.

In at least one embodiment, manager terminal 661 includes a memory system for storing information of users in the building or entity managed by manager 660. In at least one embodiment, manager terminal 661 includes a house account that is associated with at least one of storage locations 608, so that when server 620 may contact the house account of manager terminal 661 for identify and/or contact intended recipients. In at least one embodiment, the house account of manager terminal 661 receives from server 620 a photograph of mailing label that is taken at the storage terminal 615, via camera 616, or taken via a camera on the handheld device of the delivery system 630. In at least one embodiment, manager terminal 661 includes instructions and/or an algorithm that identifies the intended recipient's name and/or mailing address from the photograph of mailing label, and then compares the name and/or mailing address with information stored in the memory of manager terminal 661 to identify the intended recipient and retrieve information about the intended recipient stored in the memory of the manager terminal 661. In another embodiment, manager terminal 661 receives an intended recipient name and/or mailing address that is entered by delivery service 630, via storage terminal 615, for identifying the intended recipient. In this embodiment, manager terminal 661 uses the intended recipient name and/or mailing address entered by the delivery service 630 to search and/or identify the intended recipient in the memory of manager terminal 661. In an embodiment, manager terminal 661 sends the retrieved information about the intended recipient to server 620 so that the server 620 may contact the intended recipient to pick up the item and/or so that the server 620 may register the intended recipient. In another embodiment, manager terminal 661 may directly contact and notify the intended recipient that an item is waiting to be picked up.

Phone 662 is similar to phone 653 except that phone 662 is used by manager 660 or a representative in manager office for contacting intended recipient 650. In at least one embodiment, phone 662 is used to call intended recipient 650 and/or leave a message for intended recipient 650 to pick up the item in storage locations 608, after the manager 660 identifies and locates the intended recipient 650 according to mailing labels and/or other information received from server 620. In at least one embodiment, phone 662 may be used to receive phone calls from intended recipient 650, storage locations 608, and/or delivery service 630, regarding information about the intended recipient 650 and/or delivery information. In at least one embodiment, phone 662 is communicatively linked to network 640. In at least one embodiment, phone 662 is a telephone extension of an internal phone line, which is communicatively connected to other telephone extensions that may be used by different intended recipients, via an internal line.

Line 663 communicatively links the manager 660 to the network 640 for transmitting signals. In at least one embodiment, manager terminal 661 or phone 662 of manager 660 may receive intended recipient name and other information from server 620 via line 663. In at least one embodiment, the manager terminal 661 may send via line 663 information about the intended recipient 650 to server 620 for locating the intended recipient 650 and/or registering the intended recipient 650.

Line 664 communicatively links the manager 660 to the intended recipient 650, so that the manager 660 may communicate with the intended recipient 650 and/or notify the intended recipient 650 that an item is waiting to be picked up. In at least one embodiment, line 664 includes an internal telephone line, which allows the manager 660 and intended recipient 650 to communicate, via telephone. In at least one embodiment, line 664 includes a local area network (LAN) and/or a wide area network (WAN) that interconnects computers or electronic devices within a limited area (e.g., in the same apartment building, office building, school, etc.), which allows the manager 660 to send an electronic communication, such as an e-mail, to the intended recipient regarding the package received. In at least one embodiment, line 664 includes wired or wireless connections, or other types of connections.

Figure 7:
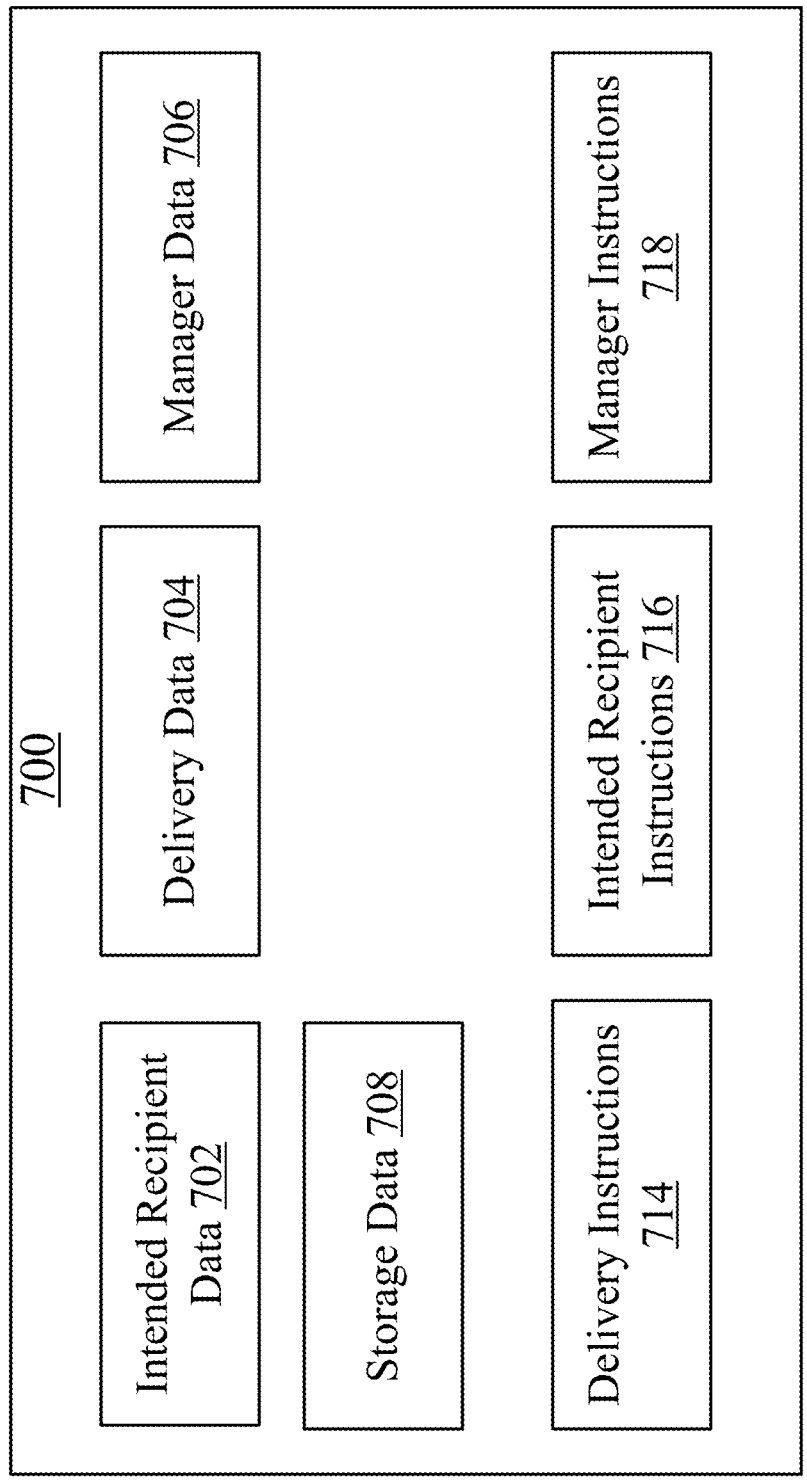
FIG. 7 shows a block diagram of an embodiment of a memory system that may be used in the server of FIG. 6.

FIG. 7 shows a block diagram of an embodiment of memory system 700 that may be used in the server 620 of FIG. 6. Memory system 700 may include intended recipient data 702, delivery data 704, manager data 706, storage data 708, delivery instructions 714, intended recipient instructions 716, and manager instructions 718. In other embodiments, memory system 700 may not include all of the components listed and/or may include other components in addition to or instead of those listed above.

Memory system 700 may be an embodiment of the memory system 406 in which computer system 400 is an embodiment of the lock interface 112 or control terminal 110 of FIG. 1A(2). In at least one embodiment, the recipient data, delivery data, and/or manager data may be stored in the user database 408 of the memory system 406.

Intended recipient data 702 includes information that relates to intended recipient 650. In at least one embodiment, intended recipient data 702 may include any of a variety of different types of information about intended recipients, such as names, mailing addresses, e-mail addresses, phone numbers, instant messaging addresses, billing information, other contact information, account information, and/or default service preferences. In this specification, the terms "data" and "information" may be substituted one for the other to obtain different embodiments.

Delivery data 704 may include, but is not limited to, information about delivery service 630, scheduled time for deliveries and/or pickups, tracking information, and item information (e.g., the source of the item, size and/or weight, pickup instructions for items, storage room identifiers associated with items currently waiting to be picked up, delivery time, pickup time, etc.). In at least one embodiment, delivery data 704 includes an expected date and/or time of when the item is expected to be ready for pickup and is expected to be waiting in the storage room. In at least one embodiment, delivery data 704 includes information regarding the status of the items, such as shipped, in transit, out for delivery, delivered, whether and/or when being picked up, etc. If there are multiple locations where storage rooms are located or items for the same intended recipient 650 are dropped off at different storage rooms, delivery data 704 may include information about locations and items at those locations that are waiting to be picked up.

Manager data 706 includes information that relates to at least one manager 660. In at least one embodiment, manager data 706 includes location, hours, and/or contact information about at least one manager 660 and about the house account associated with the manager 660. In at least one embodiment, manager data 706 includes information about more than one manager 660, and may include information about which manager is managing which building or entity that is associated with which storage locations 608. In at least one embodiment, if multiple house accounts or managers are associated with one storage location, manager data 706 includes information about the managing scope or entities of each manager 660, so that the server 620 may decide which house account or manager 660 to contact if an item is delivered to an unregistered or unlisted intended recipient 650.

Storage data 708 may include machine information about locations and/or operating hours of all storage locations, numbers of optional storage areas 611*a-n* of each storage location, sizes and/or shapes of optional storage areas 611*a-n*, which one of locks 613*a-n* is controlling which one of optional storage areas 611*a-n*, which optional storage areas 611*a-n* are currently in use, time of storage, etc. In at least one embodiment, storage data 708 may be checked online and/or via a user interface.

Delivery instructions 714 may include instructions which when implemented causes the server 620 to communicate with delivery service 630, assign and/or control access to storage rooms for items or other deliveries, and/or managing delivery data 704. In at least one embodiment, delivery instructions 714 allows delivery service 630 to register to storage system 600 in order to access storage locations 608 using an access code, optionally designated by the server 620. In at least one embodiment, delivery instructions 714 when activated extracts and analyzes information received from the delivery service 630. For example, delivery instructions 714 when activated may cause the server 620 to retrieve item information and/or mailing information from delivery service 630 and update delivery data 704 in the server 620. In another example, delivery instructions 714, when implemented by a processor, may request and/or transmit confirmation information, confirming that one or more items were deposited and/or picked up. Delivery instructions 714, when implemented by a processor may update information in the system of delivery service 630 and/or delivery data 704 in the server 620. In at least one embodiment, delivery instructions 714, when implemented by a processor assigns a storage room for deposit items, and records whether and/or when an item is dropped off and/or picked up. In at least one embodiment, delivery instructions 714, when implemented by a processor keep track of the period of time an item is stored in storage locations 608, and identifies items that are still unclaimed after a period of time (e.g., one week, one month, six months, etc.). In this embodiment, delivery instructions 714, when implemented by a processor may notify delivery service 630 that an item(s) was not picked up during that period of time. Additionally or alternatively, delivery instructions 714, when implemented by a processor may identify when an item may need to be returned to sender, because, for example, the recipient has not picked up the item after given amount of time after the item has been delivered.

Intended recipient instructions 716 may include machine instructions, which when implemented causes the server 620 to interact with the intended recipient 650, register and manage intended recipient data 702, search for intended recipient 650, authenticate, and/or transfer information to intended recipient 650. The transfer of information that intended recipient instructions 716 controls may include a direct interaction with the intended recipient 650 or an interaction that occurs via the manager 660. For example, intended recipient 650 may directly interact with the server 620, which implement the intended recipient instructions 716, by logging on to a website associated with the storage system 600 or server 620, if memory 700 is memory 406. Alternatively, intended recipient 650 may directly interact with the server 620, which implement the intended recipient instructions 716, via phone 653 and either talk to a representative or interact with automated telephone services. In this embodiment, intended recipient instructions 716 may include automated telephone services or an automated answering machine that includes a voice menu (and the voice responses of the user may be converted into machine instructions that are automatically sent to the intended recipient data 702 and/or delivery service data 704). In yet another embodiment, intended recipient 650 may call or contact delivery service 630 or manager 660. The delivery service 630 or manager 660 may then input information about the intended recipient into or retrieve information from server 620 that implements intended recipient instructions 716.

In at least one embodiment, the intended recipient instructions 716, when implemented causes the server 620 to perform a search in the intended recipient data 702, and the intended recipient instructions 716 may cause the server 620 to return the searched information about the intended recipient to storage terminal 615 if the intended recipient 650 is registered. In another embodiment, if intended recipient 650 is not registered thus cannot be found in intended recipient data 702, the intended recipient instructions 716 may cause the server 620 to return a message to the storage terminal 615 indicating that intended recipient 650 cannot be found in the server 620. In at least one embodiment, the intended recipient instructions 716 may cause the server 620 to request for information of unregistered intended recipients from the manager 660. In at least one embodiment, an intended recipient may be registered in the storage system 600 using another name or title (e.g., middle name, the title of the company, etc.), which is different from the name on the mailing label of the item. In this embodiment, the delivery service 630 may not find the intended recipient using the name on the mailing label but the manager 660 may be able to identify the intended recipient and return the registered intended recipient name and/or other information. Intended recipient instructions 716 may automatically set up new accounts in the server 620 for new intended recipients after the server 620 receiving new information about the intended recipient from the manager 660. In at least one embodiment, the intended recipient instructions 716 include a user interface for the intended recipient 650 to register an account, enter information, check an item's delivery information, and/or communicate with the storage system 600.

In at least one embodiment, the intended recipient instructions 716, when implemented cause lock interface 112 or control terminal 110 and/or server 620 to contact the intended recipient 650 with pickup information after an item(s) is delivered. In at least one embodiment, the intended recipient instructions 716 may include instructions that determine intended recipient preferences, such as preferred time and method to contact the intended recipient 650, preferred delivery locations, etc. For example, the intended recipient instructions 716 sends notifications at the preferred time period (e.g., in the morning, or after 7:00 pm, etc.) and/or via the preferred contact method (e.g., via email, or text message, etc.) for the intended recipient 650. In another example, intended recipient instructions 716 may record a preferred storage location selected by the intended recipient 650, and may send the intended recipient preference to the delivery service 630. In an embodiment, the intended recipient preferences are stored in the intended recipient data 702, which needs to be accessed by the intended recipient preferences. In another embodiment, the intended recipient instructions 716, by default, causes the sending of a text message, an email, and/or a voice message to the intended recipient 650 when an item(s) is ready to be picked up in the storage locations 608 that are closest to the intended recipient 650 (e.g., in the apartment building or office building of the intended recipient 650).

Manager instructions 718 may include machine instructions, which when implemented causes the server to communicate with the manager 660, register a house account associated with the manager 660, manage the manager data 702, search and/or identify the manager 660, and/or transfer information to the manager 660. In at least one embodiment, manager instructions 718 allows the manager 660 to register a house account in the server 620 on a website associated with the storage system 600 or server 620. In at least one embodiment, the manager instructions 718, when implemented causes the server 620 to contact the manager 660 and transmit photographs of mailing labels and/or other information to the house account of the manager 660, inquire the manager 660 to identify the intended recipient 650 and feedback with information about the intended recipient 650. In at least one embodiment, the manager instructions 718, when implemented causes the server to update the intended recipient data 702 with information received from the manager 660. In at least one embodiment, the manager instructions 718, when implemented, causes the server 620 to send a request to the manager 660, which includes item information and access code, to contact the intended recipient 650. In at least one embodiment, if more than one house account of more than one manager shares one storage location, the manager instructions 718, when implemented causes the server 620 to determine which house account to contact based on the manager data 706 and item data 704. For example, if two office buildings share one storage location, the manager instructions 718, when implemented identifies which building the unregistered or not-listed intended recipient 650 is located based on the mailing label in order to contact the manager of the building.

In an embodiment, the delivery data 704 may be updated by delivery instructions 714, intended recipient instructions 716, and/or manager instructions 718. For example, the delivery instructions 714 may update the delivery data 704 after the item is deposited by updating the time and storage identifier of the storage room in the storage locations 608. In an embodiment, delivery data may be updated by the intended recipient instructions 716 or manager instructions 718 to show whether the intended recipient 650 was notified to pick up the item, at the time that, or shortly after, the intended recipient 650 is, or was, contacted by the intended recipient instructions 716 or manager instructions 718 to pick up the item. Alternatively, all or part of delivery data 704 is created and/or updated by representatives of the delivery service 630.

Figure 8:
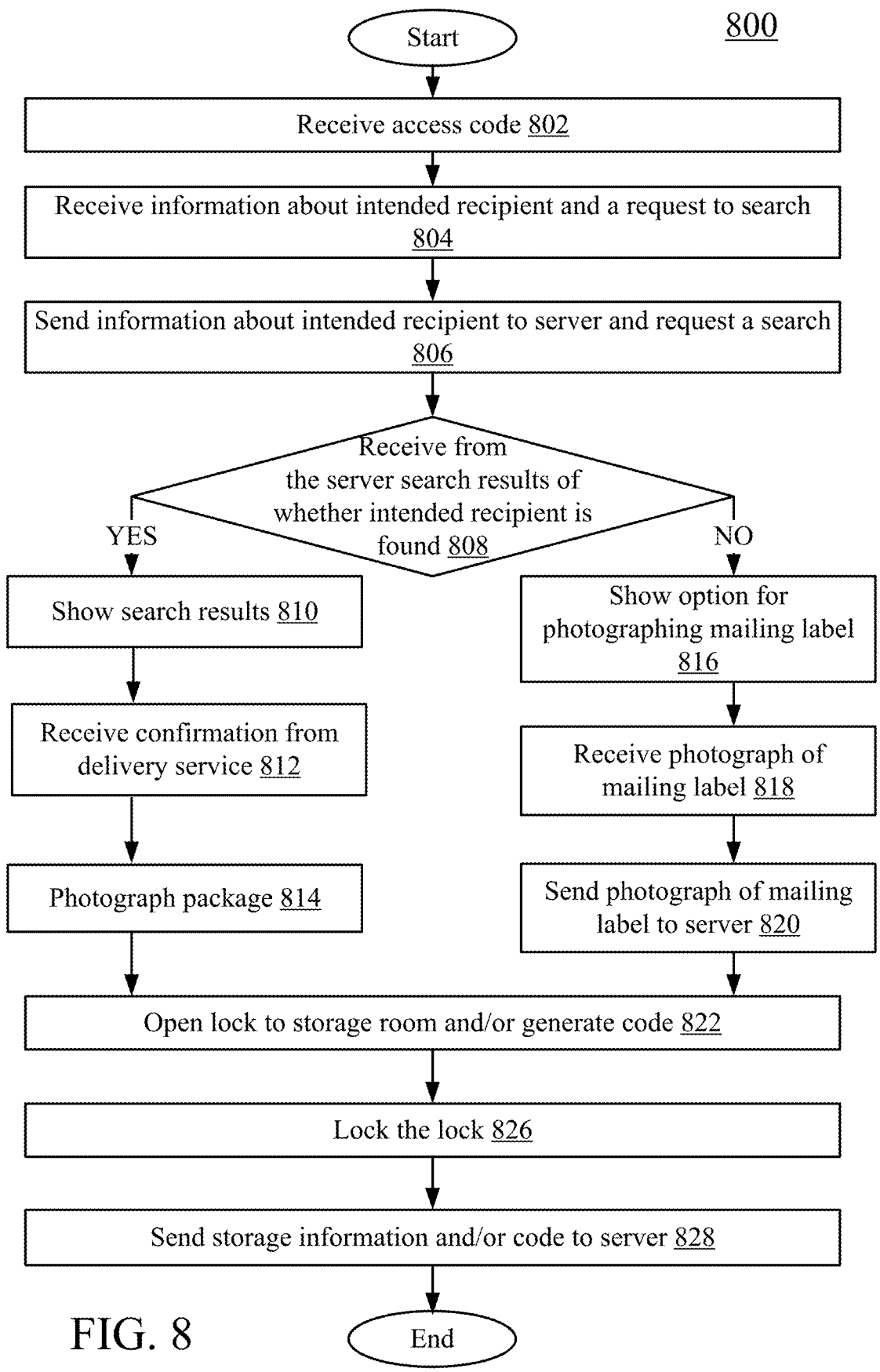
FIG. 8 shows a flowchart of an embodiment of a method for handling items delivered to the storage room optionally having storage areas that are locked by the lock system of FIG. 1.

FIG. 8 shows a flowchart of an embodiment of a method 800 for handling items delivery into the storage rooms that are locked by the lock system 100a of FIG. 1A. Method 800 is an embodiment of method 450.

In step 802, an access code is received at storage terminal 615, which may be entered by delivery service 630.

In step 804, information about intended recipient 650, such as intended recipient name, is received at storage terminal 615 with an inquiry to search for the intended recipient 650 in the storage system 600.

In step 806, the information about the intended recipient 650 is sent from storage terminal 615 to server 620 with a request to perform a search in intended recipient data 702 of server 620.

In step 808, search results are received at storage terminal 615 from server 620. If the intended recipient 650 is registered to storage system 600 and found in intended recipient data 702, the search results include information about the intended recipient 650, or information about each intended recipient if more than one intended recipient is registered with the same name. If intended recipient 650 is not found in intended recipient data 702, a message (e.g., "intended recipient not found") is received at storage terminal 615.

In optional step 810, if information about the intended recipient 650 is found in server 620, the search results are displayed at storage terminal 615 or on the handheld device of the delivery service 630. Optionally, more than one intended recipient 650 may be found in server 620 who are registered with the same name.

In optional step 812, a confirmation is received at storage terminal 615 about the intended recipient 650 to deliver the item by delivery service 630. If more than one intended recipient 650 is found, delivery service 630 may select the intended recipient 650 associated with the item based on other information displayed, such as telephone numbers, addresses, etc.

In optional step 814, the package being delivered is photographed. In an embodiment, all packages being delivered are photographed. The photograph may be used for tracking the delivery of the package instead of a bar code, and the photograph of the package is stored on the server, so as to be available for viewing by the sender as a confirmation that their package was delivered.

In step 816, if the intended recipient 650 is not found in server 620, options may be shown at storage terminal 615 for photographing the mailing label of the item using camera 616 or 316. Alternatively, another option allows the delivery service 630 to enter information about the intended recipient 650 or mailing label information via storage terminal 615. Optionally, a message such as "customer not found" may be displayed at storage terminal 615 before or simultaneously while providing the options.

In step 818, a photograph of the mailing label and/or information entered by delivery service 630 is received at storage terminal 615.

In step 820, the photograph of the mailing label and/or information entered by delivery service 630 is uploaded from storage terminal 615 to server 620. In an embodiment, the photograph is sent to the sender's account as confirmation that the package was delivered.

In step 822, a lock to the storage room is opened by storage terminal 615. As part of the step 822, the lock interface 112 sends a signal to open the electronic lock selected by the storage terminal 615 or control terminal 110. Optionally, a code is generated by storage terminal 615, which code may be used to open the lock and access the same storage room by the intended recipient 650.

In optional step 826, the lock to the storage room is locked by storage terminal 615. As part of the step 822, the lock interface 112 sends a signal to lock the electronic lock. Alternatively, the electronic lock is configured to become locked when the door is closed by the delivery service 630.

In optional step 828, storage information including a storage identifier is sent by storage terminal 614 to server 620. Optionally the code generated by storage terminal 615 is also sent to server 620.

In an embodiment, each of the steps of method 800 is a distinct step. In at least one embodiment, although depicted as distinct steps in FIG. 8, steps 802-828 may not be distinct steps. In other embodiments, method 800 may not have all of the above steps and/or may have other steps in addition to or instead of those listed above. The steps of method 800 may be performed in another order. Subsets of the steps listed above as part of method 800 may be used to form their own method.

Figure 9:
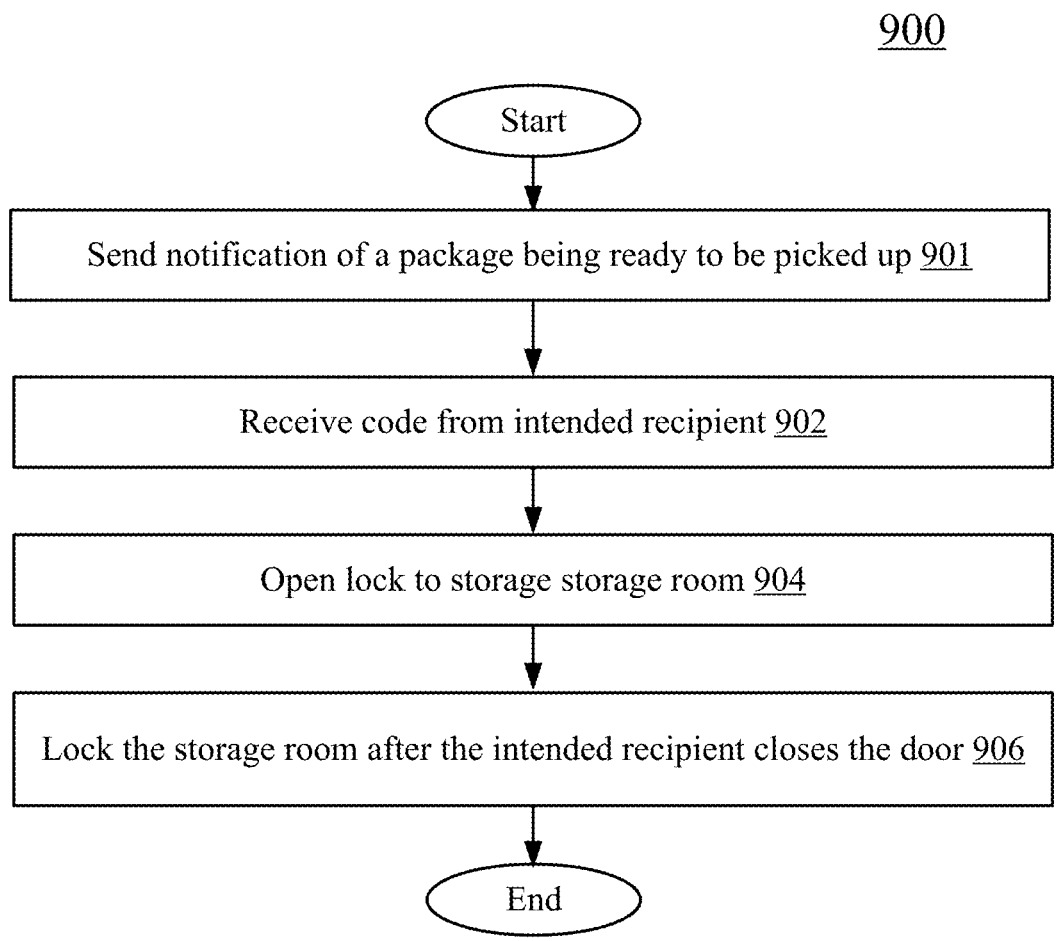
FIG. 9 shows a flowchart of an embodiment of a method for handling items to be picked up from the storage room that are locked by the lock system of FIG. 1.

FIG. 9 shows a flowchart of an embodiment of a method 900 for handling items to be picked up from the storage room(s) that are locked by the lock system 100a of FIG. 1.

In step 901, the storage terminal 615 sends to the intended recipient a notification of a package being ready to be picked up.

In step 902, a code is received at storage terminal 615, optionally entered by an intended recipient 650 (whom earlier received the code and a notification that an item was waiting to be picked up) at the kiosk 14. Optionally, step 902 also includes receiving a signature or other forms of identification of the intended recipient 650, if the delivery service requested a signature, for example. As part of step 902, the code is sent by a user device and received at the storage terminal 615 or control terminal 110, via the network 140.

In step 904, a lock to a storage terminal that matches the code and stores the item associated with the intended recipient 650 is opened by storage terminal 615. As part of step 904, the lock interface 112 or control terminal 110 determines that the code received at the kiosk or optionally from the user device matches the predetermined code for the storage room, and the lock interface 211 sends a signal to open the electronic lock.

In optional step 906, the lock to the same storage room is locked by storage terminal 615 after the intended recipient 650 closes the door of the storage room. Optionally as part of the step 904, the lock interface 211 sends another signal to lock the electronic lock. Alternatively, the electronic lock is configured by the lock interface 211 to become locked once the door of the storage room is closed by the intended recipient.

In an embodiment, each of the steps of method 900 is a distinct step. In at least one embodiment, although depicted as distinct steps in FIG. 9, steps 901-906 may not be distinct steps. In other embodiments, method 900 may not have all of the above steps and/or may have other steps in addition to or instead of those listed above. The steps of method 900 may be performed in another order. Subsets of the steps listed above as part of method 900 may be used to form their own method.

Figure 10:
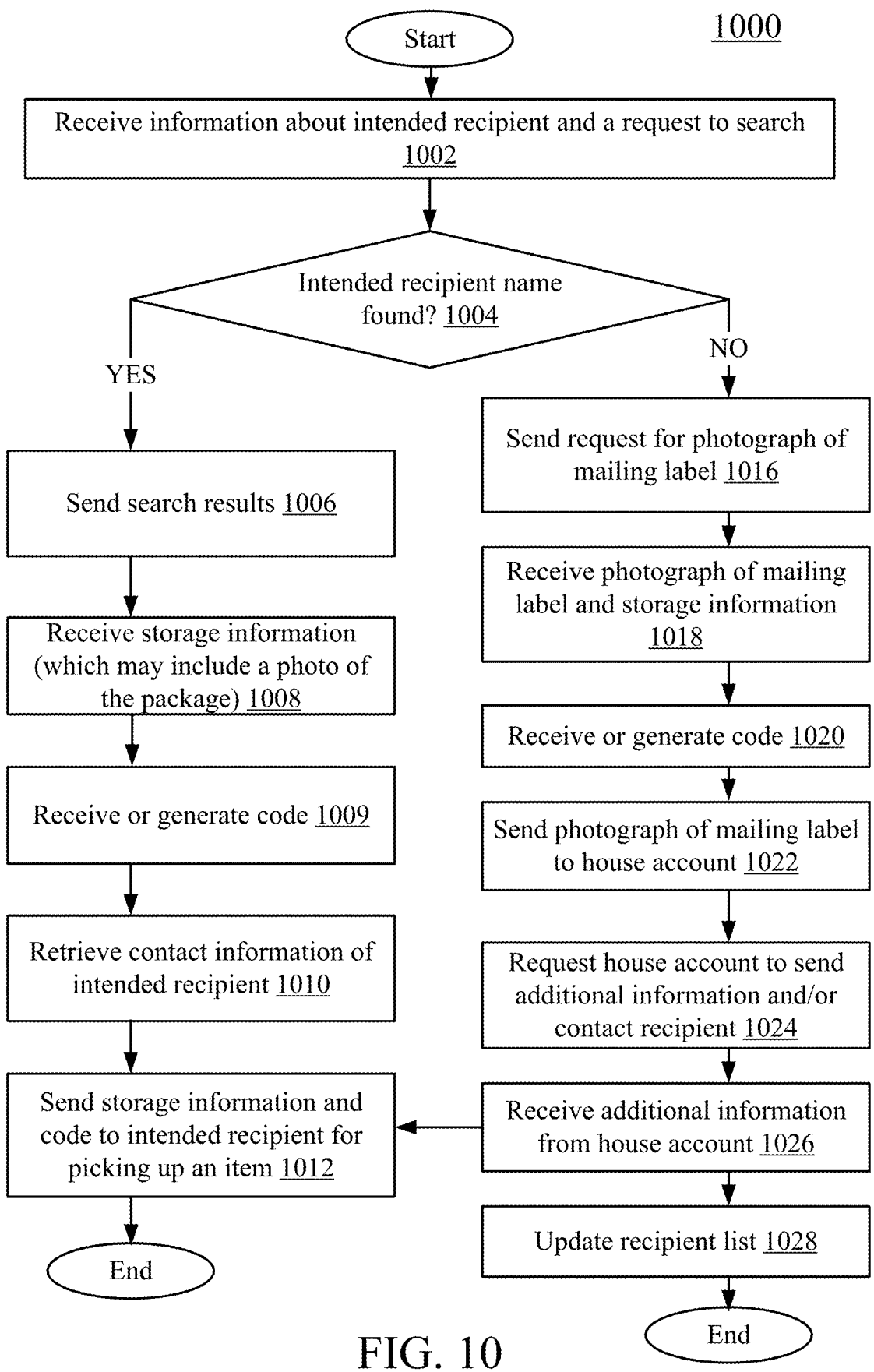
FIG. 10 shows a flowchart of an embodiment of a method for implementing the storage system of FIG. 6.

FIG. 10 shows a flowchart of an embodiment of a method 1000 for implementing the storage system 600 of FIG. 6.

In step 1002, information about intended recipient 650, such as the intended recipient name, and a request to search is received at server 620 from storage terminal 615 or handheld device of the delivery service 630.

In step 1004, a search is performed by server 620. In at least one embodiment, server 620 searches the intended recipient data 702 for intended recipient 650 that has the same intended recipient name provided by the storage terminal 615.

In step 1006, if the intended recipient 650 is registered and information about the intended recipient 650 is found in intended recipient data 702 of server 620, the search results are sent from server 620 to storage terminal 615 or handheld device of the delivery service 630. In at least one embodiment, if more than one intended recipient 650 is found with the same name, the search results may include other information for distinguishing between the different intended recipients that have the same name, such as telephone numbers, addresses, etc.

In step 1008, storage information including a storage identifier of a storage room that stores the item is received at server 620 from storage terminal 615 or handheld device of the delivery service 630, after the delivery service 630 selects a storage room that is available. In at least one embodiment, delivery service 630 is provided with selections of different sizes of storage rooms.

In step 1009, a code for accessing the storage room is received at server 620 from storage terminal 615. Alternatively, step 1009 includes generating a code to be associated with the storage room by server 620.

In step 1010, contact information of the intended recipient 650 is retrieved from intended recipient data 702 of server 620.

In step 1012, a notification including the storage information and the code is sent by server 620 to the intended recipient 650 for picking up the item in the storage room.

In step 1016, if the intended recipient 650 is not found in the intended recipient data 702 of server 620, a request is sent from server 620 to storage terminal 615 or handheld device of the delivery service 630 for sending a photograph of the mailing label of the item to server 620. Alternatively or additionally, a request is sent to storage terminal 615, which causes storage terminal 615 to instruct the delivery service 630 to enter information regarding the mailing label for intended recipient 650 (e.g., the intended recipient name, tracking information, etc.).

In step 1018, the photograph of the mailing label (and/or information entered by delivery service 630) and information about a storage room that stores the item is received at server 620 from storage terminal 615.

In step 1020, a code for accessing the storage room is received at server 620 from storage terminal 615. Alternatively, step 1020 includes generating a code to be associated with the storage room by server 620.

In step 1022, the photograph of the mailing label is sent from server 620 to a house account and/or to manager terminal 661 for identification. Alternatively or additionally, information that is entered by delivery service 630 is sent from server 620 to manager terminal 661. Optionally, step 1022 may include identifying the intended recipient based on the photograph of the mailing label by server 620, and sending the identified information about the intended recipient to manager terminal 661 or a house account. For example, the image of the mailing label may be decomposed into letters and numbers by Optical Character Recognizing (OCRing) the image.

In step 1024, a request is sent from server 620 to the house account or manager terminal 661 for sending additional information about the intended recipient 650 that is identified and retrieved by manager terminal 661 to server 620. Optionally, step 1024 may include requiring manager terminal 661 to contact the intended recipient 650. In at least one embodiment, steps 1022 and 1024 may be combined into one step—the receipt of the image of the label or other information on the item at server 620 may be treated as a request to send the image of the label and/or other information about the intended recipient 650 to a house account or manager terminal 661.

In step 1026, the additional information about the intended recipient 650 identified and retrieved by manager terminal 661 is received at server 620. In at least one embodiment, step 1026 is followed by step 1012.

In step 1028, if intended recipient 650 was not registered, the intended recipient 650 is registered in server 620 with the additional information provided by manager terminal 661. If intended recipient 650 was registered, but under a different name or title, and alias for the intended recipient 650 may be added, so that in the future the intended recipient 650 may be found no matter which name is used. Optionally, step 1028 includes obtaining an approval or confirmation from the intended recipient 650 before registering the intended recipient 650 in server 620. Optionally, step 1028 includes notifying the intended recipient 650 by the server 620 with newly registered account information.

In an embodiment, each of the steps of method 1000 is a distinct step. In at least one embodiment, although depicted as distinct steps in FIG. 10, steps 1002-1028 may not be distinct steps. In other embodiments, method 1000 may not have all of the above steps and/or may have other steps in addition to or instead of those listed above. The steps of method 1000 may be performed in another order. Subsets of the steps listed above as part of method 1000 may be used to form their own method.

Figure 11:
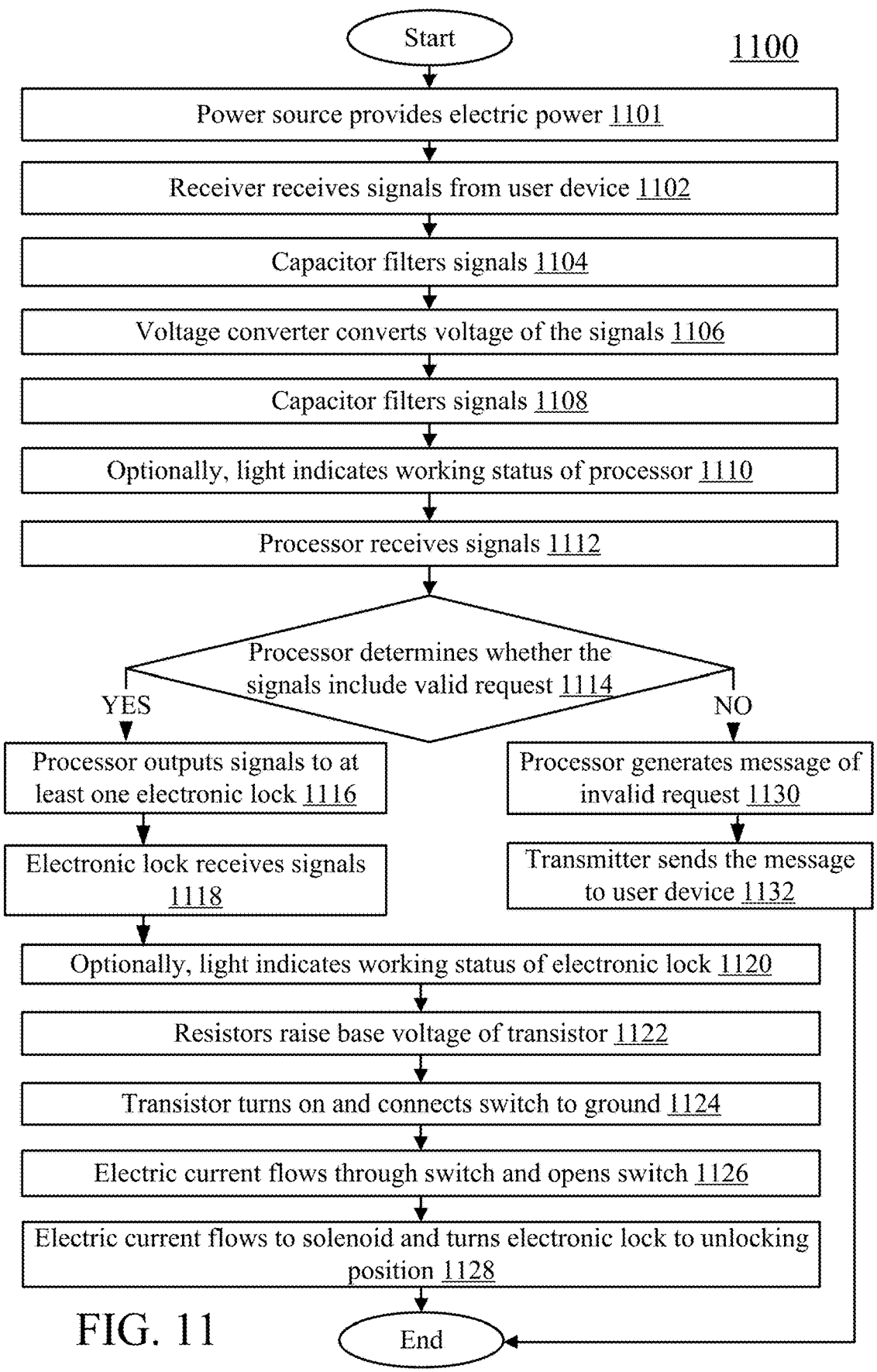
FIG. 11 shows a flowchart of an embodiment of a method of the lock interface controlling the electronic locks.

FIG. 11 shows a flowchart of an embodiment of a method 1100 of the lock interface controlling the electronic locks.

In step 1101, the power source 201 provides electric power to the circuit of the lock interface 200.

In step 1102, the receiver 202 receives wireless signals transmitted by the kiosk 14 or user devices 130*a-n*. In an embodiment, the signals are received by the control terminal 110 or storage terminal 615.

In step 1104, the capacitor 205 filters the signals.

In step 1106, the voltage converter 204 converts voltage of the signal (e.g., converts 12V signal to 5V signal).

In step 1108, the capacitor 206 and 207 filter the signals.

In optional step 1110, the light 208 indicates the working status.

In step 1112, the processor 210 receives the signals.

In step 1114, the processor 210 determines whether the signals include a valid request for opening the electronic locks. If the request is determined to be valid, the method 1100 proceeds to step 1116. If the request is invalid, the method 1100 proceeds to step 1130.

In step 1116, the processor 210 outputs signals to at least one electronic lock. In an embodiment, the electronic lock is designated in the request received.

In step 1118, the circuit 300 of the electronic lock receives the signals.

In optional step 1120, the light 308 indicates the working status of the circuit 300 of electronic lock.

In step 1122, the resistors 306 and 307 divert the voltage and raise the base voltage of transistor 305.

In step 1124, the transistor 305, as a result of the step 1122, is turned on and connects the switch 303 to the ground 203. Transistor 305 may be replaced with another threshold device, and/or electronic switch. Threshold device is a device that allows a current to flow or turns on a voltage, when a predetermined voltage or current threshold is reached. Some examples of threshold devices are Zener diodes, avalanche diodes, vacuum tubes, and metal-insulator-metal (MIM) devices.

In step 1126, electric current flows through the switch 303 (which may be a relay, another transistor, or threshold device) and thereby opens the switch 303.

In step 1128, electric current flows to the solenoid 176 and thereby turns the electronic lock to the unlocking position. Optionally, transistor 305 may directly control solenoid 176 instead of controlling solenoid 176 by controlling switch 303).

As mentioned above, if in step 1114, it is determined that the request to open the door is invalid, the method 1100 proceeds from step 1114 to step 1130. In step 1130, the processor 210 generates a message of invalid request, if the request is determined to be invalid in the step 1114.

In step 1132, a transmitter (e.g., in the output system 409 or input/output system 410) sends the message of invalid request to the kiosk 14 or user device.

In an embodiment, each of the steps of method 1100 is a distinct step. In at least one embodiment, although depicted as distinct steps in FIG. 11, steps 1101-1132 may not be distinct steps. In other embodiments, method 1100 may not have all of the above steps and/or may have other steps in addition to or instead of those listed above. The steps of method 1100 may be performed in another order. Subsets of the steps listed above as part of method 1100 may be used to form their own method.

Figure 12:
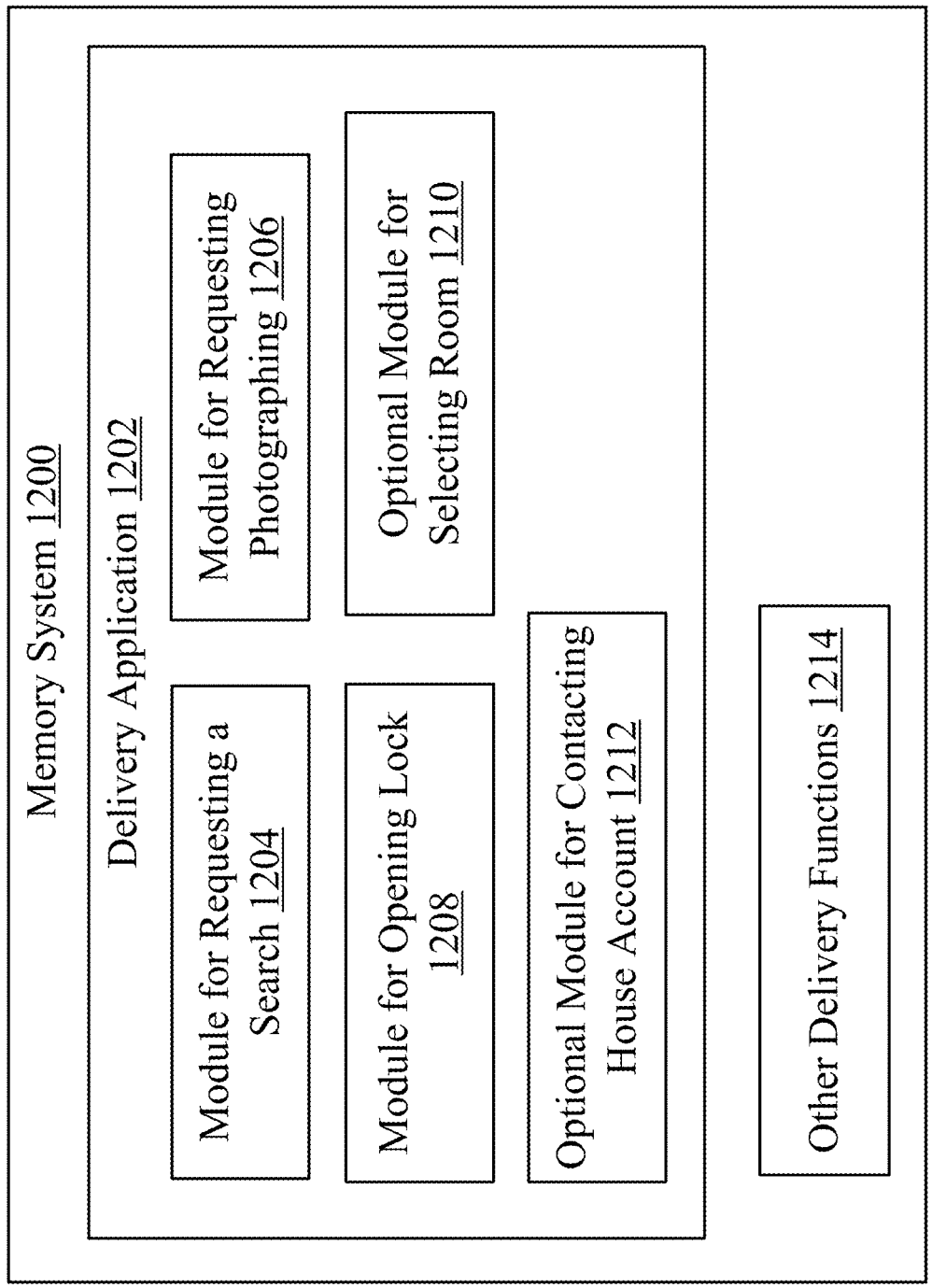
FIG. 12 shows a block diagram of an embodiment of a memory system of an optional user device that may be used by the delivery service.

FIG. 12 shows a block diagram of an embodiment of a memory system 1200 of the optional user device (an optional terminal, such as a tablet) that is used by the delivery service. The memory system 1200 includes at least a delivery application 1202, a module for requesting a search 1204, a module for requesting photographing 1206, a module for opening lock 1208, an optional module for selecting room 1210, an optional module for contacting house account 1212, and other delivery functions 1214. In other embodiments, the memory system 1200 may not include all of the components listed and/or may include other components in addition to or instead of those listed above.

FIG. 12 shows an embodiment of the memory system 1200 of an optional user device used by a delivery person/service.

Delivery application 1202 is an application that may be installed on the optional user device of the delivery service/person, such as optional tablet 12, which, when implemented, allows the delivery person to deliver items in the storage room to be picked up by the intended recipients. Delivery application 1202 interacts, via kiosk 14, with system 10. In at least one embodiment, the delivery application 1202 includes a user interface that presents a page to the delivery person/service to implement the delivery and interact with system 10.

Module for requesting a search 1204 is configured to receive, via the user interface of the delivery application 1202, user input (e.g., information about an intended recipient) from the delivery person to search for intended recipients. In an embodiment, the module for requesting a search 1204 transmits the request to the kiosk 14 and/or a server to perform the search.

Module for requesting photographing 1206 is configured to request, via the user interface, the delivery person to take a photo of the item using camera 15 (which as explained above is used similar to a barcode to track the whereabouts of the item being delivered—the photograph may be sent to the sender as confirmation of delivery of the item). Module 1206 may present the delivery person with a field for indicating that the package is ready for photographing. When the indication is received, module 1206 may send a signal to the kiosk 14, which in-turn sends a control signal to camera 15 causing camera 15 to take a picture of the package. In an embodiment, the module for requesting photographing 1206 receives the photo and sends the photo to the sender, intended recipient, and/or a house account.

Module for opening lock 1208 is configured to send instructions or request to the storage system to open the electronic lock to the storage room. In an embodiment, the module for opening lock 1208 sends user authentication, such as a user identifier identifying the delivery person and/or a passcode, to the kiosk along with the request to open the lock.

Optional module for selecting a room 1210 is an optionally module that is configured to receive, via the user interface of the delivery application 1202, user selection of a room(s) (or optionally a storage area in or outside of the storage room) for delivering the item. In an embodiment, in which the delivery person selects the room into which the items being delivered is placed, the optional module for selecting a room 1210 would be activated prior to unlocking the storage room and may be part of the module for opening the lock 1208.

Optional module for contacting house account 1212 is an optionally module that (if present) is configured to contact the house account regarding the recipient of the delivery. In an embodiment, when the intended recipient is not found during the search, the optional module for contacting house account 1212 sends a request with information about the item (e.g., recipient information, photo of the item) to the house account for a manager to identify and/or inform the intended recipient.

Other delivery functions 1214 include other delivery functions 1214 that may be used in other delivery methods and/or systems.

In an alternative embodiment, the camera 15 may be part of tablet 12 and/or may be operated manually, the delivery person may interact with kiosk 14 directly without tablet 12, tablet 12 may interact with lock 20 without using kiosk 14 as an intermediary, and/or tablet 12 may interact with a website provided by a remotely located web server, which may control lock 20 and/or camera 15.

Figure 13:
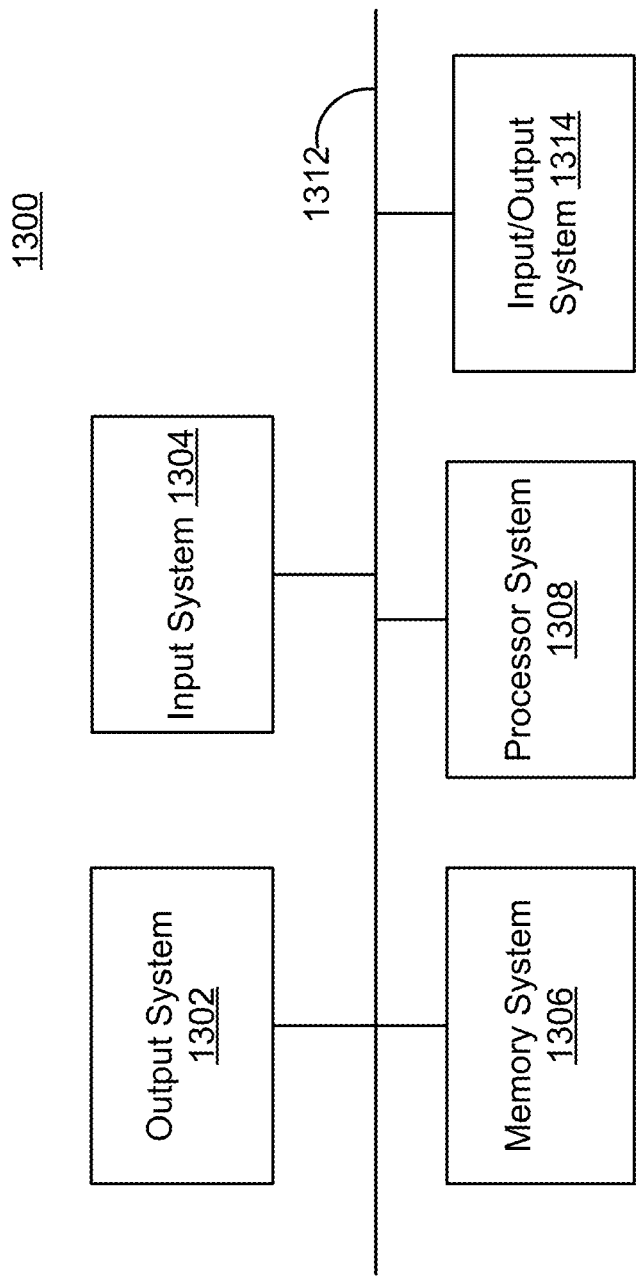
FIG. 13 shows a block diagram of an embodiment of computer system used in the system shown in FIG. 1.

FIG. 13 shows a block diagram of an embodiment of computer system 1300 used in the system shown in FIG. 1. The computer system 1300 may include output system 1302, input system 1304, memory system 1306, processor system 1308, communications system 1312, and input/output system 1314. In other embodiments, computer system 1300 may not include all of the components listed and/or may include other components in addition to or instead of those listed above.

Computer system 1300 may be an embodiment of server 120, intended recipient terminal 651, mobile terminal 655, and/or manager terminal 661. Output system 1302 may include any one of, some of, any combination of, or all of a monitor system, a handheld display system, a printer system, a speaker system, a connection and/or interface system to one or more sound systems, a connection and/or interface system to one or more peripheral devices, a connection and/or interface system to one or more computer systems, a connection and/or interface system to one or more LANs, and/or a connection and/or interface system to one or more WANs, for example.

Input system 1304 may include any one of, some of, any combination of, or all of a keyboard system, a mouse system, a track ball system, a track pad system, buttons on a handheld system, a scanner system, a microphone system, a connection and/or interface to a sound system, and/or a connection and/or interface system to a computer system, a connection and/or interface to an intranet, and/or a connection and/or interface to an internet (e.g., IrDA, USB), for example.

Memory system 1306 may include, for example, any one of, some of, any combination of, or all of a long term storage system, such as a hard drive; a short term storage system, such as random access memory and/or flash memory; and/or a removable storage system, such as a floppy drive or a removable drive. Memory system 1306 may include one or more machine-readable mediums that may store a variety of different types of information. The term "machine-readable medium" is used to refer to any nontransitory medium capable of carrying information that is readable by a machine. One example of a machine-readable medium is a computer-readable medium. Another example of a machine-readable medium is paper having holes that are detected that trigger different mechanical, electrical, and/or logic responses.

In an embodiment of computer system 1300 that is used as the server 620, memory system 1306 stores software for communicating with storage terminal 615, delivery service 630, intended recipient 650 and/or manager 660. In an embodiment of computer system 1300 that is used as the server 620, memory system 1306 stores software that may include machine instructions for storing and managing information about deliveries and intended recipients, registering intended recipient 650, contacting intended recipients, managing storage banks, managing storage areas, generating passwords, authenticating users, etc. In an embodiment of computer system 1300 that is used as the server 620, memory system 1306 may further store a downloadable application for accessing the system 600, which may be downloaded by electronic devices of delivery service 630, intended recipient 650, and/or manager 660. In an embodiment of computer system 1300 that is used as the intended recipient terminal 651 or mobile terminal 655, memory system 1306 stores software for communicating with storage terminal 615, server 620, delivery service 630, and/or manager 660. In an embodiment of computer system 1300 that is used as the intended recipient terminal 651 or mobile terminal 655, memory system 1306 stores software that may include machine instructions for receiving and displaying notifications of items, registering and accessing system 600, etc. In an embodiment of computer system 1300 that is used as the mobile terminal 655, memory system 1306 stores software that may further include machine instructions for entering passwords, capturing signatures, and uploading signatures, etc. In an embodiment of computer system 1300 that is used as the manager terminal 661, memory system 1306 includes software for communicating with storage terminal 615, server 620, delivery service 630, and/or intended recipient 650. In an embodiment of computer system 1300 that is used as the manager terminal 661, memory system 1306 includes software that may include machine instructions for storing and managing user information, receiving requests from server 620 for locating users, searching user information, sending user information to server 620, contacting users, etc. Memory system 1306 will be discussed further in connection with FIGS. 4 and 14.

Processor system 1308 may include any one of, some of, any combination of, or all of multiple parallel processors, a single processor, a system of processors having one or more central processors and/or one or more specialized processors dedicated to specific tasks. In an embodiment of computer system 1300 that is used as the server 620, processor system 1308 may implement machine instructions stored in memory system 1306, such as software for communicating with storage terminal 615, delivery service 630, intended recipient 650 and/or manager 660. In an embodiment of computer system 1300 that is used as the server 620, processor system 1308 may implement machine instructions stored in memory system 1306, such as software for storing and managing information about deliveries and intended recipients, software for registering and contacting intended recipients, software for managing storage banks and storage areas, and/or software for generating passwords, authenticating users, etc. In an embodiment of computer system 1300 that is used as the intended recipient terminal 651 or mobile terminal 655, processor system 1308 may implement machine instructions stored in memory system 1306, such as software for communicating with storage terminal 615, server 620, delivery service 630, and/or manager 660. In an embodiment of computer system 1300 that is used as the intended recipient terminal 651 or mobile terminal 655, processor system 1308 may implement machine instructions stored in memory system 1306, such as software for receiving, notifications of items, displaying notifications of items, registering intended recipients, and/or accessing system 600, etc. In an embodiment of computer system 1300 that is used as the mobile terminal 655, processor system 1308 may further implement machine instructions stored in memory system 1306, such as software for entering passwords, capturing signatures, and/or uploading signatures, etc. In an embodiment of computer system 1300 that is used as the manager terminal 661, processor system 1308 may implement machine instructions stored in memory system 1306, such as software for communicating with storage terminal 615, server 620, delivery service 630, and/or intended recipient 650. In an embodiment of computer system 1300 that is used as the manager terminal 661, processor system 1308 may implement machine instructions stored in memory system 1306, such as software for storing user information, managing user information, receiving requests from server 620 for locating users, searching for intended recipients, and sending user information to server 620, and/or contacting users, etc.

Communications system 1312 communicatively links output system 1302, input system 1304, memory system 1306, processor system 1308, and/or input/output system 1314 to each other. Communications system 1312 may include any one of, some of, any combination of, or all of electrical cables, fiber optic cables, and/or means of sending signals through air or water (e.g., wireless communications), or the like. Some examples of means of sending signals through air and/or water include systems for transmitting electromagnetic waves such as infrared and/or radio waves and/or systems for sending sound waves.

Input/output system 1314 may include devices that have a dual function as input and output devices. For example, input/output system 1314 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 1314 is optional, and may be used in addition to or in place of output system 1302 and/or input device 1304.

Figure 14:
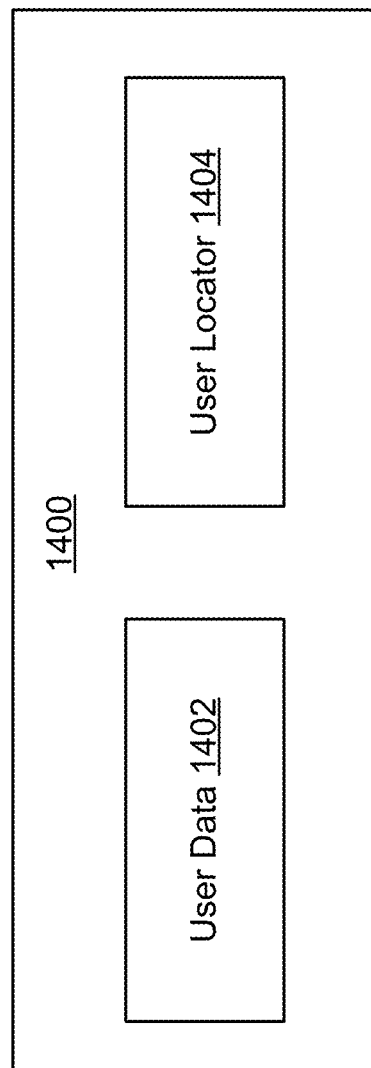
FIG. 14 shows a block diagram of an embodiment of a memory system that may be used in the manager terminal of FIG. 6.

FIG. 14 shows a block diagram of an embodiment of a memory system 1400 that may be used in the manager terminal 661 of FIG. 6. Memory system 1400 may include at least user data 1402 and user locator 1404. In other embodiments, memory system 1400 may not include all of the components listed and/or may include other components in addition to or instead of those listed above.

Memory system 1400 may be an embodiment of memory system 1306 in which computer system 1300 is an embodiment of manager terminal 661 of FIG. 6.

User data 1402 includes information that relates to users, residents, or employees of the building or entity that is managed by manager 660. In at least one embodiment, user data 1402 may include any of a variety of different types of information about users, such as names, mailing addresses, e-mail addresses, phone numbers, instant messaging addresses, billing information, other contact information, account information, and/or default service preferences.

User locator 1404 includes instructions for extracting, comparing, identifying, recognizing user information from photographs of mailing labels and/or information about the intended recipient 1140 received from server 620 and optionally entered by delivery service 630, when intended recipients are not found in intended recipient data 402. In at least one embodiment, user locator 1404 includes instructions and/or algorithms to extract information from images such as photographs of mailing labels. In another embodiment, user locator 1404 shows the photographs, optionally via a user interface at manager terminal 661, to an employee or representative of the managing office who then identifies or recognizes the intended recipients, and user locator 1404 receives information about the intended recipient 650 entered by the employee or representative. In at least one embodiment, user locator 1404 compares the information on the mailing labels to user information in user data 1402, and finds the user information that matches the mailing labels. In at least one embodiment, user locator 1404 sends the information identified and retrieved from user data 1402 to server 620 to update intended recipient data 402, or to register the intended recipients in server 620. In at least one embodiment, user locator 1404 retrieves contact information of the identified intended recipients and automatically sends notifications to the intended recipients when items are waiting to be picked up.

Figure 15:
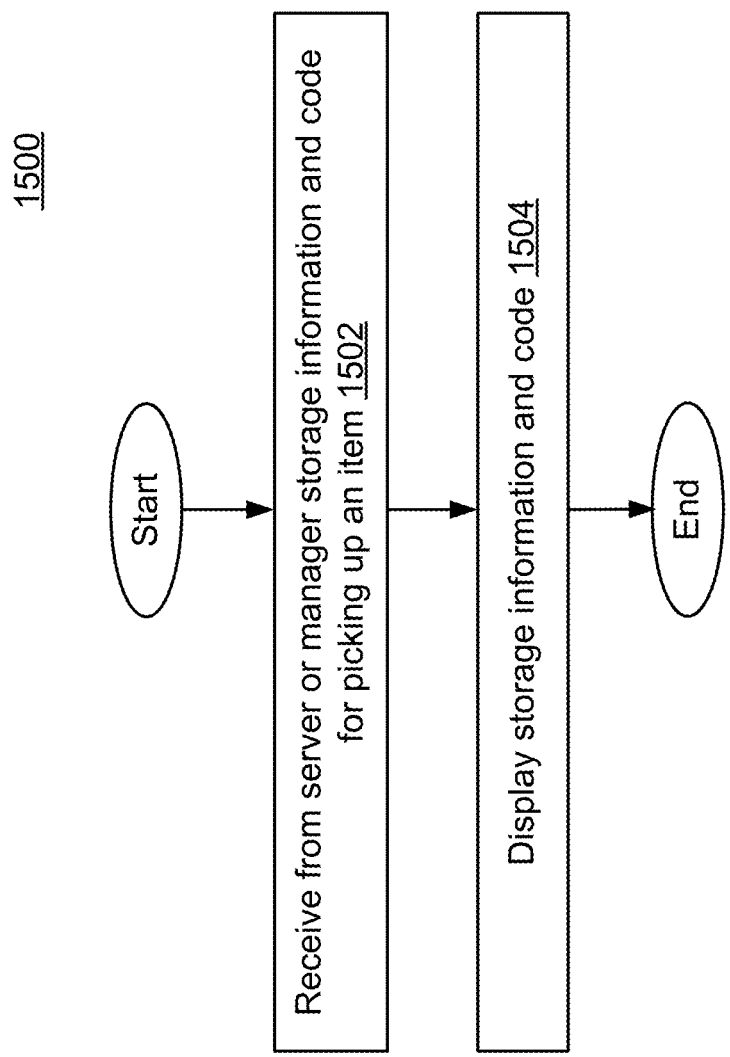
FIG. 15 shows a flowchart of an embodiment of a method for receiving notifications to the intended recipient of FIG. 6.

FIG. 15 shows a flowchart of an embodiment of a method 1500 for receiving notifications to intended recipient 650 of FIG. 6, optionally via intended recipient terminal 651, phone 653, and/or mobile terminal 655.

In step 1502, storage information and code for picking up an item is received at intended recipient terminal 651, phone 653, and/or mobile terminal 655.

In step 1504, the storage information and code is shown optionally via intended recipient terminal 651 or mobile terminal 655, for the intended recipient 650 to view. Optionally, the storage information and code is played as a voice message via phone 653 or mobile terminal 655.

In an embodiment, each of the steps of method 1500 is a distinct step. In at least one embodiment, although depicted as distinct steps in FIG. 15, steps 1502-1504 may not be distinct steps. In other embodiments, method 1500 may not have all of the above steps and/or may have other steps in addition to or instead of those listed above. The steps of method 1500 may be performed in another order. Subsets of the steps listed above as part of method 1500 may be used to form their own method.

Figure 16:
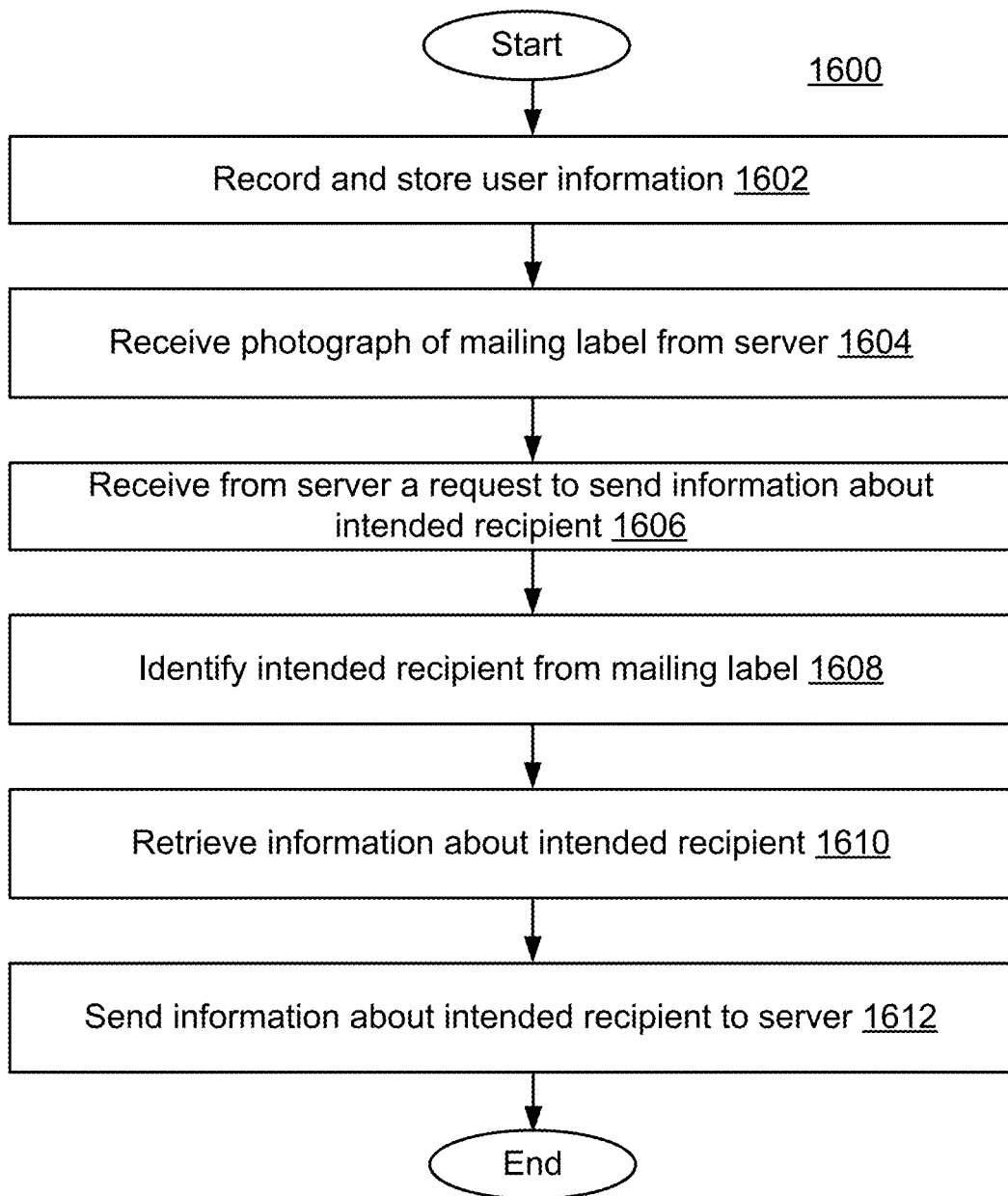
FIG. 16 shows a flowchart of an embodiment of a method for identifying the intended recipient of FIG. 6, which may be performed by the manager terminal of FIG. 6.

FIG. 16 shows a flowchart of an embodiment of a method 1600 for identifying the intended recipient 650 of FIG. 6, which may be performed by the manager terminal 661 of FIG. 6.

In step 1602, user information of the building or other entity that is managed by manager 660 is recorded and stored at manager terminal 661.

In step 1604, a photograph of mailing label is received at manager terminal 661 from server 620. Optionally, information about the intended recipient 650 is also received at manager terminal 661, which is entered by delivery service 630 and uploaded by storage terminal 615 to server 620.

In step 1606, an inquiry is received at manager terminal 661 from server 620 to send information about the intended recipient 650.

In step 1608, intended recipient 650 is identified by manager terminal 661. Methods of identifying intended recipient 650, which may be used in step 1608, were discussed in conjunction with user locator 1404 of FIG. 14.

In step 1610, information about the intended recipient 650 is retrieved from user data 1402 of manager terminal 661.

In step 1612, the information about the intended recipient 650 is sent from manager terminal 661 to server 620.

In an embodiment, each of the steps of method 1600 is a distinct step. In at least one embodiment, although depicted as distinct steps in FIG. 16, steps 1602-1612 may not be distinct steps. In other embodiments, method 1600 may not have all of the above steps and/or may have other steps in addition to, or instead of, those listed above. The steps of method 1600 may be performed in another order. Subsets of the steps listed above as part of method 1600 may be used to form their own method.

Figure 17:
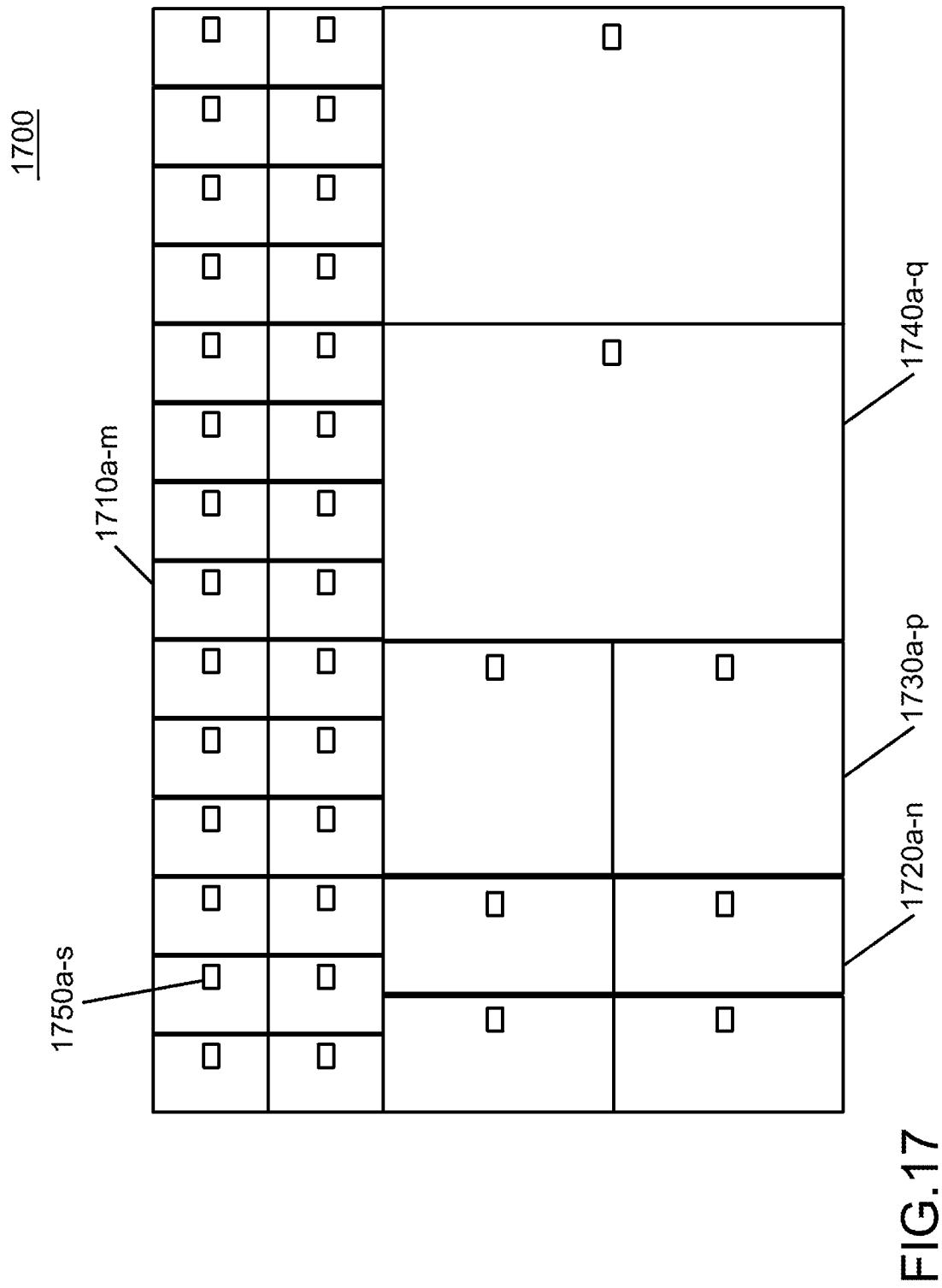
FIG. 17 shows a diagram of an embodiment of the storage areas of different sizes that may be used in the system of FIG. 1.

FIG. 17 shows a diagram 1700 of an embodiment of the storage areas of different sizes that may be used in the system of FIG. 1. FIG. 17 includes at least a set of small storage areas 1710*a-m*, a set of medium storage areas 1720*a-n*, a set of large storage areas 1730*a-p*, a set of oversized storage areas 1740*a-q*, and locks 1750*a-s*. In other embodiments, FIG. 17 may not include all of the components listed and/or may include other components in addition to, or instead of, those listed above.

FIG. 17 shows that storage areas of different sizes (e.g., small, medium, large, oversized) may be included in the system 100 for storing items of various sizes. In at least one embodiment, small storage areas 1710*a-m*, medium storage areas 1720*a-n*, large storage areas 1730*a-p*, and oversized storage areas 1740*a-q* are similar to the storage areas 611*a-n* described in conjunction with FIG. 6 except that small storage areas 1710*a-m*, medium storage areas 1720*a-n*, large storage areas 1730*a-p*, and oversized storage areas 1740*a-q* have different sizes and/or shapes. In at least one embodiment, small storage areas 1710*a-m*, medium storage areas 1720*a-n*, large storage areas 1730*a-p*, and oversized storage areas 1740*a-q* may be stacked and/or physically joined together. In another embodiment, there are spaces or structures separating one storage area from another. In at least one embodiment, the numbers of different sets of storage areas may be different (e.g., there are more small storage areas 1710*a-m* than oversized storage areas 1740*a-q* within one storage bank). In another embodiment, a storage bank may include the same number of at least two sets of storage areas (e.g., the number of large storage areas 1730*a-p* is the same as the oversized storage areas 1740*a-q*). In other embodiments, the numbers, sizes, and/or shapes of each set of storage areas may vary. In at least one embodiment, each of small storage areas 1710*a-m*, medium storage areas 1720*a-n*, large storage areas 1730*a-p*, and/or oversized storage areas 1740*a-q* is secured by one of locks 1750*a-s* that are similar to locks 613*a-n* discussed in conjunction with FIG. 6. In at least one embodiment, each of small storage areas 1710*a-m*, medium storage areas 1720*a-n*, large storage areas 1730*a-p*, and oversized storage areas 1740*a-q* is identified via a storage area number. In at least one embodiment, system 600 indicates how many of each set of storage areas are available to use.

In an embodiment, each of small storage areas 1710*a-m*, medium storage areas 1720*a-n*, and large storage areas 1730*a-p* differs from oversized storage areas 1740*a-q* in access and storage restrictions. At any given time, each storage area of small storage areas 1710*a-m*, medium storage areas 1720*a-n*, and large storage areas 1730*a-p* receives items for only one intended recipient 650. Another intended recipient's items may be placed in a given one storage area of small storage areas 1710*a-m*, medium storage areas 1720*a-n*, and large storage areas 1730*a-p* only after any item of another intended recipient that is in the same storage area is removed. Items belonging to two different intended recipients are not placed in the same storage area within any of small storage areas 1710*a-m*, medium storage areas 1720*a-n*, and large storage areas 1730*a-p*. In contrast, oversized storage areas 1740*a-q* may be shared by the items of multiple intended recipients simultaneously. In another embodiment, there may be other storage areas shared by the items of two intended recipients simultaneously. There may be some of small storage areas 1717*a-m*, medium storage areas 1720*a-n*, and large storage areas 1730*a-p* that are designated as shared areas, and that are therefore shared by the items of multiple intended recipients simultaneously and others that are not (and are reserved for use of only one intended recipient at-a-time).

Figure 18:
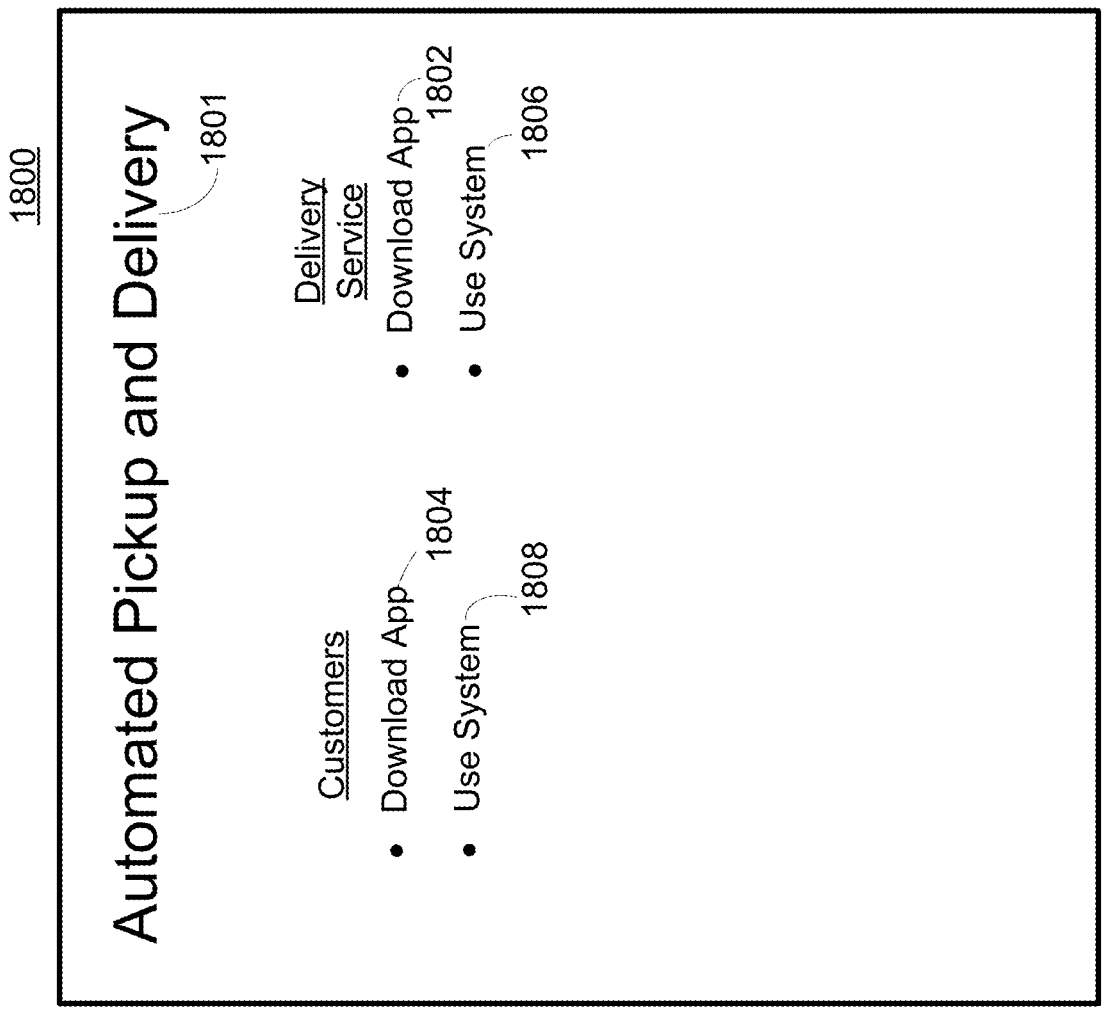
FIG. 18 is a diagram of an example of a web page for downloading an application that may be installed in mobile devices or for accessing the system directly via the web page.

FIG. 18 is a diagram of an example of a web page 1800 for downloading an application that may be installed in mobile devices or for accessing system 600 directly via web page 1800. Web page 1800 includes at least a title 1801, a delivery service download link 1802, a customer download link 1804, a delivery service enter system link 1806, and a customer enter system link 1808. In other embodiments, web page 1800 may not include all of the components listed and/or may include other components in addition to or instead of those listed above.

In at least one embodiment, web page 1800 includes a link for the delivery service 630 to download an application that may be installed in handheld devices used by delivery service 630. In at least one embodiment, webpage 1800 includes a link for the intended recipient 650 to download an application that may be installed in mobile terminal 655 used by intended recipient 650. In at least one embodiment, the applications for the delivery service 630 and the intended recipient 650 are different. In at least one embodiment, the delivery service 630 and intended recipient 650 download the same application. However, the application recognize whether the delivery service 630 or intended recipient 650 intends to access the system via the access code or password entered. In at least one embodiment, web page 1800 includes links for delivery service 630 and intended recipient 650 to directly access the system 600 on web page 610 to deliver and pick up items, respectively.

Title 1801 includes plain text showing that the web page 1800 is for access a storage system as discussed in conjunction with system 600. Delivery service download link 1802 is a link to a page for the delivery service 630 to download an application to the handheld devices of delivery service 630 for accessing system 600 in order to deliver items to storage bank 610. Customer download link 1804 is a link to a page for the intended recipient 650 to download an application to the mobile terminal 655 for accessing system 600 in order to pick up an item. Delivery service entry system link 1806 is a link to a page for the delivery service 630 to directly access system 600, via a website rather than using the application. Customer entry system link 1808 is a link to a page for the intended recipient 650 to directly access webpages for system 600 instead of using the application.

Screenshots

Figure 19:
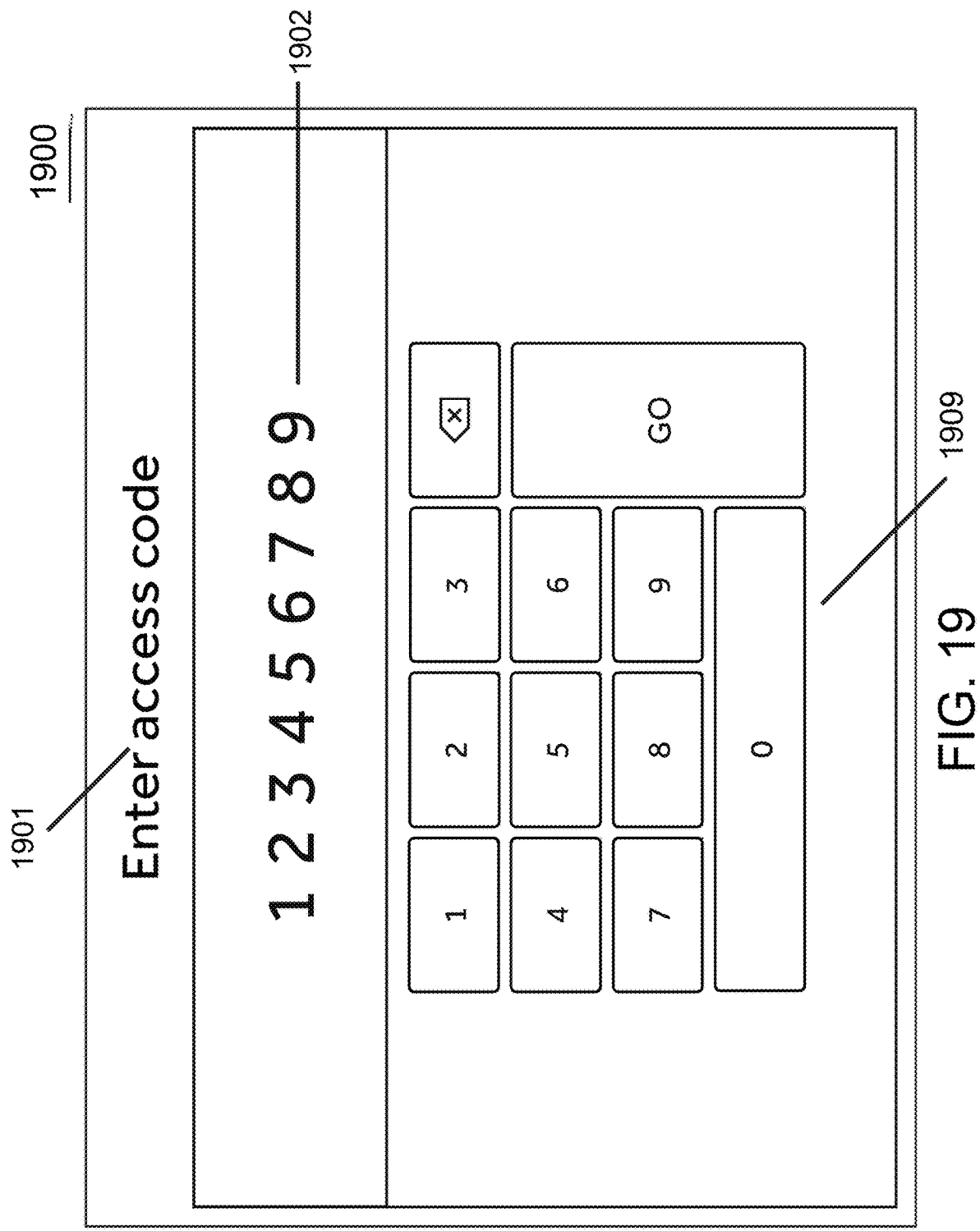
FIG. 19 is a screenshot of an example of a page for the delivery service of FIG. 6 to enter access code.

FIG. 19 is a screenshot of an example of a page 1900 for delivery service 630 to enter access code. Page 1900 includes at least instruction 1901, text field 1902, and keypad 1903. In other embodiments, page 1900 may not include all of the components listed and/or may include other components in addition to or instead of those listed above.

Instruction 1901 includes plain text indicating that the page 1900 is for entering access code. Text field 1902 displays the access code that is entered by the delivery service 630. The user enters the access code into text field 1902. Keypad 1903 is a keypad shown on a touch screen for the delivery service 630 to enter the access code. In at least one embodiment, keypad 1903 includes a numeric keypad including numbers 0 to 9, a delete key and an enter key (e.g., the key labeled with text "GO"). In other embodiments, keypad 1903 may include a representation of a standard computer keyboard or other combinations of keys. In at least one embodiment, the delivery service 630 enter the access code via keypad 1903 and press the enter key to access system 600 if the access code is successfully authenticated by server 620.

Figure 20:
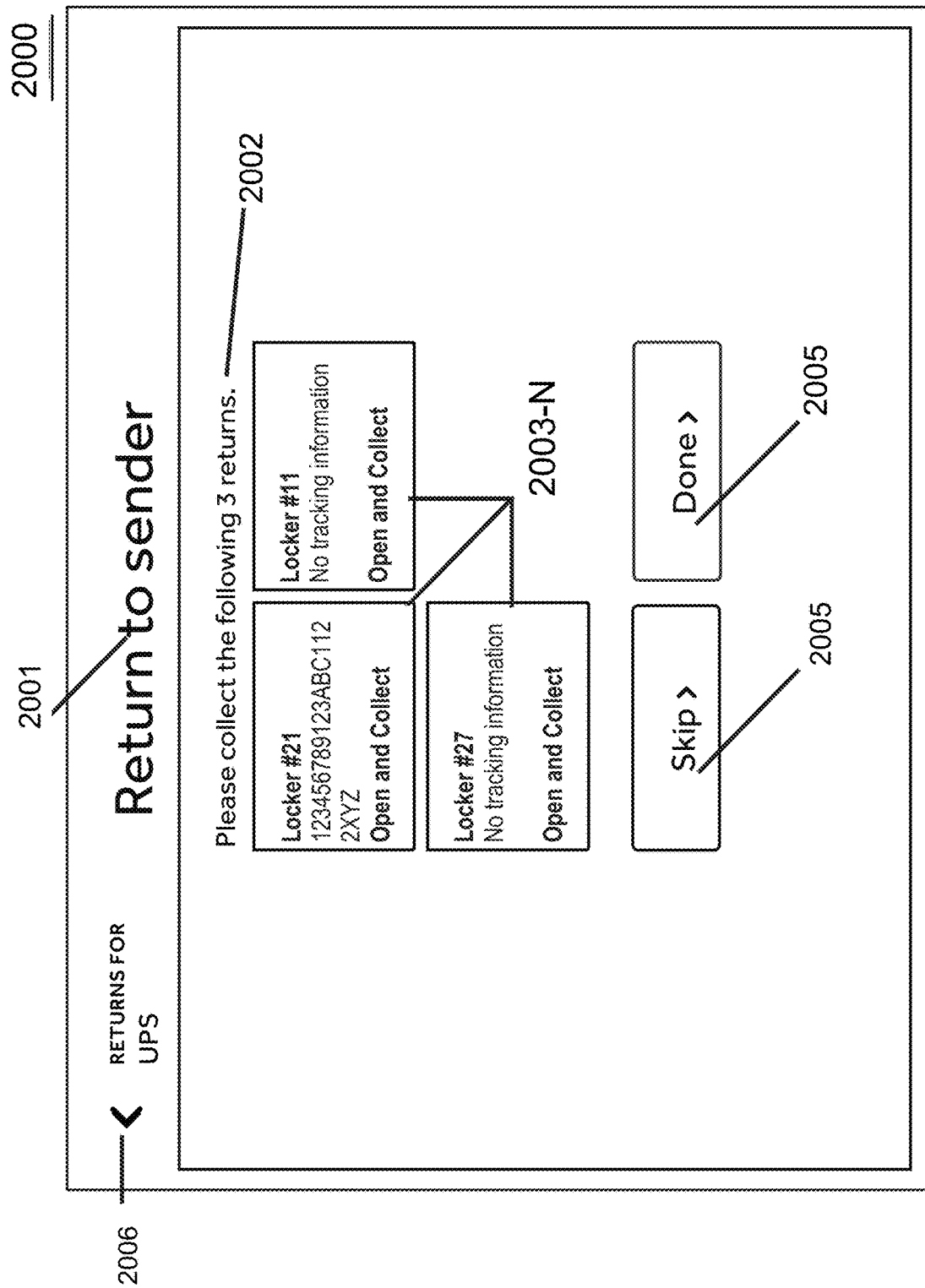
FIG. 20 is a screenshot of an example of a page showing unclaimed items for the delivery service of FIG. 6 to collect and return to the senders.

FIG. 20 is a screenshot of an example of a page 2000 showing unclaimed items for delivery service 630 to collect and return to the senders. Page 2000 includes at least title 2001, instructions 2002, return information 2003a-n, skip key 2004, done key 2005, and return link 2006. In other embodiments, page 2000 may not include all of the components listed and/or may include other components in addition to or instead of those listed above.

In at least one embodiment, page 2000 presents an interface that the delivery service 130 interacts with when collecting items that have been returned to the delivery service 130. Optionally, a similar page may be used for picking up items that were delivered a while ago, but have not been picked up by the recipients for an extended period of time. The delivery service 630 may select the items to collect and return to the senders, or may skip to proceed with new deliveries.

Title 2001 includes plain text showing that the page 2000 is for the delivery service 630 to collect returned or unclaimed items from the storage areas. The delivery service may then return the items to the senders. Instructions 2002 includes text showing the number of returns.

Return information 2003a-n includes links with texts showing the storage area numbers (e.g., locker number in FIG. 20), the tracking numbers (if available) of the items that have been returned or have not been picked up by the recipients. Sections 2003a-n includes information for opening the locks and collecting the items. In at least one embodiment, the delivery service 630 may select the items by clicking on the return information 2003 a-n, which may cause the system 600 to unlock the corresponding storage areas so that the delivery service 630 may pick up the items. In at least one embodiment, the section selected, after being clicked by delivery service 630, displays a message showing that the item was picked up by the delivery service 630, and the item information and/or storage information is updated in the server 620.

Skip key 2004 is a key (e.g., the key labeled "Skip >"), which when selected by the delivery service 630, causes storage system 615 to skip the steps associated with collecting the returned and/or unclaimed items. In at least one embodiment, delivery service 630 may skip collecting items and go to the page for searching the intended recipients. Done key 2005 is a key (e.g., the key labeled "Done >"), which when selected by the delivery service 630 confirms that the delivery service has collected all or some of the returned or unclaimed items. In at least one embodiment, done key 2005 cannot be selected until all of the returned or unclaimed items have been collected by the delivery service 630. In at least one embodiment, after collecting all the returned and/or unclaimed items and selecting the done key 2005, system 600 updates records pertaining to the items retrieved by delivery service 630, so that the records reflect the current status of the retrieved items. Return link 2006 is a link to a page for searching an intended recipient.

Figure 21:
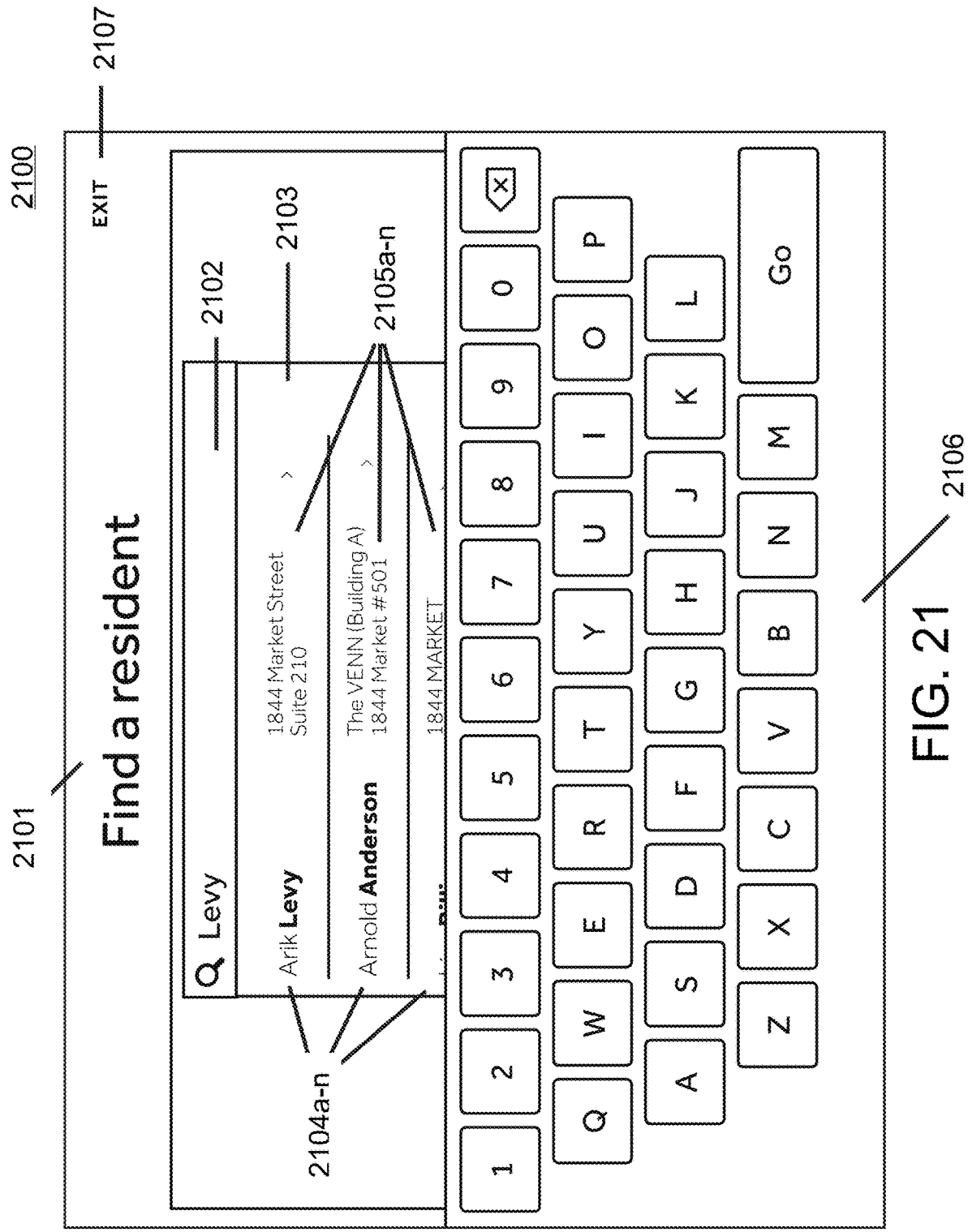
FIG. 21 is a screenshot of an example of a page for the delivery service of FIG. 6 to search for an intended recipient of FIG. 6.

FIG. 21 is a screenshot of an example of a page 2100 for delivery service 630 to search for an intended recipient 650. Page 2100 includes at least title 2101, a search field 2102, search results section 2103, names 2104a-n, addresses 2105a-n, keyboard 2106, and exit link 2107. In other embodiments, page 2100 may not include all of the components listed and/or may include other components in addition to or instead of those listed above.

In at least one embodiment, page 2100 presents an interface that the delivery service 630 interacts with for searching for an intended recipient by entering the name of the intended recipient and select from a list of search results.

Title 2101 includes plain text showing that the page 2100 is for finding an intended recipient (or finding a resident as shown in FIG. 21). Search field 2102 is a field for entering intended recipient name via a keyboard on the touch screen. Search results section 2103 is a section of the search results, or a drop-down list associated with the search results. The search results are based on the intended recipient name that has been entered by the delivery service 630. In at least one embodiment, the search results are retrieved from the server 620 and displayed in page 2100 in a list. In at least one embodiment, the search results include names 2104a-n, addresses 2105a-n, and/or other information about the intended recipients who have registered with the server 620. In at least one embodiment, the delivery service 630 may select from the search results of the intended recipient that matches the mailing label of the item. Keyboard 2106 is a representation of keyboard on the touch screen for the delivery service 630 to enter information about the intended recipient. Exit link 2107 is a link on the top right corner for returning to the home page as shown in FIG. 18.

Figure 22:
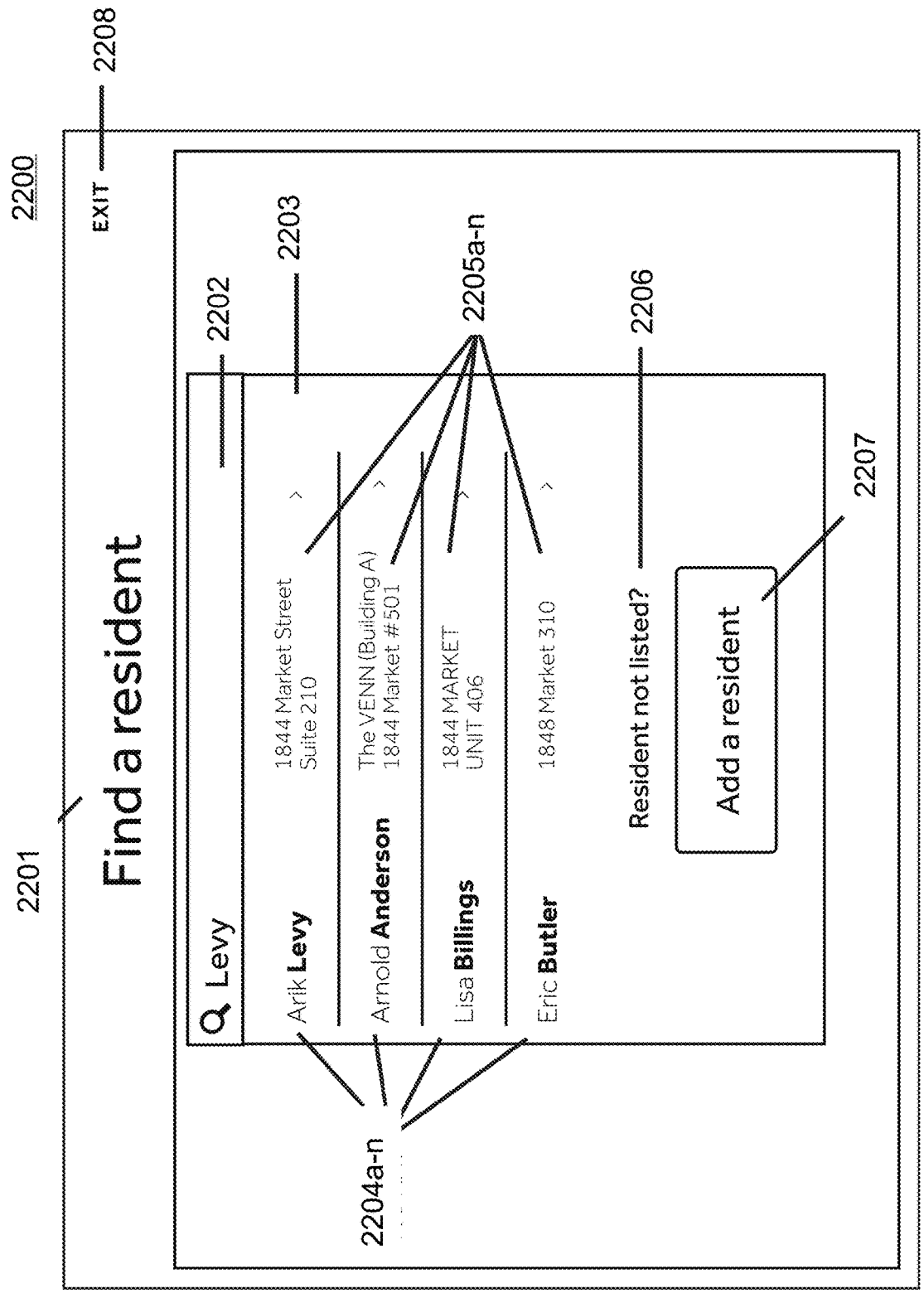
FIG. 22 is a screenshot of an example of a page for the delivery service of FIG. 6 to select an intended recipient from the search results or an option to add an intended recipient if the recipient is not found in the search results.

FIG. 22 is a screenshot of an example of a page 2200 for delivery service 630 to select an intended recipient from the search results or an option to add an intended recipient if the recipient is not found in the search results. Page 2200 includes at least title 2201, a search field 2202, search results section 2203, names 2204a-n, addresses 2205a-n, and exit link 2208, which are the same as title 2101, search field 2102, search results section 2103, names 2104a-n, addresses 2105a-n, and exit link 2107 as discussed in conjunction with FIG. 21. Page 2200 may further include instruction 2206 and add recipient link 2207. In other embodiments, page 2200 may not include all of the components listed and/or may include other components in addition to or instead of those listed above.

In at least one embodiment, page 2200 presents an interface for the delivery service 630 to select an intended recipient from the search results, or to select the option to add an intended recipient if the recipient of the item is not found in the search results. Instruction 2206 is text indicating how to add a recipient to the list of recipients. In the example, of FIG. 22, instruction 2206 is a question asking whether the recipient could not be found. Placing this question above a link labeled with an indication that by selecting the link the user may add a recipient, clarifies to the delivery service 630 how to add a recipient and when it may be desirable to add a recipient. In the example of FIG. 22, instruction 2206 is "Can't find resident?," because in the example of FIG. 22 the recipient is a resident of the building within which storage bank 610 is located. Add recipient link 2207 is a link to a page for adding a recipient. In the example of FIG. 22, add recipient link 2207 is labeled "Add resident," because the recipient is a resident of the building hosting the storage bank 610.

Figure 23:
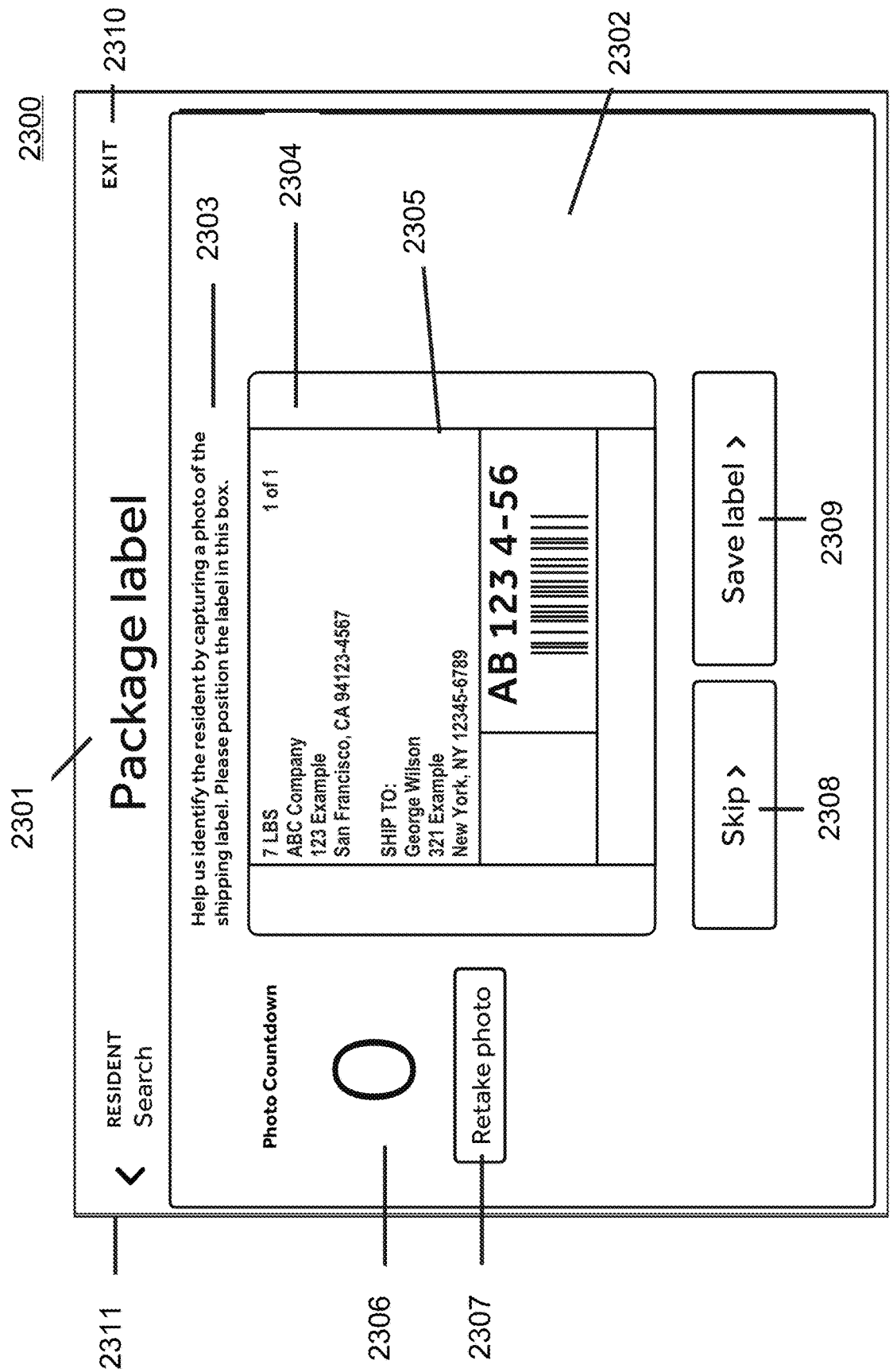
FIG. 23 is a screenshot of an example of a page for the delivery service of FIG. 6 to photograph the mailing label of the item via a camera.

FIG. 23 is a screenshot of an example of a page 2300 for delivery service 630 to photograph the mailing label of the item via a camera. Page 2300 includes at least title 2301, camera view 2302, instructions 2303, box 2304, mailing label 2305, photo countdown section 2306, retake photo link 2307, skip link 2308, save label link 2309, exit link 2310, and prior page link 2311. In other embodiments, page 2300 may not include all of the components listed and/or may include other components in addition to or instead of those listed above.

In at least one embodiment, page 2300 presents an interface for the delivery service 630 to photograph the mailing label of the item if the recipient cannot be found in the system 600. Title 2301 includes text (as the title) indicating that page 2300 is for recording the item label. Camera view 2302 is a view of the item using the camera when the delivery service 630 places the item in a proper position so that the mailing label appears in a box in the camera view 2302. In at least one embodiment, camera view 2302 is taken by a camera that is installed in the handheld devices used by the delivery service 630. In an alternative embodiment, a camera linked to storage terminal 615 may be used to photograph the label on the item. Instructions 2303 is text instructing the delivery service 630 or suggesting to the delivery service 630 to take a photo of the mailing label. Box 2304 is a box outlining part of the camera view within which the mailing label of the item needs to be placed in order to take a photo of the mailing label. Mailing label 2305 is a mailing label on the item, which may include mailing information such as the sender, the recipient, one or more barcodes, a tracking number, delivery service, and/or the delivery method (e.g., UPS GROUND), etc. Photo countdown section 2306 is a section with numbers counting down (e.g., from 5 to 0) indicating how many seconds are left until a photo is taken by the camera. In at least one embodiment, the photo countdown section 2306 shows the amount of time remaining that the delivery service 630 needs continue to keep the mailing label positioned so as to be viewable in the box 2304 before a photo will be taken. Retake link 2307 is a link for reactivating the camera to take another photo in case the previous photo is not satisfactory (e.g., in case the mailing label is not within the box 2304 and/or the photo is blurry). In an embodiment, placing the item with the mailing label in the box automatically activates the countdown and the taking of the photograph that follows. Skip link 2308 is a link to skip the step of photographing the mailing label. Save label link 2309 is a link to save the photograph of the mailing label after taken by the camera. Exit link 2310 is the same as the exit link 2107 that was discussed in conjunction with FIG. 21. Prior page link 2311 is a link back to page 2100.

Figure 24:
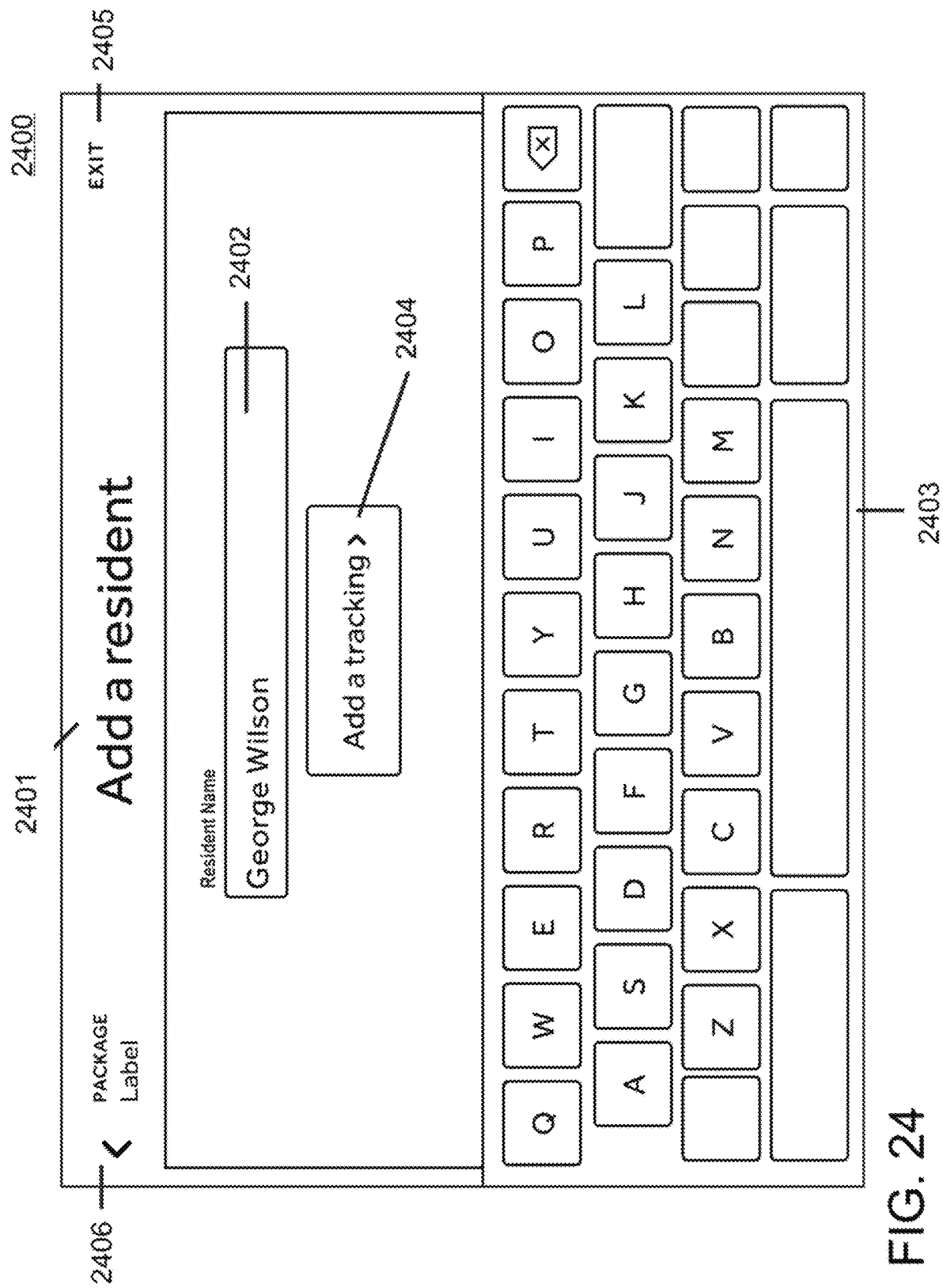
FIG. 24 is a screenshot of an example of a page for the delivery service of FIG. 6 to enter the name of the recipient.

FIG. 24 is a screenshot of an example of a page 2400 for delivery service 630 to enter the name of the recipient. Page 2400 includes at least title 2401, a field 2402, keyboard 2403, add tracking link 2404, an exit link 2405, and a prior page link 2406. In other embodiments, page 2400 may not include all of the components listed and/or may include other components in addition to or instead of those listed above.

In at least one embodiment, page 2400 includes fields and a virtual keyboard for the delivery service 630 to enter recipient's name in case the recipient is not found in the search results shown in page 1500. Title 2401 is text showing that page 2400 is for adding a recipient. In the example of FIG. 24, title 2401 is "Add a resident," because in the example of FIG. 24, the resident is the recipient. Field 2402 is for entering the name of the recipient shown on the mailing label. Keyboard 2403 may be similar to the keyboard 2106 as discussed in conjunction with FIG. 21 except that in page 2400, key board 2403 is used for entering the name of a recipient that was not previously on the list of recipients. Add tracking link 2404 is a link to a page for adding tracking number of the item. Exit link 2405 may be the same as the exit link 2107 as discussed in conjunction with FIG. 21. Prior page link 2406 is a link back to the page 2300.

Figure 25:
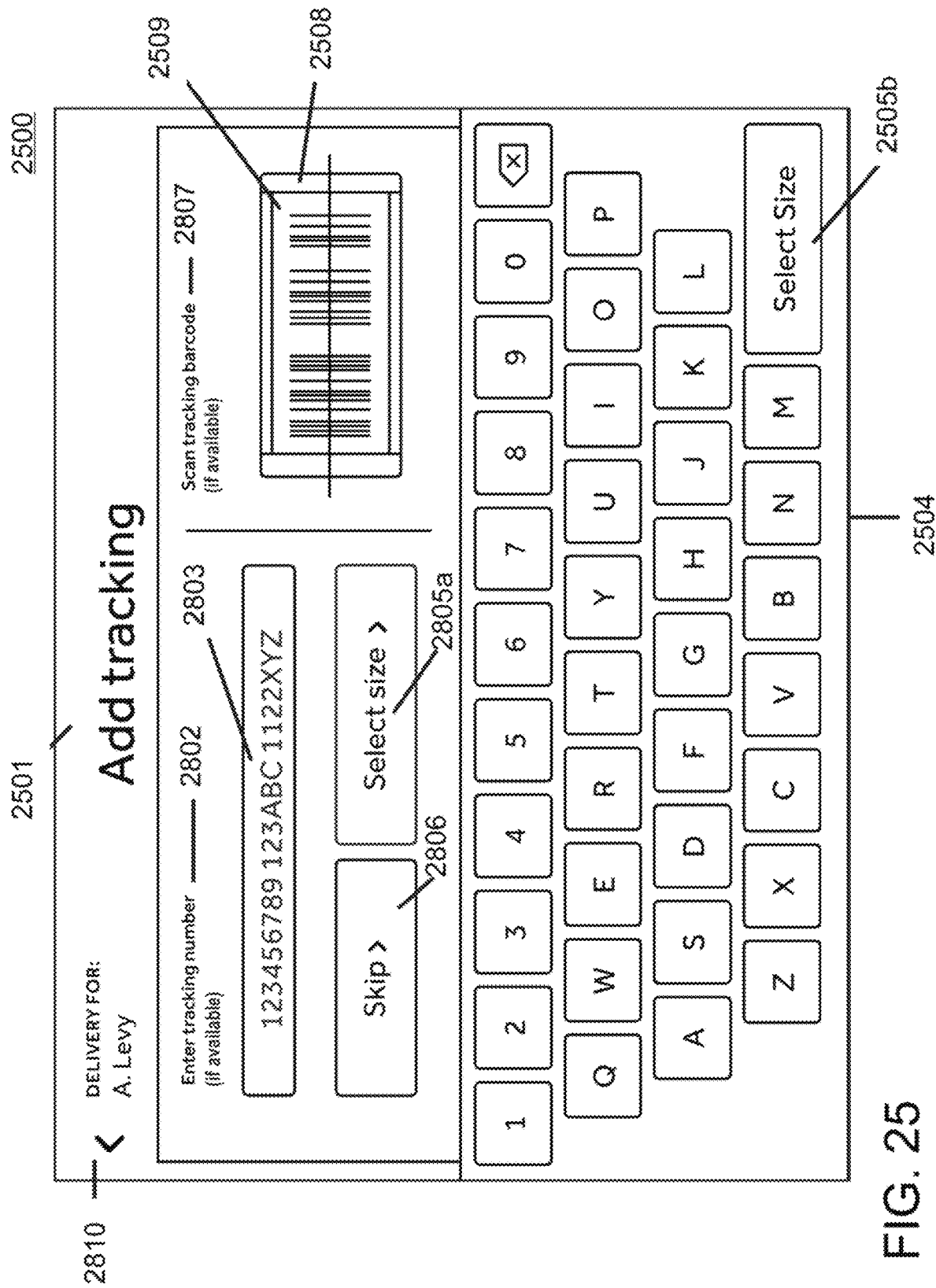
FIG. 25 is a screenshot of an example of a page for the delivery service FIG. 6 to add tracking information of the item.

FIG. 25 is a screenshot of an example of a page 2500 for delivery service 630 to add tracking information of the item. Page 2500 includes at least title 2501, instruction 2502, field 2503, keyboard 2504, select size links 2505*a* and 2505*b*, skip link 2505, instruction 2507, image 2508, barcode 2509, and prior page link 2510. In other embodiments, page 2500 may not include all of the components listed and/or may include other components in addition to or instead of those listed above.

In at least one embodiment, page 2500 includes fields and a virtual keyboard for the delivery service 630 to add tracking information in addition to adding the intended recipient name in page 2400. Title 2501 is text showing page 2500 is for adding tracking information. Instruction 2502 is text showing that tracking number may be entered in field 2503. Keyboard 2504 may be similar to the keyboard 2106 as discussed in conjunction with FIG. 21, except that keyboard 2504 is used for entering tracking information. Select size links 2505*a* and 2505*b* are links, which when selected, bring the user to a page to select a size of the storage area. In the example of FIG. 25, select size links 2505*a* and 2505*b* are located in the keyboard 2504 and under the field 2503, respectively. Skip link 2505 is a link to skip the step of entering tracking information. Instruction 2507 is text indicating that a tracking barcode may be scanned, if available. In an embodiment, storage system 615 includes a barcode scanner. Alternatively, delivery service 630 may use handheld devices with barcode scanners and/or may photograph the barcode (or otherwise use the camera on the handheld device of the delivery service 630 to scan the barcode). Image 2508 shows an example of a barcode 2509 on the mailing label. Prior page link 2510 is a link back to page 2400.

Figure 26:
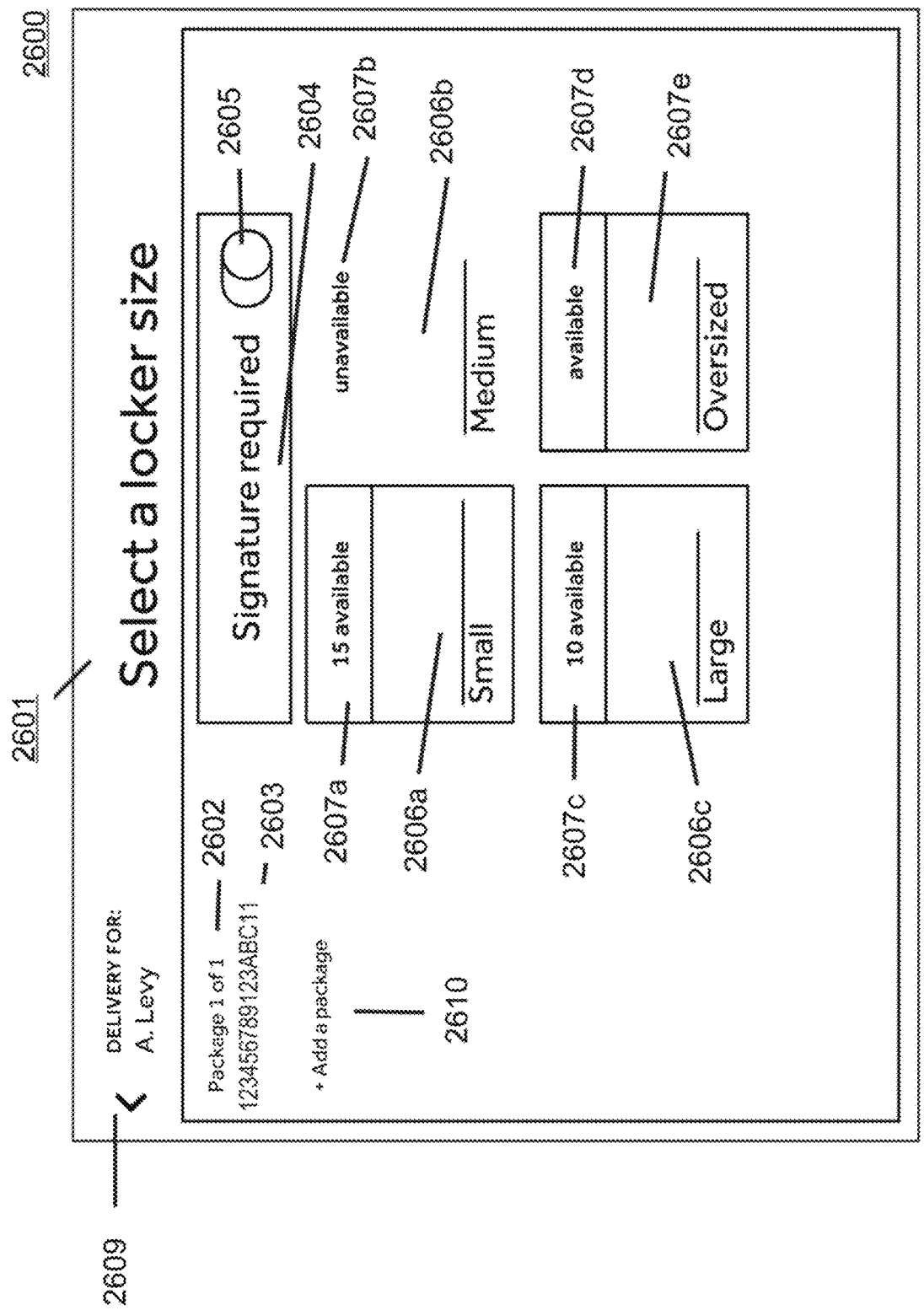
FIG. 26 is a screenshot of an example of a page for the delivery service of FIG. 6 to select an option if a signature is required and to choose the size of storage area to deposit the item.

FIG. 26 is a screenshot of an example of a page 2600 for delivery service 630 to select an option if a signature is required and to choose the size of storage area to deposit the item. Page 2600 includes at least title 2601, item number 2602, tracking number 2603, signature selection section 2604, selection icon 2605, storage selection sections 2606a-d, availability indicators 2607a-d, prior page link 2609, and add item link 2610. In other embodiments, page 2600 may not include all of the components listed and/or may include other components in addition to or instead of those listed above.

In at least one embodiment, page 2600 presents an interface for the delivery service 630 to select whether a signature is required prior to unlock the storage area, and what size of the storage area to deposit the item. In at least one embodiment, page 2600 also includes a link for the delivery service 630 to add another item to the same recipient.

Title 2601 is text showing that a storage size may be selected. Item number 2602 is text indicating the number of items to be delivered to the recipient. In an embodiment, item number 2602 indicates the total number of items that are being delivered to a recipient and which item of the total number items the current item is. Tracking number 2603 shows the tracking number of one of the items. Signature selection section 2604 is a section with options for delivery service 630 to choose whether a signature is required from the recipient prior to unlocking the storage area for picking up the item in the storage area. Selection icon 2605 is a selectable icon, which when selected causes storage system 615 to require signature from the recipient. Storage selection sections 2606a-d are four sections having links, which when selected by the delivery service 630 determine the size of the storage area that the storage system 615 opens for delivery service 630 to place a particular item. In at least one embodiment, storage selection sections 2606a-d include text showing the sizes of the storage areas available and a link to select the desired size. Availability indicators 2607a-d are texts showing the number of available storage areas of different sizes in storage selection sections 2606a-d. Prior page link 2609 is a link back to the page 2400. Add item link 2610 is a link to add more items to the same recipient.

Figure 27:
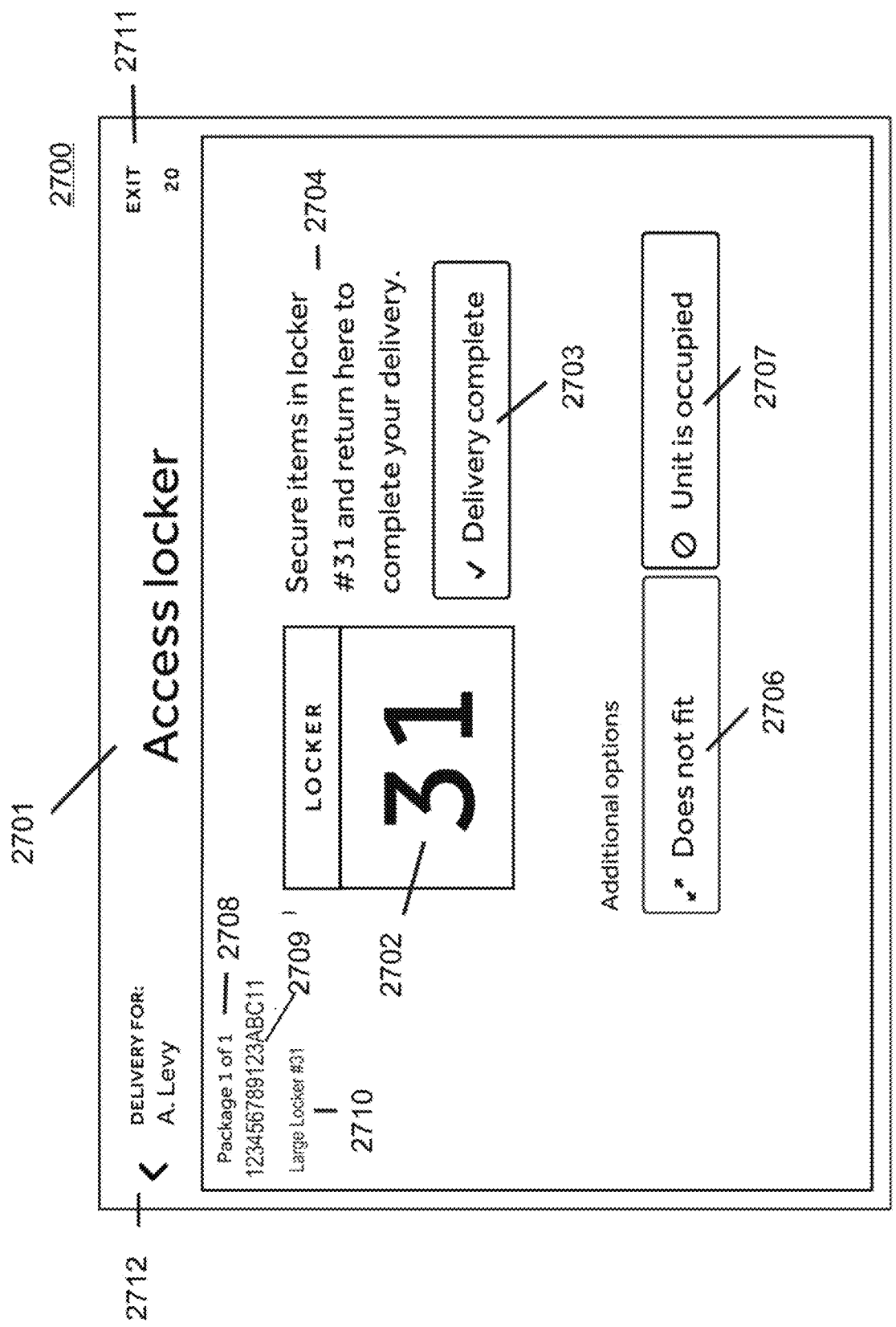
FIG. 27 is a screenshot of an example of a page that displays the storage area number of the selected storage area for deposit the item.

FIG. 27 is a screenshot of an example of a page 2700 that displays the storage area number of the selected storage area for deposit the item. Page 2700 includes at least title 2701, locker identifier 2702, instruction 2704, status indicator 2705, does-not-fit option 2706, occupied option 2707, item number indicator 2708, tracking number 2709, locker size 2710, exit link 2711, and prior page link 2712. In other embodiments, page 2700 may not include all of the components listed and/or may include other components in addition to or instead of those listed above.

In at least one embodiment, page 2700 shows the identifier of the storage area selected by system 600 and includes a link for the delivery service 630 to confirm the delivery of the item to the storage area that was selected. In at least one embodiment, page 2700 also includes links for the delivery service 630 to change to another storage area. Title 2701 is text showing that a storage area can be accessed for dropping off the item. Locker identifier 2702 is text showing an identifier of a storage area to help the delivery service 630 to locate the storage area within which to place the item being delivered. In the example of FIG. 27, the storage area identifier is a number and the storage area is a locker. However, in other embodiments the storage area may be a different type of storage area and the storage area identifier may include other symbols (e.g., letters) in addition to or instead of numbers. Instruction 2704 is text instructing the delivery service 630 to deposit the item and return to the screen and confirm completion of the delivery. Status indicator 2705 indicates the status of the delivery of the item (e.g., whether or not the delivery is complete) and is a link for confirming the delivery after the delivery service 630 drops off the item in the storage area. In an embodiment, prior to selecting status indicator 2705, status indicator does not contain a check mark to indicate that the delivery is not complete, yet. After selecting status indicator 2705, a check mark appears indicating that the delivery is complete. Does-not-fit option 2706 is a link for reselecting the size of the storage area in case the item does not fit into the previously selected storage area. In at least one embodiment, does-not-fit option 2706 redirects the delivery service 630 to page 2600 (FIG. 26) for the delivery service 630 to choose another size of storage area. Occupied option 2707 is a link, which if selected, requests the system 600 to choose another storage area of the same size. Delivery service 630 may select occupied option 2707, if the prior selected storage area is occupied and already in use by an item intended for another recipient. In at least one embodiment, since the records of system 600 previously incorrectly indicated that the occupied locker was not occupied, there may also be a page and/or fields within which the delivery person that indicated that the storage area was occupied may enter information about the item in the occupied storage area. In at least one embodiment, clicking occupied option 2707 sends a message to an administrative person of the storage bank 610 to check the storage area to see what item is left in the storage area that is not recorded by the system 600. Item number indicator 2708 shows the number (and/or which one) of items to be deposited in the storage area. Tracking number 2709 shows the tracking information of the item to be delivered. Locker size 2710 shows the identifier of a selected storage area and the size of the selected storage area. Exit link 2711 may be the same as the exit link 2107 as discussed in conjunction with FIG. 21. Prior page link 2712 is a link back to the page 2400.

Figure 28:
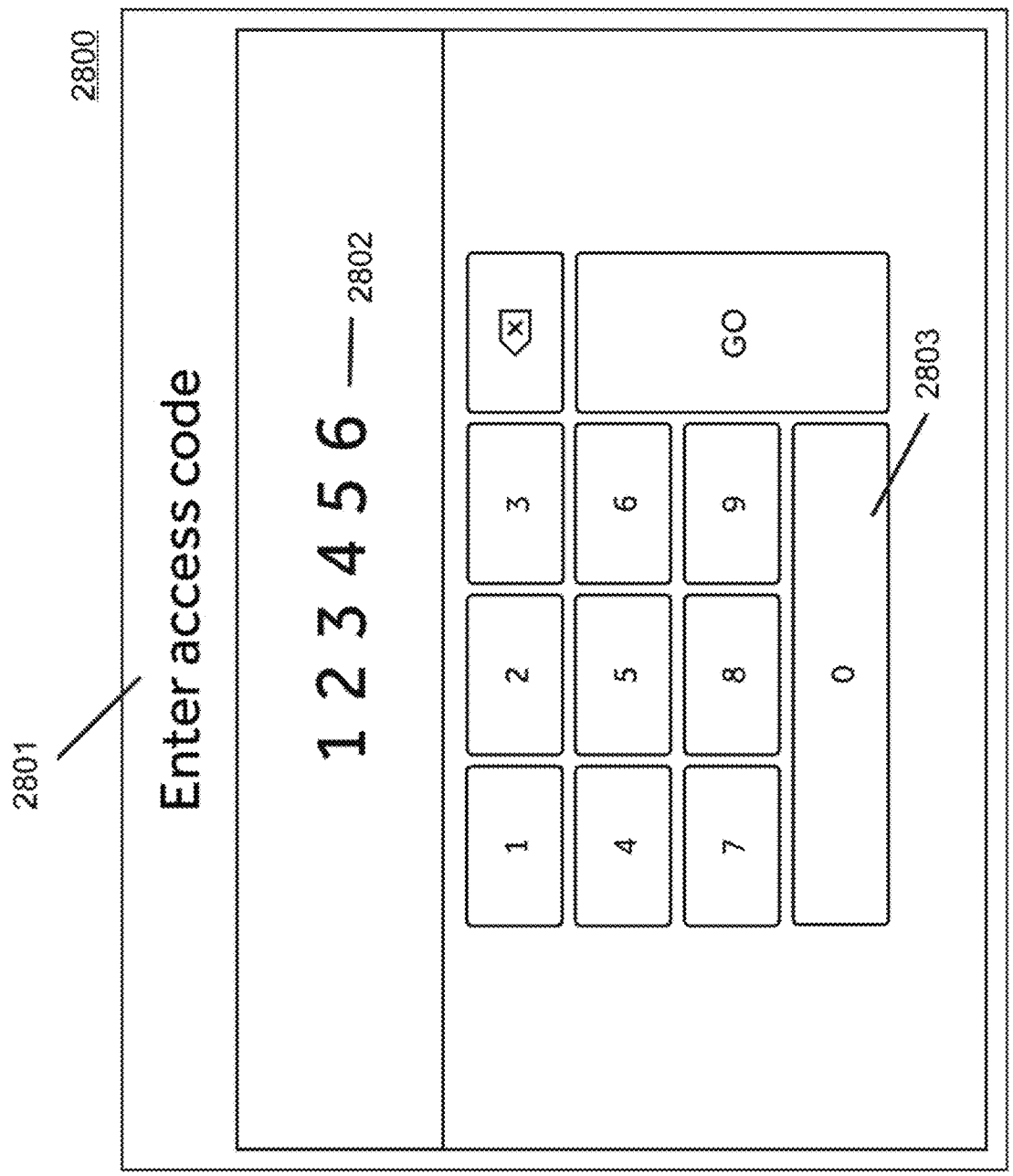
FIG. 28 is a screenshot of an example of a page for the intended recipient of FIG. 6 to enter a password in order to pick up an item.

FIG. 28 is a screenshot of an example of a page 2800 for intended recipient 650 to enter a password in order to pick up an item. Page 2800 includes at least title 2801, text field 2802, and keypad 2803, which are similar to instruction 1901, text field 1902, and keypad 1903 except that a password is entered by the intended recipient 650 to access the system 600 to pick up an item, whereas text field 1902 receives an access code entered by delivery service 630. In at least one embodiment, the password is generated by the server 620 and may expire after use or after a limited time. In at least one embodiment, after entering the password via page 2800, the password is authenticated by the server 620. In other embodiments, page 2800 may not include all of the components listed and/or may include other components in addition to or instead of those listed above.

Figure 29:
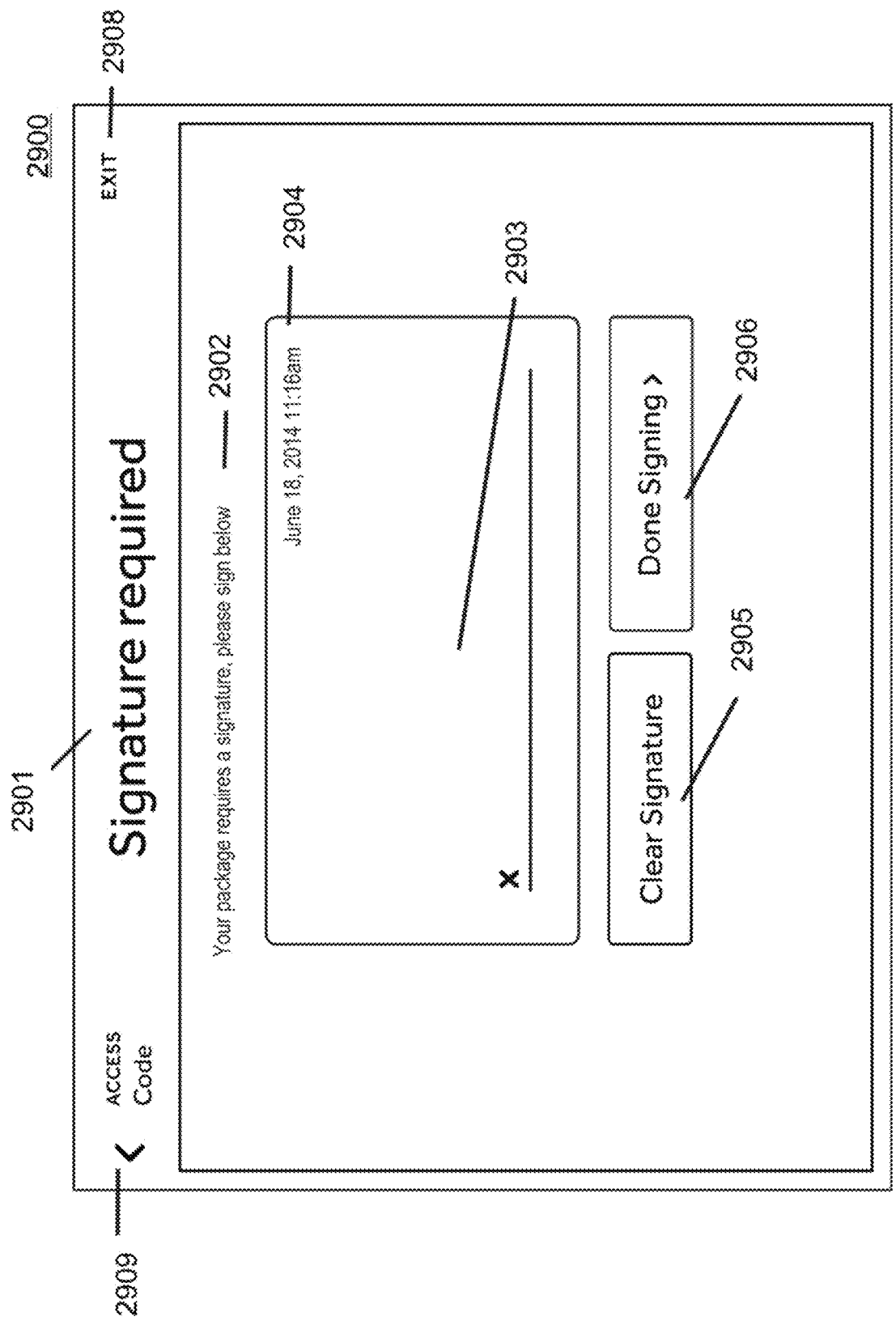
FIG. 29 is a screenshot of an example of a page for the intended recipient of FIG. 6 to sign if the delivery service (of FIG. 6) chooses that a signature of the recipient is required prior to opening the lock.

FIG. 29 is a screenshot of an example of a page 2900 for intended recipient 650 to sign if the delivery service 630 chooses that a signature of the recipient is required prior to opening the lock. Page 2900 includes at least instruction 2906, instruction 2902, signature field 2903, time indicator 2904, links 2905 and 2906, exit link 2908, and prior page link 2909. In other embodiments, page 2900 may not include all of the components listed and/or may include other components in addition to or instead of those listed above.

In at least one embodiment, page 2900 includes a field for the intended recipient 650 to sign (if required by the delivery service 630) before the system 600 opens the lock of the storage area. Instruction 2901 includes text indicating that a signature is required for picking up the item. Instruction 2902 includes text instructing the recipient to sign below (in the signature field). Signature field 2903 is a section having a field for the intended recipient 650 to sign. In the example of FIG. 29, signature field 2903 is placed (on page 2900) in an area surrounded by lines that circumscribe and/or outline the signature field 2903. Using touch screen, the recipient may sign within signature field 2903. In the example of FIG. 29, signature field 2903 is in a signature box. Time indicator 2904 displays and records the time when the signature is entered. Clear signature link 2905 is a link for clearing the signature so that a new signature may be entered (e.g., if the recipient made a mistake in the signature). Done signing link 2905 is a link for confirming completion of the signature, and by selecting done signing link 2905, the recipient indicates that the signature is complete. In at least one embodiment, as a result of selecting done signing link 2905, the signature is uploaded to the server 620 or stored by storage system 615 for authentication before the lock is opened, and the lock is only opened if the signature is determined to be authentic. In another embodiment, selecting done signing link 2905 causes the signature to upload to server 620 or stored at storage system 615, but the signature is not typically authenticated. By selecting done signing link 2905 may trigger storage system 615 or server 620 to store the signature in association with information about the item delivered. Exit link 2908 may be the same as the exit link 2107 as discussed in conjunction with FIG. 21. Prior page link 2909 is a link back to the page 2800.

Figure 30:
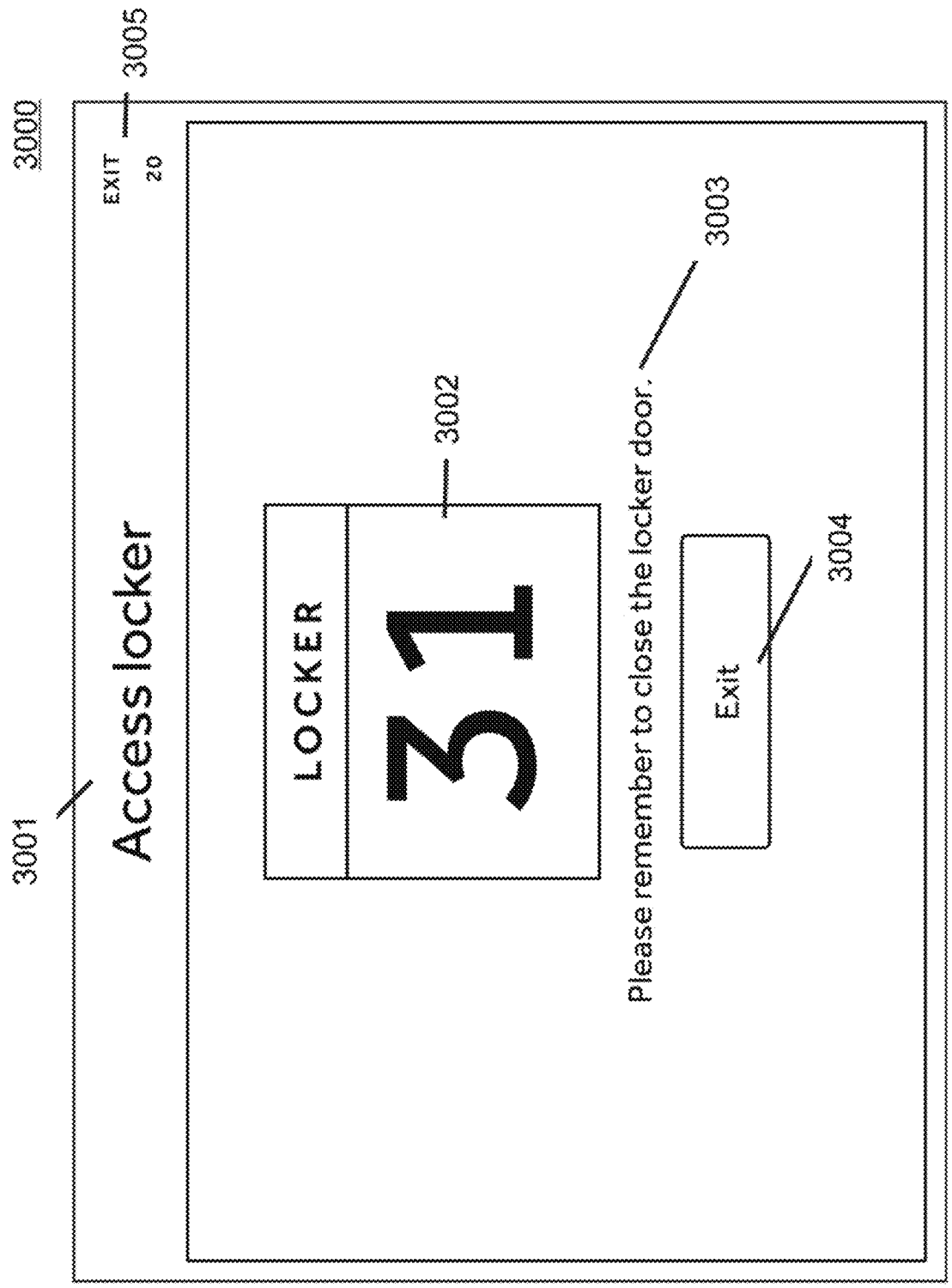
FIG. 30 is a screenshot of an example of a page that displays the identifier of a storage area for the intended recipient of FIG. 6 to pick up the item.

FIG. 30 is a screenshot of an example of a page 3000 that displays the identifier of a storage area for intended recipient 650 to pick up the item. Page 3000 includes at least instruction 3001, storage area identifier 3002, instruction 3003, exit link 3004, and exit link 3005. In other embodiments, page 3000 may not include all of the components listed and/or may include other components in addition to or instead of those listed above.

Instruction 3001 is text showing the storage area can be accessed to pick up the item. Storage area identifier 3002 includes the identifier of a storage area (e.g., a number identifying the storage area) where the item is stored. Instruction 3003 includes instructions for the intended recipient 650 to close the door after picking up the item. Exit link 3004 is a link to exit the system 600. Exit link 3005 may be the same as the exit link 2107 as discussed in conjunction with FIG. 21.

Extensions and Alternatives

Optionally, the storage areas may include sensors and/or cameras that detect whether or not a storage area is occupied, which may be capable to sense information about the contents of the storage area, such as by sensing the weight of the contents of the storage area and/or by photographing the contents of the storage area (e.g., so that the mailing label can be read). If a system 600 indicates that a storage area is empty and then the delivery service 630 selects occupied option 2007 (FIG. 20) indicating that the storage area is really occupied, contents of the storage may be photographed (or otherwise detected) to determine the intended recipient, to determine the sender, and/or to determine what action to take. Based on information detected about the item and based on prior records, of deliveries of items to that storage area, system 600 may be able to determine how long the item was in the storage area and/or whether the intended recipient attempted to pick up the item. Depending on whether the sender can be determined, depending on whether or not there was prior attempt to pick up the item from the storage area, and/or depending on how long ago the item was delivered, a determination may be made as to whether to return the item to the sender, to send a message to the intended recipient to pick up the item, to send a message to an administrative person to contact the intended recipient to determine what the issue may have been hindering the picking up the item, and/or whether to take other actions.

In an embodiment, intended recipient 650 may also drop off items in the storage areas for delivery service 630 or another recipient to pickup and deliver. Storage terminal 615 and/or sever 620 may include pages having fields in which the sender requests a storage area, enters information about the intended recipient, and optionally selects a delivery service. After the item is in the system 600, a message may be sent to the intended recipient to pick up the item directly or a message may be sent to a delivery service to pick up the item and deliver the item to the intended recipient Optionally, the storage system 10 may receive signals from sensors and/or cameras that detect whether or not a storage room that optionally has storage areas is occupied. In an embodiment, the sensors and/or cameras may be capable to sense information about the contents of the storage room, such as by sensing the weight of the contents of the storage room by photographing the contents of the storage room (e.g., so that the mailing label can be read). In another embodiment, the sensors and/or cameras may sense (or photographing) any movement of people in a room to determine whether the room is currently in use. If the storage system 10, in which the lock 20 may be used, indicates that a storage room is empty and then the delivery person found that the storage room is really occupied, the delivery person may send a message to the storage system 10 and contents of the storage room may be photographed (or otherwise detected) to determine the intended recipient, to determine the sender, and/or to determine what action to take. Based on information detected about the item and based on prior records, of deliveries of items to that storage room, storage system 10 may be able to determine how long the item was in the storage room 16 and/or whether the intended recipient attempted to pick up the item. Depending on whether the sender can be determined, depending on whether or not there was prior attempt to pick up the item from the storage room 16, and/or depending on how long ago the item was delivered, a determination may be made as to whether to return the item to the sender, to send a message to the intended recipient to pick up the item, to send a message to an administrative person to contact the intended recipient to determine what the issue may have been hindering the picking up the item, and/or whether to take other actions.

In an embodiment, intended recipient 650 may also drop off items in the storage room 16 for delivery person or another recipient to pick up and deliver. Kiosk 21 or tablet 12 may provide user interface pages that allow the sender to request opening of the storage room 16 to deliver an item (and thus the lock interface 112 receives the request to open the lock 20), enters information about the intended recipient, and optionally selects a delivery service 630. After the item is securely locked in the storage system 10, a message may be sent to the intended recipient to pick up the item directly or a message may be sent to a delivery service 630 to pick up the item and deliver the item to the intended recipient. As a result, the intended recipient or the delivery service 630 may send a request, which includes the code received, to the lock interface 112 to open the electronic lock 20 that locks the storage room 16 that stores the item.

The storage rooms of this specification may be used as any of the storage areas of U.S. Pat. No. 7,844,507, entitled "HANDLING HOUSEHOLD TASKS," by Arik Seth Levy, filed Mar. 22, 2006, U.S. Pat. No. 8,401,932, entitled "HANDLING HOUSEHOLD TASKS," by Arik Seth Levy, filed Oct. 18, 2010, U.S. Non-Provisional patent application Ser.

No. 14/505,457, entitled "METHOD AND SYSTEM FOR IMPLEMENTING ELECTRONIC STORAGE AREAS," filed on Oct. 2, 2014, by Arik Seth Levy, U.S. Non-Provisional patent application Ser. No. 14/668,883, entitled "METHOD AND SYSTEM FOR IMPLEMENTING ELECTRONIC STORAGE AREAS," filed on Mar. 25, 2015, by Arik Seth Levy, and/or U.S. Non-Provisional patent application Ser. No. 16/447,445, entitled "METHOD FOR CONTROLLING PACKAGE DELIVERY," filed on Jun. 20, 2019, by Arik Seth Levy, et al.

The storage system of this specification may be used with any of the methods disclosed in U.S. Pat. No. 7,844,507, entitled "HANDLING HOUSEHOLD TASKS," by Arik Seth Levy, filed Mar. 22, 2006, U.S. Pat. No. 8,401,932, entitled "HANDLING HOUSEHOLD TASKS," by Arik Seth Levy, filed Oct. 18, 2010, U.S. Non-Provisional patent application Ser. No. 14/505,457, entitled "METHOD AND SYSTEM FOR IMPLEMENTING ELECTRONIC STORAGE AREAS," filed on Oct. 2, 2014, by Arik Seth Levy, and U.S. Non-Provisional patent application Ser. No. 14/668,883, entitled "METHOD AND SYSTEM FOR IMPLEMENTING ELECTRONIC STORAGE AREAS," filed on Mar. 25, 2015, by Arik Seth Levy, and/or U.S. Non-Provisional patent application Ser. No. 16/447,445, entitled "METHOD FOR CONTROLLING PACKAGE DELIVERY," filed on Jun. 20, 2019, by Arik Seth Levy, et al.

The storage room of this specification may be included within the storage room any of the storage receptacles, lockers, or storage areas of U.S. Pat. No. 7,844,507, entitled "HANDLING HOUSEHOLD TASKS," by Arik Seth Levy, filed Mar. 22, 2006, U.S. Pat. No. 8,401,932, entitled "HANDLING HOUSEHOLD TASKS," by Arik Seth Levy, filed Oct. 18, 2010, U.S. Pat. No. 8,359,249, entitled "STORAGE LOCKER," by Arik Seth Levy, filed Aug. 28, 2011, U.S. Pat. No. 8,725,600, entitled "STORAGE LOCKER," by Arik Seth Levy, filed Dec. 20, 2012, U.S. Non-Provisional patent application Ser. No. 14/505,457, entitled "METHOD AND SYSTEM FOR IMPLEMENTING ELECTRONIC STORAGE AREAS," filed on Oct. 2, 2014, by Arik Seth Levy, and U.S. Non-Provisional patent application Ser. No. 14/668,883, entitled "METHOD AND SYSTEM FOR IMPLEMENTING ELECTRONIC STORAGE AREAS," filed on Mar. 25, 2015, by Arik Seth Levy, and/or U.S. Non-Provisional patent application Ser. No. 16/447,445, entitled "METHOD FOR CONTROLLING PACKAGE DELIVERY," filed on Jun. 20, 2019, by Arik Seth Levy, et al.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A system comprising:
a plurality of storage areas;
a processor system including at least one processor;
a memory system storing one or more machine instructions for an interactive user interface, which when implemented by the processor system, cause the at least one processor to:
display the interactive user interface on a display, wherein the interactive user interface includes at least a window for viewing a barcode, associated with a package, that was captured, and wherein the interactive user interface further comprises a page for finding a resident and including at least a keypad for entering user information and a list of users having information that matches the user information entered, the page for finding the resident having a link, which when activated provides one or more fields for adding a new resident;
in response to capturing the barcode, display the barcode on the display;
determine which locker of the plurality of storage areas to place the package;
based on the determining, provide an indication of in which locker to place the package after the barcode is captured; and
unlock the locker of the plurality of storage areas based on the determining.

2. The system of claim 1, further comprising at least a camera for capturing an image of the barcode.

3. The system of claim 2, further comprising an optical recognition module that recognizes the barcode.

4. The system of claim 1, wherein the link, when activated navigates to a page for handling residents not found in the list.

5. The system of claim 4, the page for handling the residents that are not found in the list including at least a box for viewing an image of a label prior to the label being photographed.

6. The system of claim 5, the page for handling the residents that are not found in the list including at least an indication of a countdown to when a photograph will be taken of the label, the countdown occurring while the label is shown in the window.

7. A method comprising:
capturing a barcode on a package, via a barcode capture device;
displaying, via a machine, an interactive user interface on a display, the displaying of the interactive user interface including at least displaying a window for viewing the barcode that was captured by the barcode capture device, and wherein the interactive user interface further comprises a page for finding a resident and including at least a keypad for entering user information and a list of users having information that matches the user information entered, the page for finding the resident having a link, which when activated navigates to a page for handling residents not found in the list, the machine including a processor system having at least a processor and a memory system including one or more instructions for implementing the interactive user interface; and
in response to capturing the barcode, displaying the barcode on the display;
based on a determination of in which of the plurality of lockers of a storage area to place the package having the barcode, providing an indication of in which of the plurality of lockers to place the package having the barcode after the barcode is captured; and
unlocking the locker of the storage area based on the determination.

8. The method of claim 7, wherein the barcode capture device is a handheld user device.

9. The method of claim 8, wherein the handheld user device is a mobile phone.

10. The storage system of claim 1, the memory system further storing one or more machine instructions, which when implemented cause the storage system to retrieve information about the package from a delivery service based on the barcode;
  search for an intended recipient; and
  determine how to handle the package based on whether the intended recipient was found.

11. A storage system comprising:
  a plurality of storage areas;
  a processor system including at least one processor;
  a memory system storing one or more machine instructions for an interactive user interface, which when invoked cause the processor system to implement a method, the method including at least:
    receiving at the storage system, via the interactive user interface, a delivery code associated with a package;
    sending, by the storage system, the delivery code to a system of a delivery service;
    in response to the sending, receiving, at the storage system, information associated with an intended recipient, based on the delivery code;
    searching for the intended recipient at the storage system, wherein searching for the intended recipient includes displaying the interactive user interface on a display, wherein the interactive user interface includes at least a window for the receiving the delivery code, wherein the interactive user interface further comprises a page for finding a resident and including at least a keypad for entering user information and a list of users having information that matches the user information entered, the page for finding the resident having a link, which when activated provides one or more fields for adding a new resident;
  determining how to handle the package based on whether the intended recipient was found in the search; and
  handling the package based on the determining, wherein handling the package comprises unlocking a locker for receiving the package.

* * * * *